July 16, 1963 W. H. BERCH 3,098,125

ROUTING MEANS FOR TELEPHONE SYSTEM

Filed May 1, 1958 28 Sheets-Sheet 1

INVENTOR.
WILLIAM H. BERCH

BY

ATTORNEY

INVENTOR.
WILLIAM H. BERCH
BY George J. Seligsohn
ATTORNEY

July 16, 1963 W. H. BERCH 3,098,125

ROUTING MEANS FOR TELEPHONE SYSTEM

Filed May 1, 1958 28 Sheets-Sheet 3

July 16, 1963 W. H. BERCH 3,098,125

ROUTING MEANS FOR TELEPHONE SYSTEM

Filed May 1, 1958 28 Sheets-Sheet 4

ROUTING MEANS FOR TELEPHONE SYSTEM

Filed May 1, 1958 28 Sheets-Sheet 5

REG. SEND. 114 - SEND CONTROL

ROUTING MEANS FOR TELEPHONE SYSTEM

Filed May 1, 1958 28 Sheets-Sheet 7

REG. SEND. 114 - CLASS RELAYS

REG. SEND. 114 - PULSE GEN. & COUNT.

July 16, 1963 W. H. BERCH 3,098,125

ROUTING MEANS FOR TELEPHONE SYSTEM

Filed May 1, 1958 28 Sheets-Sheet 12

July 16, 1963 W. H. BERCH 3,098,125

ROUTING MEANS FOR TELEPHONE SYSTEM

Filed May 1, 1958 28 Sheets-Sheet 15

July 16, 1963 W. H. BERCH 3,098,125

ROUTING MEANS FOR TELEPHONE SYSTEM

Filed May 1, 1958 28 Sheets-Sheet 17

July 16, 1963 W. H. BERCH 3,098,125

ROUTING MEANS FOR TELEPHONE SYSTEM

Filed May 1, 1958 28 Sheets-Sheet 18

July 16, 1963 W. H. BERCH 3,098,125

ROUTING MEANS FOR TELEPHONE SYSTEM

Filed May 1, 1958 28 Sheets-Sheet 23

July 16, 1963 W. H. BERCH 3,098,125

ROUTING MEANS FOR TELEPHONE SYSTEM

Filed May 1, 1958 28 Sheets-Sheet 25

United States Patent Office 3,098,125
Patented July 16, 1963

3,098,125
ROUTING MEANS FOR TELEPHONE SYSTEM

William H. Berch, Penfield, N.Y., assignor to General Dynamics Corporation, Rochester, N.Y., a corporation of Delaware Filed May 1, 1958, Ser. No. 732,250
63 Claims. (Cl. 179—18)

This invention relates to routing means for telephone systems and, more particularly, to routing means for a direct distance dialing telephone system.

Direct distance dialing, i.e., the automatic placing of toll calls solely under the control of the calling subscriber, involves two distinct problems. First, in order to properly charge the calling subscriber for direct distance dialed toll calls made by him, it is necessary to provide toll ticketing equipment capable of collecting, storing and utilizing various billing information, such as the identity of the calling subscriber, the destination of the call being placed, the duration of the call and the time and date of the call. Such toll ticketing equipment is well known in the art, being described, for instance, in patent application Serial No. 536,573, filed September 26, 1955, by Morris et al. and entitled "Automatic Subscriber Identification System," now Patent No. 2,877,311, and in patent application Serial No. 611,298, filed September 20, 1956, by Confeld et al., and entitled "Toll Ticketing Adapter," now abandoned both of which are assigned to the same assignee as the present invention.

Second, in addition to providing toll ticketing equipment, it is necessary to provide means for routing the direct distance dialed toll call to its destination. The present invention is not concerned with the problem of ticketing a direct distance dialed call, but is concerned solely with the provision of novel means for routing a direct distance dialed toll call to its destination.

In order to be able to route all direct distance dialed toll calls, including nationwide toll calls, to their destination a numbering plan has been evolved in accordance with which the entire country is divided into a plurality of areas, one or more areas being provided for each state. Each of these areas is designated by a unique three digit area code in which the first digit may have any value between 2 and 9, but not 0 or 1; the second digit may be either 0 or 1, but not 2 to 9; and the third digit may have any value between 1 and 9 as well as 0. Within any one area, a unique combination of digits is used to designate each exchange or office therein, so that no ambiguity therebetween exists. However, exchanges or offices located in different areas may be designated by identical codes.

Furthermore, in accordance with the above-mentioned numbering plan, a calling subscriber who desires to extend a call to a called subscriber of an exchange located in the same area as the originating exchange must only dial the office code of the called office and the directory number of the called subscriber. In this case, the calling subscriber does not dial the area code of the area in which both the originating exchange and the called office are located. However, when making a call to a called subscriber located in a foreign area, it is necessary for the calling subscriber to dial the area code of the foreign area prior to dialing the office code and directory number of the called subscriber.

In order to achieve direct distance dialing on a nationwide scale, there has been developed routing equipment known as the 4A crossbar system. This equipment, in response to the area code (in the case of a call directed to a foreign area) and the office code being supplied thereto, is capable of controlling the extension of the call to its destination, anywhere in the country, over a selected one of a plurality of alternate routes. To be able to accomplish this on a nationwide basis, it is necessary that this 4A crossbar routing equipment have permanently stored therein sufficient information about the trunking facilities of the entire nation to be capable of selecting the proper route over which to extend the call on the basis of the area and office codes supplied thereto. Further, in case the selected route be found busy, an alternate route, if any exists, must be selected. In some cases, it may be necessary to select a second alternate route in case the first alternate route is also busy. Needless to say, the 4A crossbar routing equipment is extremely complex and expensive. Due to this fact, it cannot economically be incorporated in each originating exchange, but is limited to employment at regional switching centers, one or more of which are located in each area.

The routing means for direct distance dialing contemplated by the present invention is much simpler and less expensive than the aforementioned 4A crossbar routing equipment, so that it may be economically incorporated in a relatively small originating office.

More specifically, the routing means of this invention is capable of directly extending toll calls to subscribers of exchanges located within the broad community of interest of the originating office, which may include exchanges located in the foreign areas. In the case of toll calls to subscribers of exchanges located beyond this broad community of interest of the originating office, the routing means of this invention is capable of extending the toll call to a regional switching center incorporating a 4A crossbar system and then supplying to the 4A crossbar system the information needed thereat for further routing the call to the called subscriber.

It is therefore an object of this invention to provide routing means for a direct distance dialing telephone system which is suitable for incorporation in a relatively small originating office.

It is a further object of this invention to provide routing means capable of recognizing wrong numbers and restricted codes supplied thereto by a calling subscriber.

It is a still further object of this invention to provide routing means which permits the connection to be extended only in response to valid information supplied to it, returning busy tone in response to wrong numbers or restricted codes supplied to it.

It is another object of this invention to provide routing means capable of translating a first group of dialed digits and in response to the translation thereof determining whether or not a second translation of a second group of dialed digits is required to obtain complete routing instructions, and providing the second translation only when it has been determined to be required.

It is another object of this invention to provide routing means capable of anticipating the total number of dialed digits to be expected, in response to the values of a first group of dialed digits, and for preventing dialed digits exceeding this total number from affecting the operation of the routing means.

It is another object of this invention to provide routing means responsive to stop dial signals.

It is another object of this invention to provide routing means capable of determining whether or not an alternate route is available, and if available providing the alternate route in response to the primary route being busy.

It is a further object of this invention to provide routing means capable of being timed out if a dialed digit is not supplied thereto within a given period after seizure thereof or the receipt of the preceding dialed digit.

One feature of the present invention is the provision in the routing means of a group of class relays, each of which includes a large plurality of contacts. One of these class relays is uniquely operated in accordance with the translation of the first three dialed digits. Some or all of the contacts of each class relay are strapped to various leads in such a manner as to provide upon operation of that relay all routing instructions determinable from the first three dialed digits. For instance, the strapping of an operated class relay may be such as to indicate that a further translation of the second three digits (that is the fourth, fifth and sixth digits) is needed to give sufficient information as to how the call should be routed. In this case, a second translation is made in accordance with the fourth, fifth and sixth digits, and the particular one of the class relays which was initially operated. In response to the second translation some other particular class relay is operated. The group of class relays are so interconnected that the operation of the second class relay restores the first-operated class relay.

This second class relay has its contacts strapped in such a manner as to provide complete routing instructions, to thereby control all subsequent operations of the routing means. In the case where all routing instructions are determinable in repsonse to the translation of the first three digits, so that no second translation is required, the first class relay is strapped in a manner to provide complete routing instructions.

In addition to the two cases discussed above, a third situation exists. Though the translation of the first three digits is sufficient to give complete routing instructions, it is possible that a second translation of the second three digits is required in order to determine whether the second three digits represents a valid code or a restricted code. In this last case, it is not necessary to operate a second class relay in response to the second translation, but only to return a busy signal for a restricted code or permit further extension of the connection to proceed for a valid code.

In any event, the complete routing instructions, referred to above, provided by an operated class relay includes the following pieces of information:

The number, if any, of prefix routing digits to be outpulsed and the specific values thereof; the number of dialed-in digits to be skipped in outpulsing; when outpulsing should start; the total number of dialed-in digits to be expected, whether this is a fixed number, as is usually the case, or is a variable number, as where party line subscribers of the called exchange have one more digit than private line subscribers; the interdigital time to be provided—a longer interdigital time being provided where the call is extended to a switching center or office which may return stop dial signals; and, lastly, whether or not an alternate route is available.

In the case where no alternate route is available, busy tone is returned to the calling subscriber in response to the selected primary route being busy. If an alternate route is available, the class relay is strapped to selected another class relay, having the routing instructions for the alternate route, and to drop the forward switch train, in response to the selected primary route being busy.

It will be seen, therefore, that the feature of utilizing a group of class relays to selectively control routing permits a maximum of versatility to be achieved with a minimum of equipment.

Another feature of the present invention is the translating method which is employed. As alluded to above, the routing means of this invention is capable of effectively accomplishing a six digit translation by making a first translation involving three pieces of information and then by making a second translation involving four pieces of information. Since these two translations are not made simultaneously, but consecutively, a single translator may be employed for both the first and second translations. Since the size of a translator increases geometrically with the number of pieces of information to be translated, a much smaller translator may be utilized than would be required if a single six digit translation were required.

A still further feature of the routing means of the present invention is the inclusion therein of apparatus for recognizing various types of wrong numbers and restricted codes, and for preventing the connection from being extended in response thereto. For instance, neither an area code nor an office code may have 0 or 1 as the first digits thereof. Furthermore, an office code may not have 0 or 1 as the second digit thereof. Therefor, if the first dialed digit is a 0 or 1, or if the fourth or fifth digit is a 0 or 1 and the second digit is also a 0 or 1, indicating that the fourth and fifth digits represent the first and second digits of an office code following an area code, busy tone will immediately be returned to the calling subscriber by the routing means, and no extension of the connection will be permitted. Again, if the first translation of the first three digits should show that they represent either a vacant code, i.e., the local area code or a code which is unassigned to either an office or an area, or a restricted code, i.e., a code assigned to a special service to which the calling subscriber is restricted, busy tone will be returned to the calling subscriber and extension of the connection will be prevented.

These and other objects, features and attendant advantages of the present invention will be better understood from the following detailed description of a preferred embodiment thereof taken together with the accompanying drawings, in which.

Figures 13, 28:
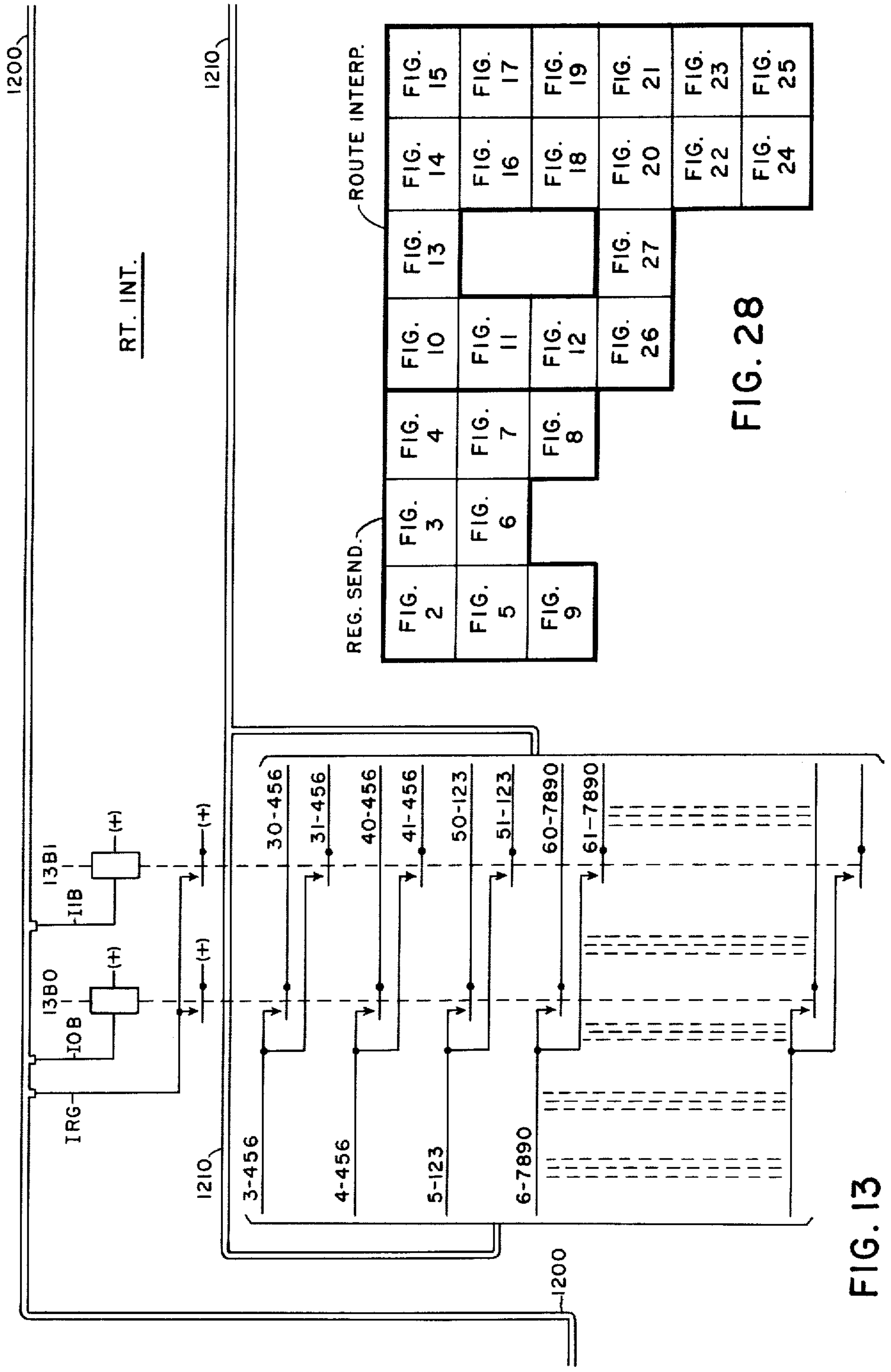
Figure 14:
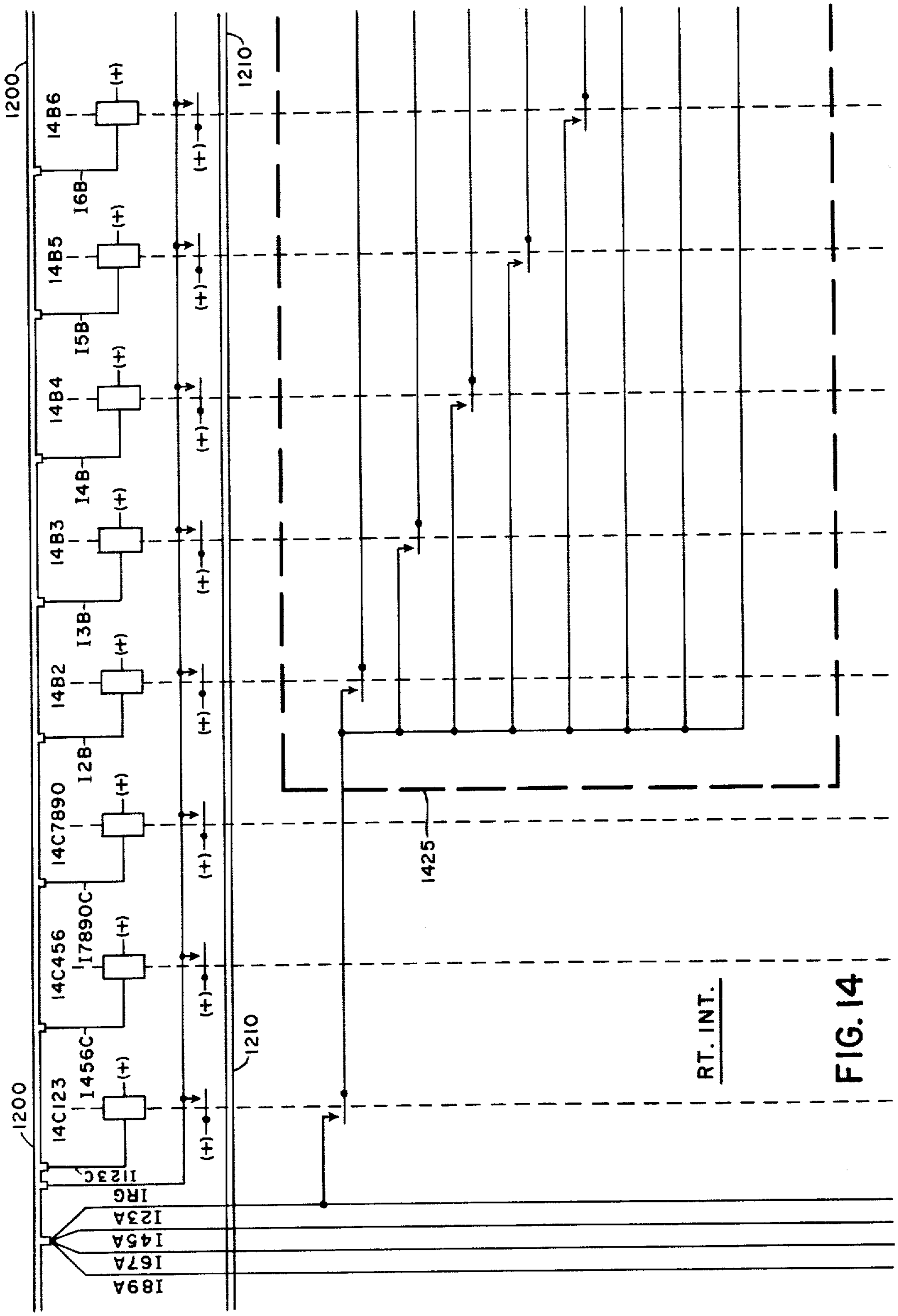
Figure 15:
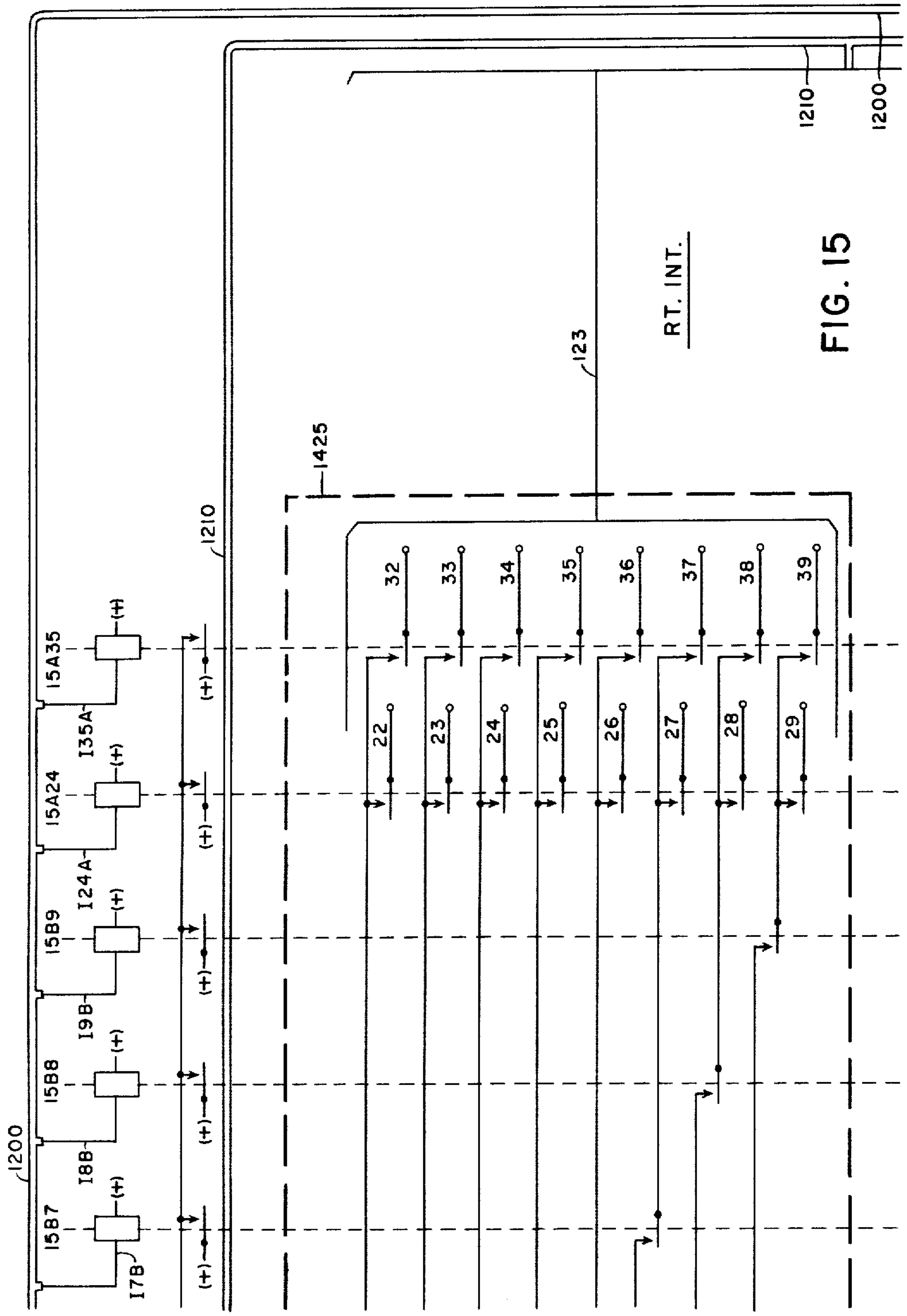
Figure 16:
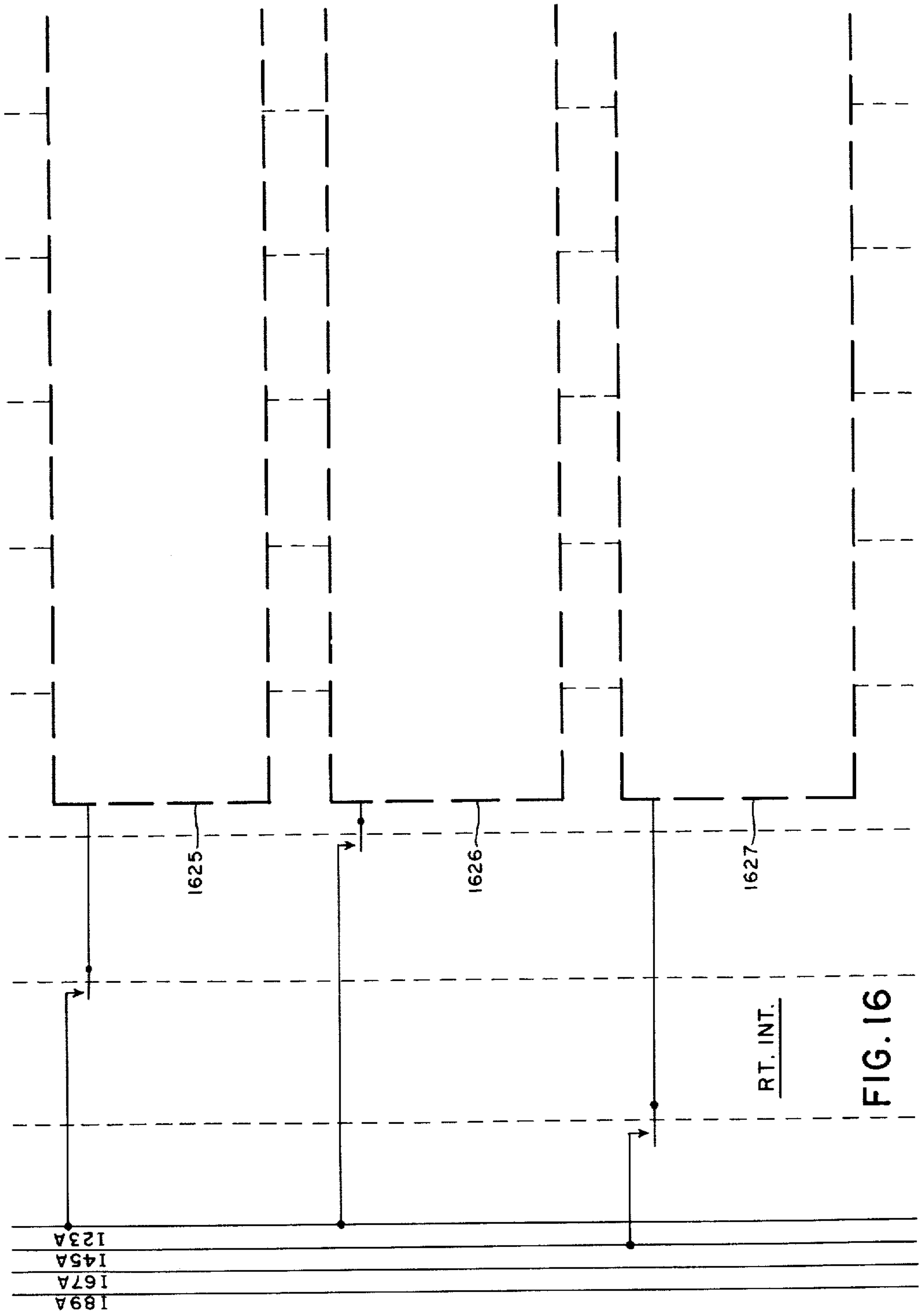
Figure 17:
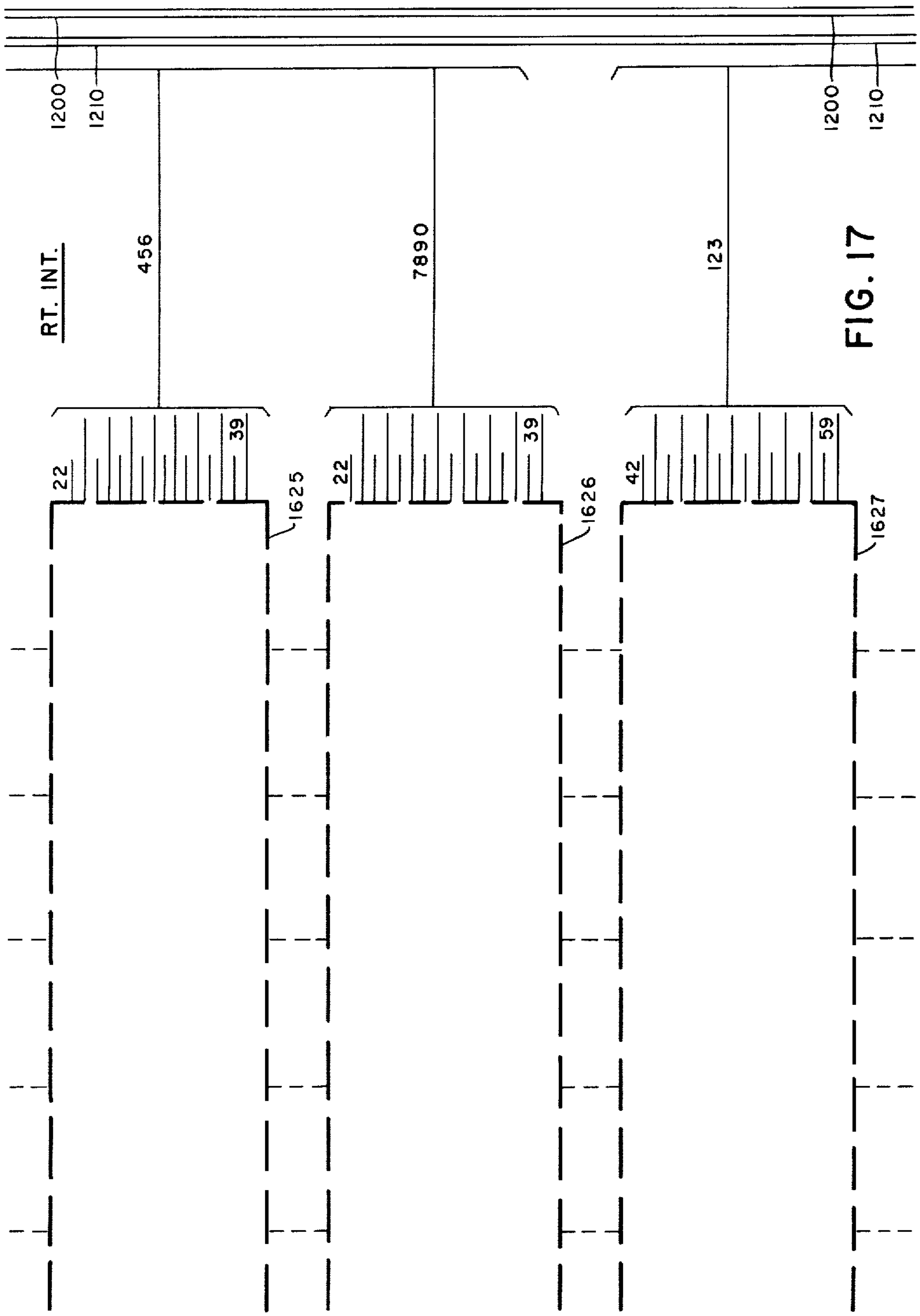
Figure 18:
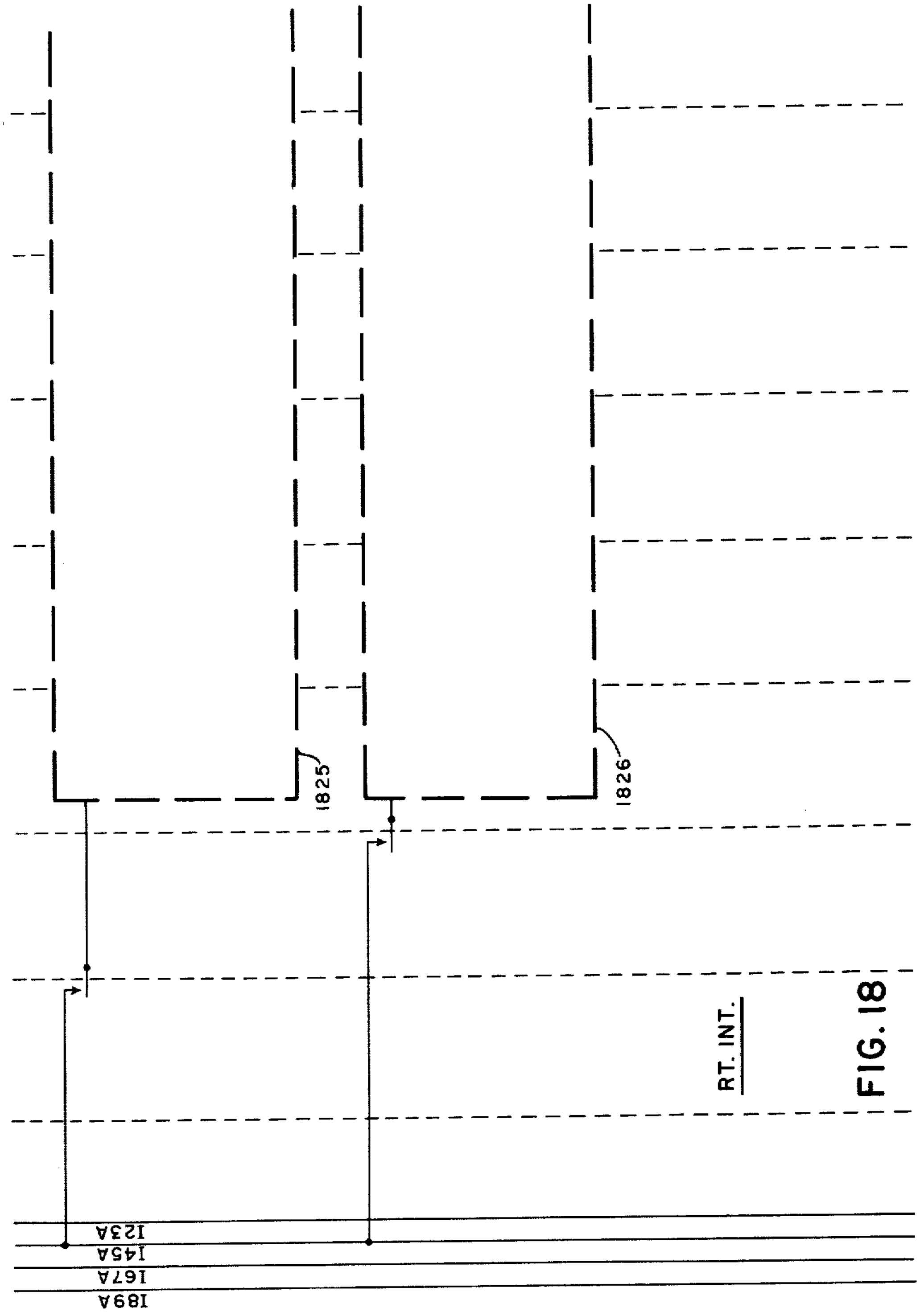
Figure 19:
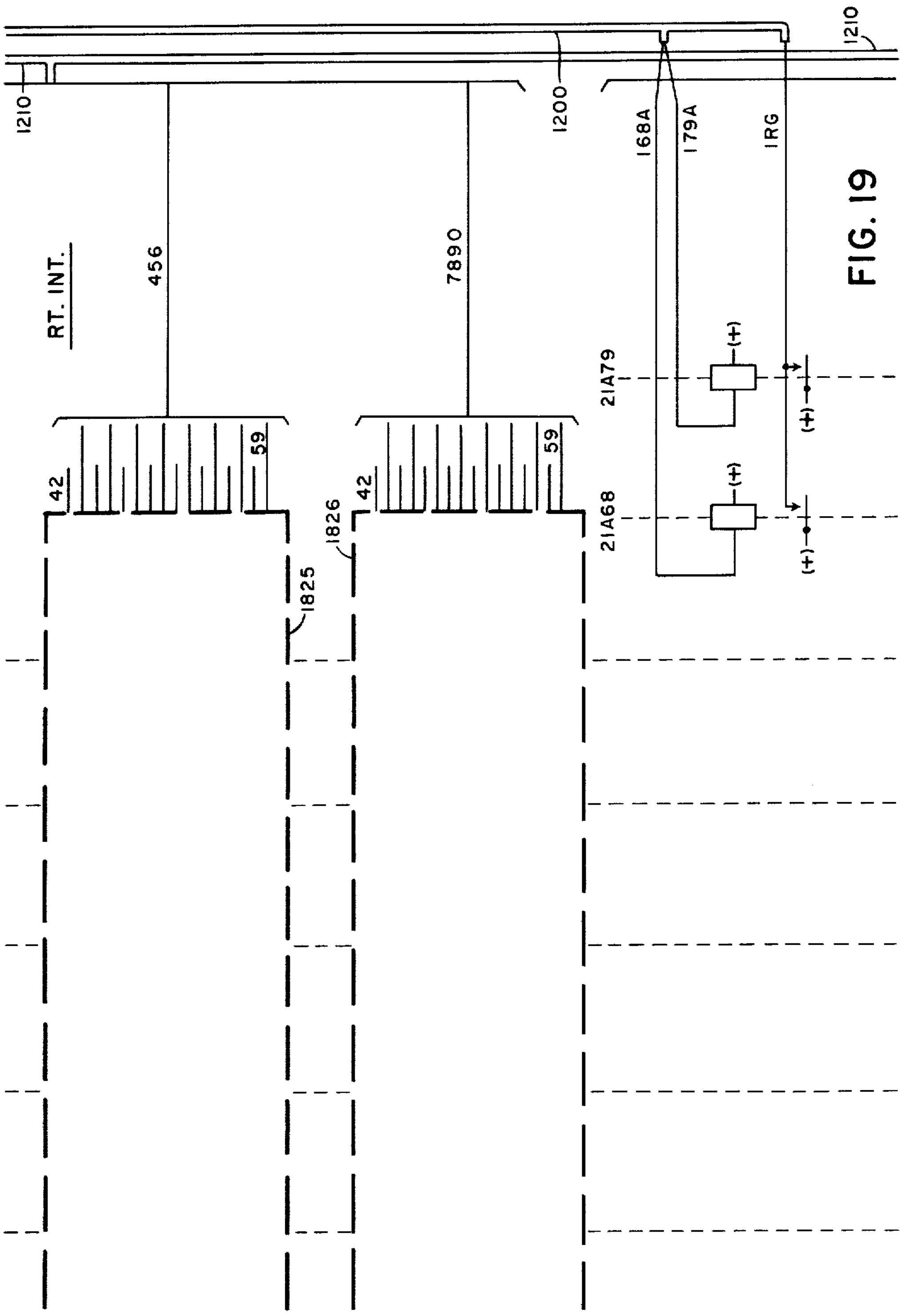
Figure 20:
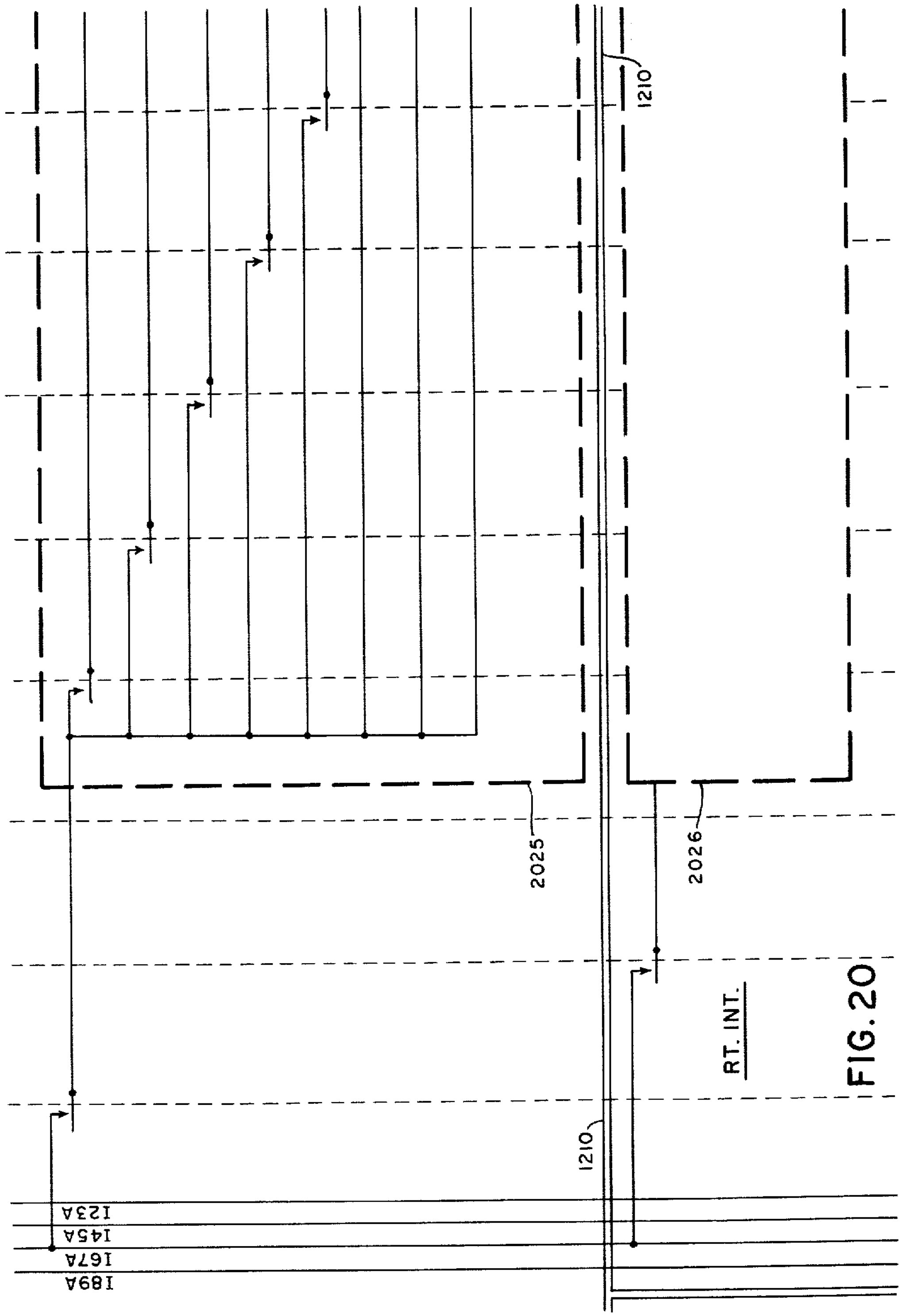
Figure 21:
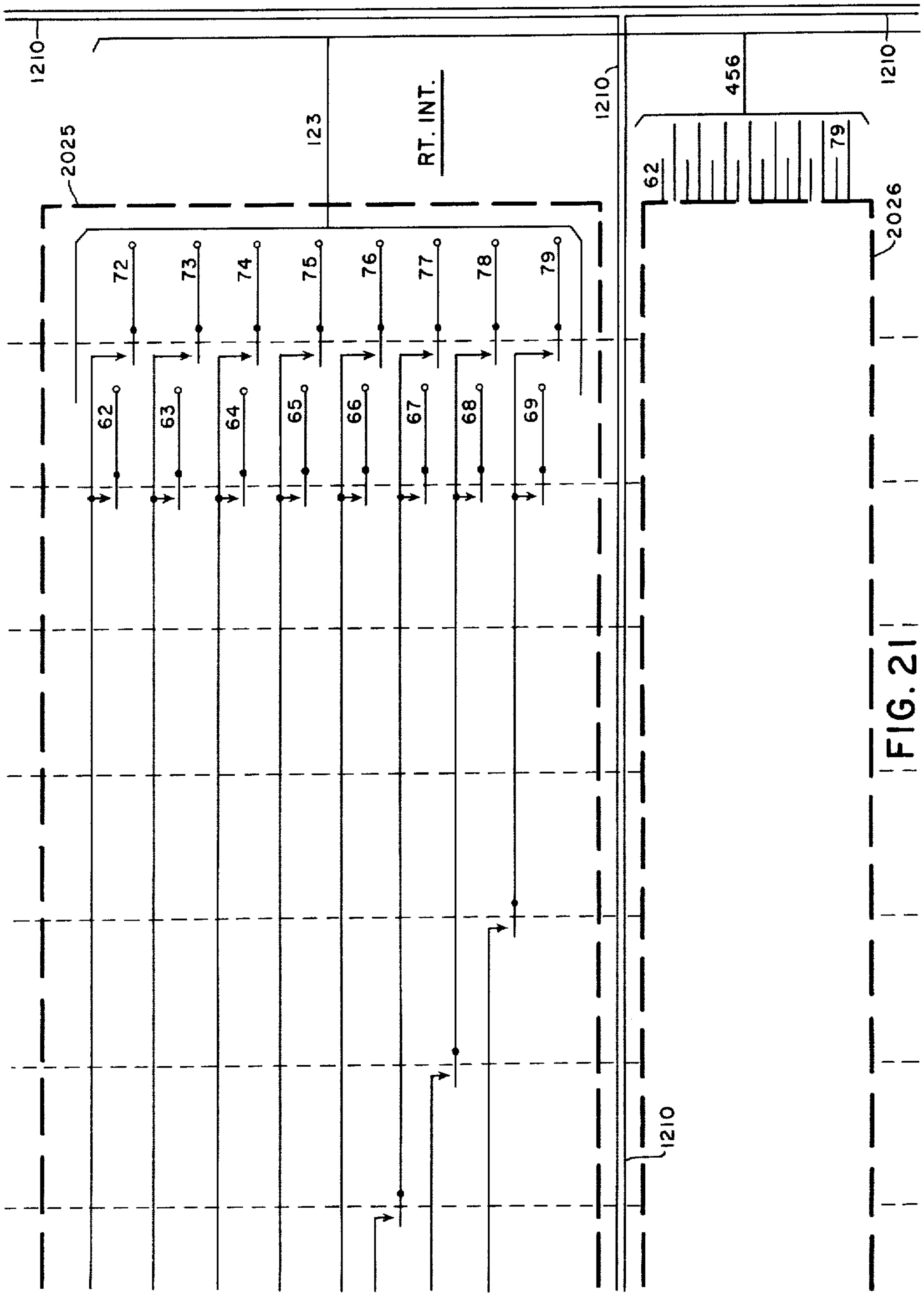
Figure 22:
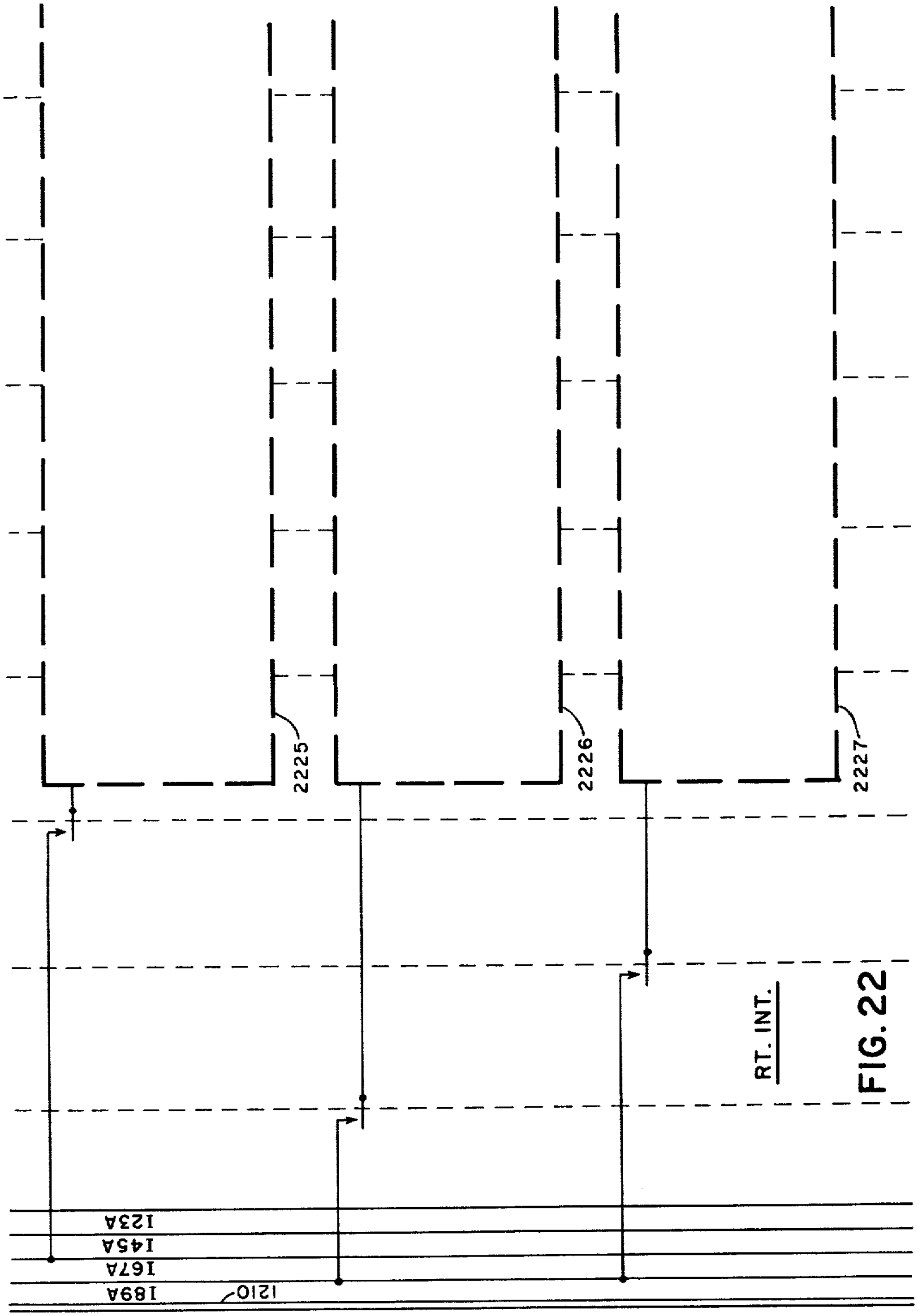
Figure 23:
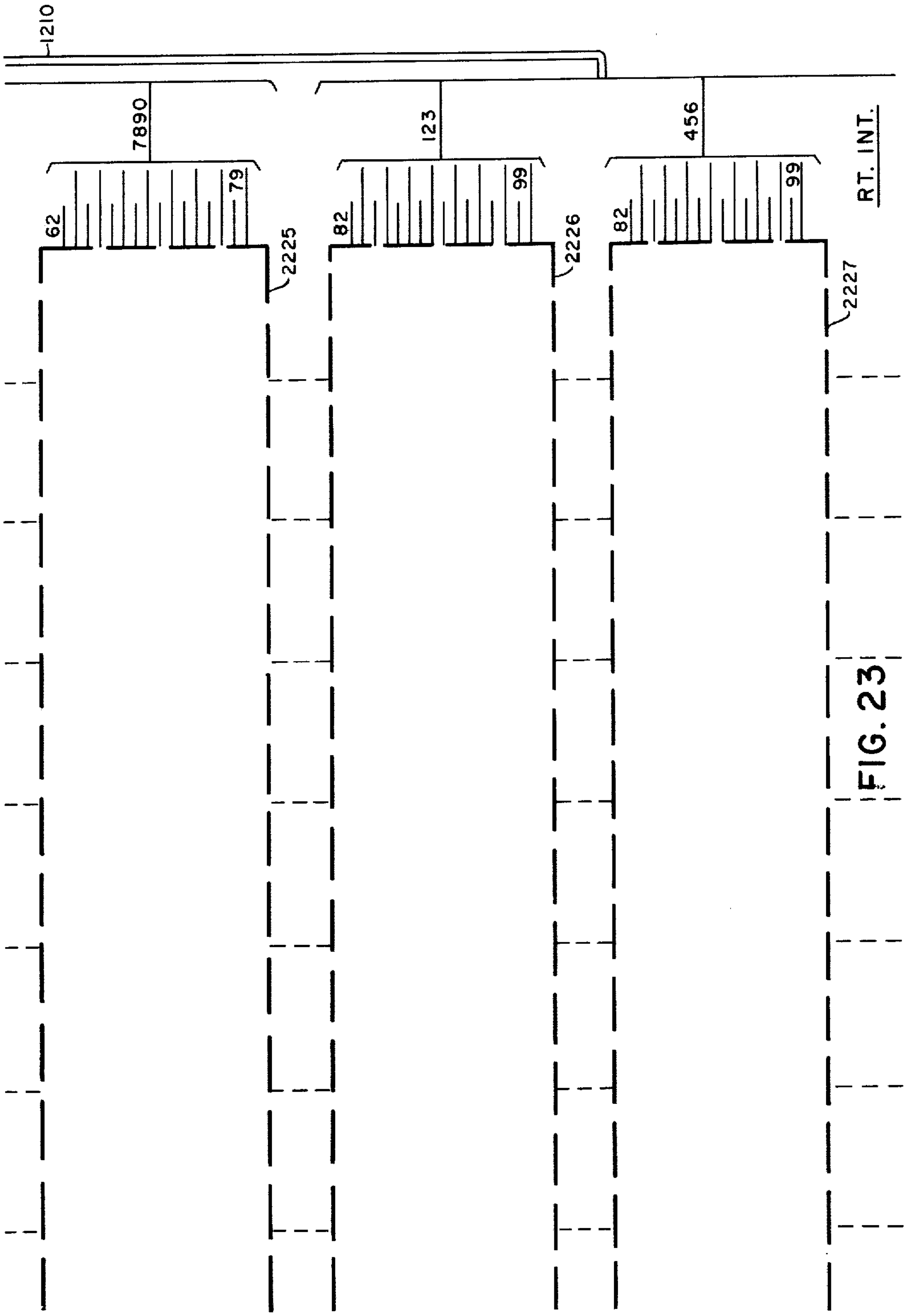

FIGS. 2–9, joined together as shown in FIG. 28, schematically illustrate in detail the register sender forming part of the present invention;

FIGS. 10–27, joined together as shown in FIG. 28, schematically illustrate the route interpreter incorporated as the translator in the present invention; and FIG. 28 shows the manner in which FIGS. 2–27 are to be joined.

GENERAL ARRANGEMENT OF SYSTEM

1. *Trunking Facilities*

Figure 1:
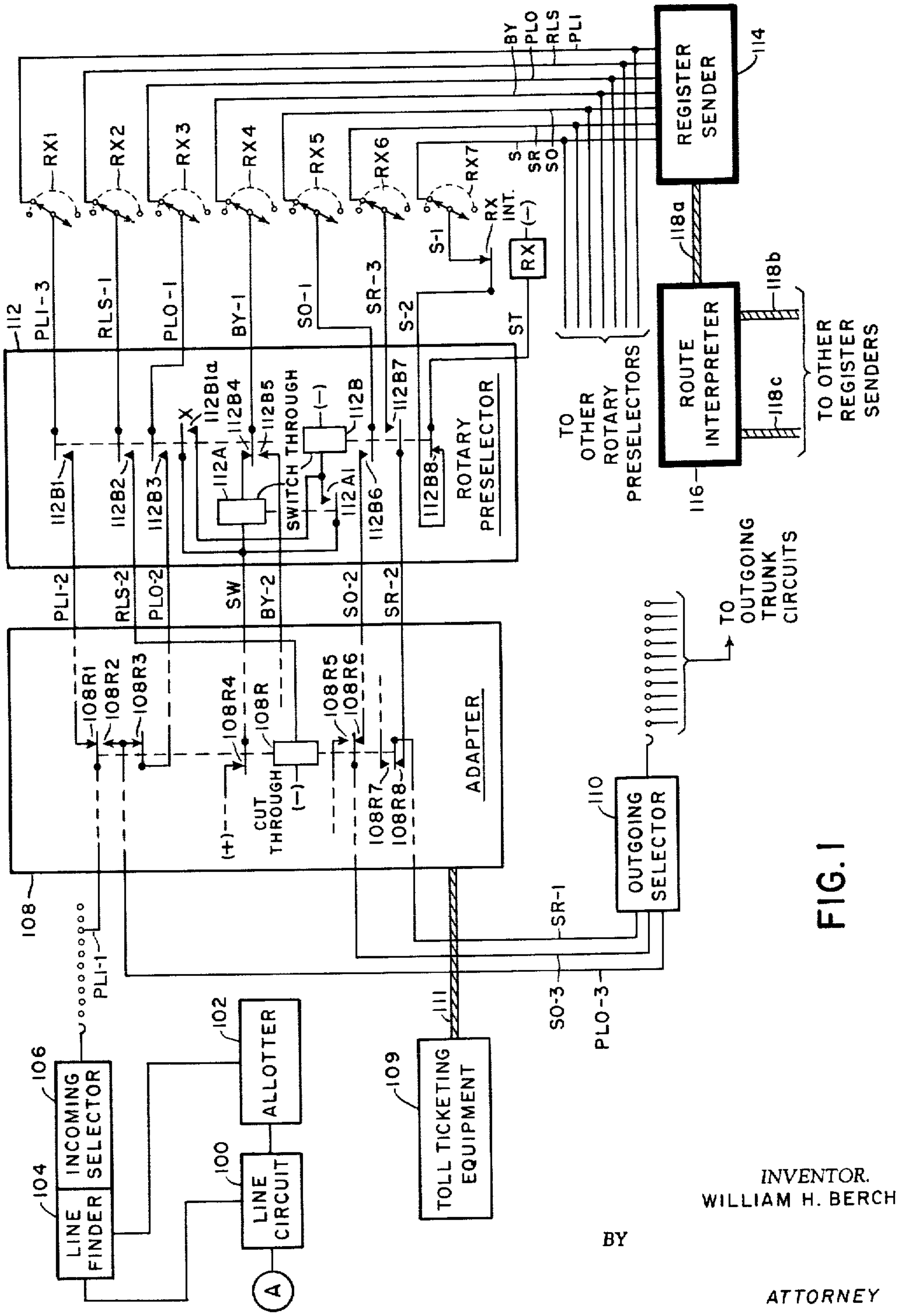
FIG. 1 is a block diagram of the pertinent portions of a telephone system incorporating the present invention.
Figure 1A:
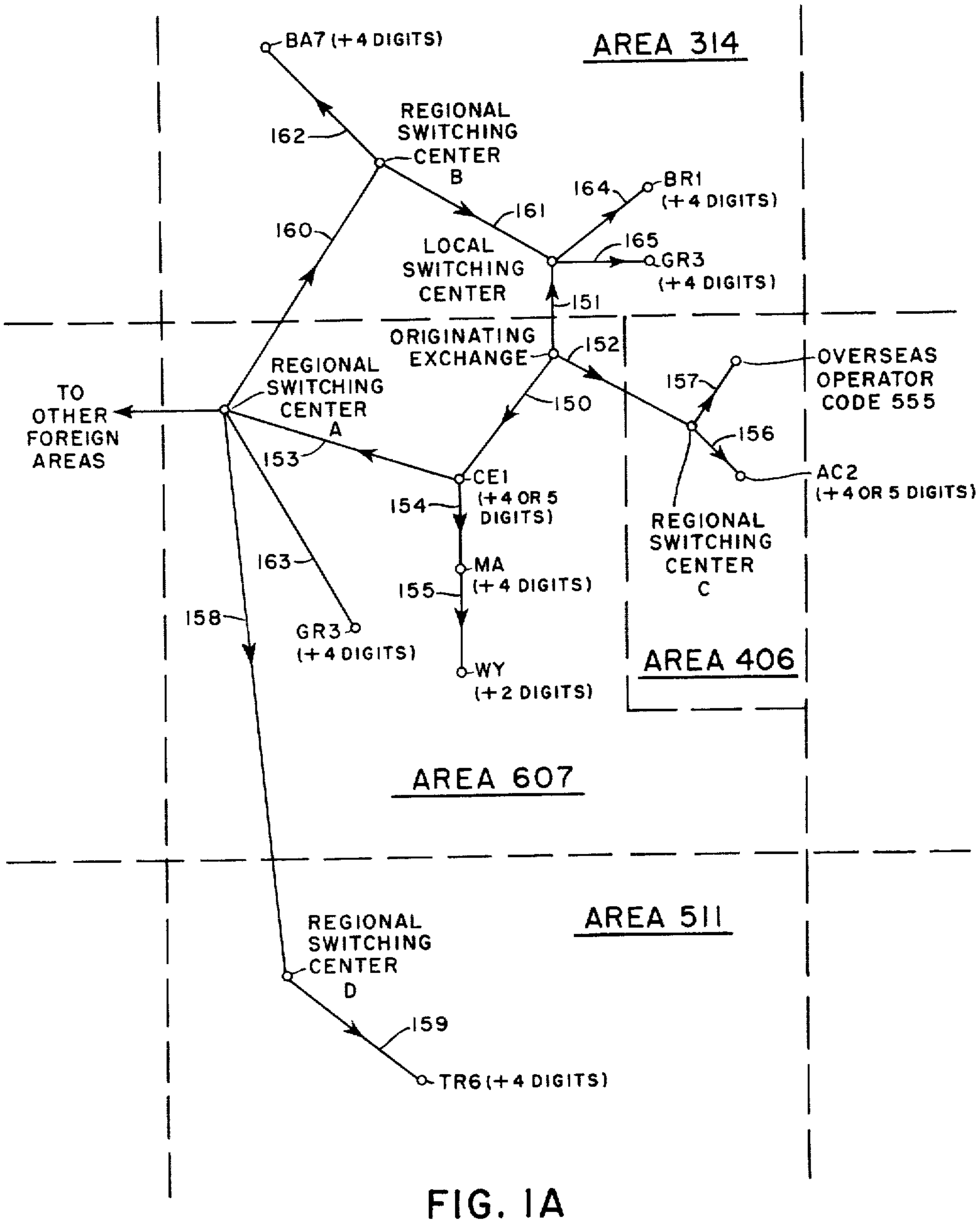
FIG. 1A is a hypothetical trunking diagram used to help explain the present invention.

Referring will now be made to FIG. 1A, which is a hypothetical trunking diagram. Since the trunking diagram of FIG. 1A has been prepared solely for the purpose of illustrating the various operating capabilities of the routing means of the present invention, it is somewhat artificial and simplified compared to actually-used trunking facilities. However, each of the operating capabilities of the routing means illustrated in the trunking diagram of FIG. 1A may be made use of in a more complex and realistic trunking situation.

As shown in FIG. 1A, there is an originating exchange which is located in area 607. All the routing means of the present invention are located at this originating exchange. The originating exchange may merely serve calling subscribers thereof, or it may serve as well calling subscribers of tributaries of the originating exchange (not shown) which have access to the routing means at the originating exchange, so that calling subscribers of the tributary offices may use the routing means at the originating exchange for making direct distance dialed toll calls in the same manner as calling subscribers of the originating exchange itself. In order to simplify the disclosure, it will be assumed henceforth that the calling subscriber is a subscriber of the originating exchange, but it should be understood that what is said applies with equal force to the calling subscriber of a tributary of the originating exchange.

Emanating from the originating exchange are three trunks, 150, 151 and 152. Trunk 150 extends to a Central 1 exchange, designated by the office code CE1, which is located in the same area, 607, as the originating exchange. Trunk 151 extends to a local switching center in area 314 which has access over trunk 164 to a Browning 1 exchange, designated by the office code ER1, and over trunk 165 to a Greenfield 3 exchange, designated by the office code GR3, both of which are located in area 314. Trunk 152 extends to regional switching center C located in area 406. Regional switching center C has access over trunk 156 to an Academy 2 exchange, designated by the office code AC2, and over trunk 157 to an overseas operator, who is designated by the code 555. Both the Academy 2 exchange and the overseas operator are located in area 406.

Emanating from the Central 1 exchange are trunks 153 and 154. Trunk 153 extends to regional switching center A located in the same area, 607, as the originating exchange. Trunk 154 extends to a Main exchange, designated by the office code MA, which is located in the same area, 607, as the originating exchange. Emanating from the Main exchange is a trunk 155 which extends to a Wyoming exchange, designated by the office code WY, which is also located in the same area, 607, as the originating exchange.

Emanating from regional switching center A are trunks 158, 160, 163 as well as trunks to other foreign areas not shown in FIG. 1A. Trunk 158 extends to regional switching center D located in area 511 which has access over trunk 159 to a Trafalgar 6 exchange, designated by the office code TR6, located in area 551. Trunk 160 extends to regional switching center B located in area 314 which has access over trunk 161 to the aforementioned local switching center in area 314, and which has access over trunk 162 to a Baker 7 exchange, designated by the office code BA7, located in area 314. Trunk 163 extends to a Greenfield 3 exchange, designated by the office code GR3, located in the same area, 607, as the originating exchange.

It is assumed, for the purposes of this disclosure, that one of the previously discussed 4A crossbar systems is located only at each of the regional switching centers.

It will be noted that the office codes of exchanges located within any one area are different from each other, so that there is no ambiguity therebetween. However, exchanges located within different areas may be designated by the same office code, such as the two Greenfield 3 exchanges one of which is located in area 314 and the other of which is located in the same area, 607, as the originating exchange.

Also shown in FIG. 1A are the number of digits in the directory number of each station in each exchange. As shown, the Baker 7, Trafalgar 6, Main and Browning 1 exchanges, as well as both Greenfield 3 exchanges, each have four digits in each directory number thereof. The Central 1 and Academy 2 exchanges include some directory numbers having four digits and some directory numbers having five digits. This is the case where an extra digit is used to identify parties on a party line. The Wyoming exchange, which is assumed to be a very small rural exchange, has, as shown, a directory number of only two digits in addition to its office code for each station.

2. *Operation of Apparatus at Originating Exchange in Extending and Routing a Call*

The routing means of the present invention, located at the originating exchange, which is capable of routing calls to called subscribers of any of the exchanges shown in FIG. 1A, will now be described.

Referring to FIG. 1, there is shown the pertinent portion of the telephone system, incorporating the routing means of the present invention, located in the originating exchange. Shown in FIG. 1 is the telephone of calling subscriber A of the originating exchange which is connected to line circuit 100 of the originating exchange. As is well known in the art, in response to an off-hook condition of the telephone of calling subscriber A, line circuit 100 will be operated to cause allotter 102 to operate line finder 104 to find line circuit 100, thereby extending a connection from the telephone of calling subscriber A to incoming selector 106 to effect the seizure thereof. Should calling subscriber A with to make a toll call, he will dial one or more required access digits, such as the digit 8, thereby extending the connection to one of a group of adapters, such as adapter 108, to effect the seizure thereof.

Adapter 108 is an involved circuit used to supply billing data to toll ticketing equipment 109 over cable 111; as well as acting as a link between the calling subscriber and the routing means, the routing means and the outgoing switch train, and the calling subscriber and the outgoing switch train. Since the adapter itself does not form part of the present invention, only that portion thereof which is necessary to understand the present invention has been shown.

After seizing adapter 108, it may or may not be necessary, in accordance with the toll ticketing portion of the system, for the calling subscriber to dial a party identifying digit. Adapter 108 operates in a manner which need not concern us to supply this information to the toll ticketing equipment. In any case, ultimately adapter 108 directly or indirectly couples incoming pulsing conductor PLI–1 to incoming pulsing conductor PLI–2 through normal contacts 108R1 of cutthrough relay 108R, and places a ground (not shown) on incoming pulsing conductor PLI–2. At the same time ground is applied to switching conductor SW through normal contacts 108R4 of cutthrough relay 108R.

Before the further extension of the connection can be discussed, it is necessary to describe to some extent rotary preselector 112 and the routing means of the present invention, which consists of a plurality of register senders, such as register sender 114, and a common route interpreter 116.

Individually associated with each adapter, such as adapter 108, is a rotary preselector 112 incorporating a rotary switch having seven banks, designated RX1–RX7, respectively. As shown, the seven conductors PLI, RLS, PLO, BY, SO, SR and S emanating from register sender 114 are connected respectively to a given level of each rotary bank RX1–RX7. In addition, these seven conductors are multipled to the same given level of the rotary banks of the rotary preselectors individually associated with all the other adapters in the group of adapters. Similarly, the corresponding seven conductors of each of the other register senders in the group of register senders are connected to separate respective levels of the rotary banks of all the rotary preselectors. In this manner, any adapter in the group of adapters is associable by means of the rotary preselector individual thereto with any of the register senders in the group of register senders. Further, it will be seen that it is possible for the wipers of more than one rotary preselector to be connected to the same level, so that more than one adapter is connected to the same register sender.

The detailed structure of a register sender, such as register sender 114, will be described below. It is sufficient hereto merely state that an idle register sender is manifested by a resistance battery marking on the BY conductor and an absence of ground marking on the S conductor emanating therefrom; while a busy register sender is manifested by an absence of resistance battery on the BY conductor and a ground marking on the S conductor.

Continuing now with the progress of the call under discussion, it will be remembered that ground has been applied to conductor SW through normal contacts 108R4 of cutthrough relay 108R. As shown, conductor SW is connected to one side of switchthrough relay 112A. Assuming register sender 114 to be busy at this time, an absence of resistance battery marking is returned over busy conductor BY and is extended through rotary bank RX4, conductor BY1 and normal contacts 112B4 of switchthrough relay 112B to the other side of switchthrough relay 112A. Therefore, switchthrough relay 112A will remain unenergized and will not be operated. However, a ground marking will be present on sleeve conductor S of busy register sender 114, and will be extended through rotary bank RX7, conductor S–1, rotary switch interrupter contacts RXINT, conductor S2, normal contacts 112B8 of switchthrough relay 112B, start conductor ST and motor magnet RX of the rotary switch to grounded battery, thereby energizing motor magnet RX. In response to the energization thereof, motor magnet RX opens interrupter contacts RXINT thereof, thereby breaking the energizing path therefor. Motor magnet RX therefore restores, and in so doing moves the respective wipers of rotary banks RX1–RX7 to the next level thereof, thereby connecting adapter 108 to the next register sender in the group of register senders. If this next register sender is also busy, the process is repeated until adapter 108 is connected to an idle register sender.

It will be noted that the operation of motor magnet RX in response to a busy register sender is in no way dependent upon ground being applied to switch conductor SW by a call in progress, but depends solely upon the presence of a ground marking on sleeve conductor S. Therefore, should more than one adapter in the group of adapters be connected to the same register sender by virtue of the fact that the rotary preselectors thereof are sitting on the same level, the seizure of this register sender, in a manner described in detail below, by one of these adapters results in a ground marking being applied to the sleeve conductor S of this register sender. In response to this ground marking on conductor S, the other adapters connected to this register sender are "kicked-off" in the manner described above.

Assume now that register sender 114 is idle at the time ground is applied through one side of switchthrough relay 112A through conductor SW by the call under discussion. In this case, switchthrough relay 112A will be operated by resistance battery returned to the other side thereof from register sender 114 over busy conductor BY, rotary bank RX4, conductor BY–1 and normal contacts 112B4 of switchthrough relay 112B. In response to the operation thereof, switchthrough relay 112A closes normally open contacts 112A1 thereof to provide an operating path for switchthrough relay 112B extending from the ground on conductor SW through operated contacts 112A1 and switchthrough relay 112B to grounded battery. Therefore, switchthrough relay 112B operates, first closing normally open preliminary contacts 112B1*a* thereof to provide a holding path therefor extending from the ground on conductor SW through operated contacts 112B1*a* and switchthrough relay 112B to grounded battery, and then closes normally open contacts 112B1, 112B2, 112B3, 112B5, 112B6 and 112B7 thereof and opens normally closed contacts 112B4 and 112B8 thereof.

The opening of contacts 112B4 breaks the previously described operating path for switchthrough relay 112A, causing this relay to restore. The closure of contacts 112B1 forwards the previously described ground on conductor PLI–2 to register sender 114 over the connection extending through operated contacts 112B1, conductor PLI–3, rotary bank RX1 and conductor PLI. Register sender 114 is seized in response to the ground forwarded over conductor PLI. In response to the seizure of register sender 114, resistance battery is removed from busy conductor BY and ground is applied to sleeve conductor S, as previously described. However, the motor magnet RX of rotary preselector 112 is not operated in this case in response to the ground on sleeve conductor S, since the operating path for motor magnet RX is now opened at operated contacts 112B8.

At this point, the calling subscriber commences to dial the necessary digits required to extend the call to the called subscriber, including the area code, if any, the office code and directory number of the called subscriber. Each dial pulse causes the ground present on incoming pulse conductor PLI to be momentarily broken. This is accomplished in any manner well known in the art, such as by a pulse repeater in incoming selector 106 or in adapter 108, for instance.

The structure and operation of register sender 114 and route interpreter 116 will be described in detail below. However, briefly, register sender 114 includes means for registering the dialed digits applied thereto over conductor PLI. If register sender 114 should recognize an obviously wrong dialed digit, such as a first digit having the value 0 or 1, a ground marking will be applied to busy conductor BY, which will be returned to adapter 108 over a connection extending through rotary switch bank RX4, conductor BY–1, operated contacts 112B5 of switchthrough relay 112B and conductor BY–2, where it will operate busy means, not shown, in adapter 108. This busy means is effective in causing the return of busy tone to calling subscriber A and in removing ground from conductor SW. Since the holding ground for switchthrough relay 112B is obtained over conductor SW, the removal of ground therefrom will cause switchthrough relay 112B to restore, releasing the connection extended to register 114.

Assuming, however, that no obviously wrong number is dialed, register sender 114 will, in response to the registering of the first three digits, call in route interpreter 116 to obtain a translation thereof. Assuming that the first three digits represent a valid code, a certain one, in accordance with the translation, of the class relays in register sender 114 will be operated. Assuming further that no second translation is required, a ground marking will be applied to outpulsing conductor PLO and outpulsing will be commenced thereover. Outgoing selector 110 is seized in response to the ground marking on outpulsing conductor PLO over a connection extending through rotary bank RX3, conductor PLO–1, operated contacts 112B3 of switchthrough relay 112B, conductor PLO–2, normal contacts 108R3 of cutthrough relay 108R, and conductor PLO–3. Since some selectors require a holding ground, ground is forwarded to selector 110 over a connection extending from conductor SO through rotary bank RX5, conductor SO–1, operated contacts 112B6, conductor SO–2, normal contacts 108R6, and conductor SO–3. Outgoing selector 110, in accordance with the first outpulsed digit applied thereto selects a trunk circuit (not shown) of one of a plurality of outgoing trunks emanating from the originating exchange, such as trunks 150, 151 or 152 shown in FIG. 1A. The remaining outpulsed digits which are transmitted through outgoing selector 110 and the selected outgoing trunk, control the further extension of the connection.

In case a second translation by route interpreter 116 is required, a ground marking is applied to outpulsing conductor PLO and outgoing sleeve conductor SO, and pulsing is commenced over outpulsing conductor PLO, subsequent to the registering of the sixth dialed digit, rather than the third dialed digit. This is the only respect in which outpulsing for a call which requires two translations differs from outpulsing for a call that requires only one translation.

As previously mentioned, a call may be extended to a 4A crossbar routing system located at regional switching center. In this case, it is possible that information will be outpulsed from register sender 114 to the 4A crossbar switching system over outgoing selector 110 and the outgoing trunk before the 4A crossbar system is prepared to receive it. Should this situation develop, the 4A crossbar system will return a stop-dial signal to outgoing sigtor 110 of the originating exchange. This stop-dial signal will be applied by outgoing selector 110 to supervisory conductor SR–1, which is connected as shown to normal contacts 108R8 of cutthrough relay 108R, conductor SR–2, operated contacts 112B7 of switchthrough relay 112B, conductor SR–3, rotary bank RX6 and supervisory conductor SR to register sender 114. In response to the stop-dial signal, the register sender 114 will wait until the stop-dial signal is removed before outpulsing the next digit.

Another situation which may develop in extending the connection is that a busy condition exists. In this case, a busy indicating supervisory signal will be returned over the previously described path to the supervisory conductor SR of register sender 114. In response thereto, register sender 114 will stop outpulsing and remove the ground marking from outpulsing conductor PLO and outgoing sleeve conductor SO, thereby releasing outgoing selector 110 and the forward switch train. If an alternate route exists, the ground marking on these conductors will be replaced after a short interval, to thereby reseize outgoing selector 110, and outpulsing of the alternate route digits will commence over outpulsing conductor PLO. If no alternate route exists, register sender 114 will place a ground marking on the busy conductor BY, which, as previously described, will cause the connection to the register sender to be released and busy tone to be returned to the calling subscriber.

Should register sender 114 succeed in outpulsing all the digits required to route the call to its destination, without encountering a busy signal, it will then place a ground marking on release conductor RLS. The ground marking on release conductor RLS is extended through rotary bank RX2, conductor RLS–1, operated contacts 112B2 of switchthrough relay 112B, conductor RLS–2 and cutthrough relay 108R to grounded battery. In response thereto, cutthrough relay 108R will operate to close normally open contacts 108R2, 108R5 and 108R7 thereof and to open normally closed contacts 108R1, 108R3, 108R4, 108R6 and 108R8 thereof.

The opening of contacts 108R4 of cutthrough relay 108R removes ground from switch conductor SW, thereby breaking the previously described holding path for switchthrough relay 112B. Therefore, switchthrough relay 112B restores causing register sender 114 to be released. The closure of contacts 108R2 connects incoming selector 106 to outgoing selector 110. The closure of contacts 108R5 of cutthrough relay 108R connects outgoing sleeve conductor SO–3 to means, not shown, in adapter 108 which control the maintenance of the connection through outgoing selector 110. The closure of contacts 108R7 of cutthrough relay 108R connects supervisory conductor SR–1 to means, not shown, in adapter 108 responsive to answer supervision signals which may be transmitted over conductor SR–1.

Thus, it will be seen from the foregoing that the apparatus shown in FIG. 1 provides means for initially interconnecting the incoming switch train to one of a group of register senders and for interconnecting this register sender with an outgoing switch train. The register sender controls the extension of the connection to its destination over the outgoing switch train in response to dialed digits applied thereto over the incoming switch train. In response to the extension of the connection to its destination being completed, the register sender is released and the incoming switch train is connected directly to the outgoing switch train. Furthermore, if, for one reason or another, the extension of the connection to its destination cannot be completed, the register sender is released and busy tone is returned to the calling subscriber over the incoming switch train.

DETAILED DESCRIPTION

Reference will now be made to FIGS. 2–27, which show in detail the structure of one of the group of register senders, such as register sender 114, and route interpreter 116, which together comprise the routing means of the present invention.

A. *Registration*

1. SEIZURE OF REGISTER SENDER 114

Figure 2:
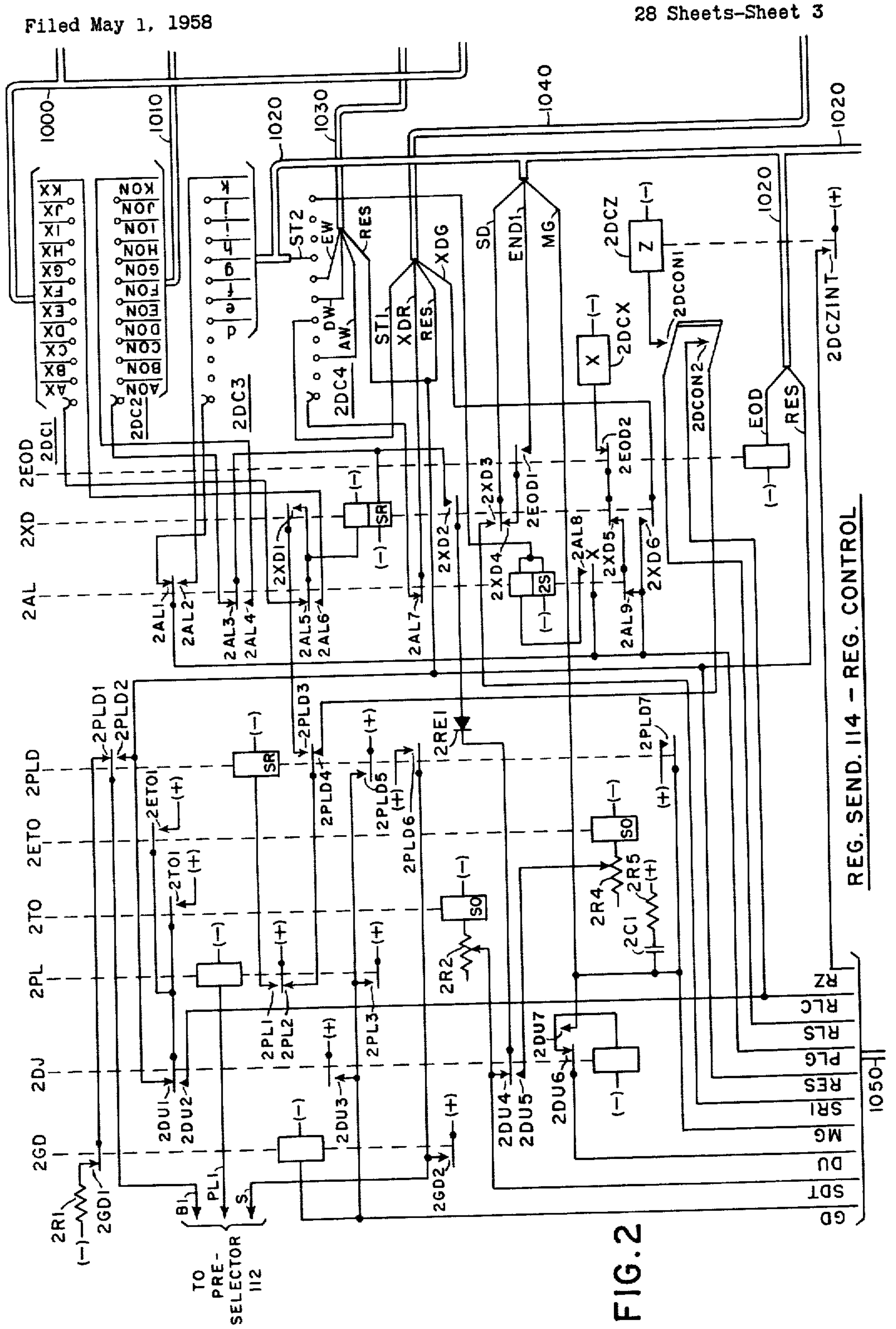

Referring first to FIG. 2, which shows the register control portion of register sender 114, a resistance battery marking, indicative of an idle register sender, is applied to busy conductor BY over a connection extending from grounded battery through resistance 2R1, normal contacts 2GD1 of guard relay 2GD, and normal contacts 2PLD1 of pulse delay relay 2PLD. As previously described, this resistance battery marking on conductor BY permits preselector 112 to switch a call in progress through to register sender 114, resulting in ground being forwarded over conductor PLI. In response to this ground being forwarded over conductor PLI, pulsing relay 2PL is operated over a path extending from conductor PLI through relay 2PL to grounded battery.

In operating, relay 2PL closes normally open contacts 2PL1 and 2PL3 thereof, and opens normally closed contacts 2PL2 thereof. The closure of normally open contacts 2PL1 completes an energizing path for pulse delay relay 2PLD extending from ground through operated contacts 2PL1 and relay 2PLD to grounded battery, causing relay 2PLD to operate. The closure of contacts 2PL3 applies ground to guard conductor GD and completes a path for operating guard relay 2GD.

In operating, relay 2GD opens normally closed contacts 2GD1 thereof and closes normally open contacts 2GD2 thereof. The opening of contacts 2GD1 breaks the previously described path for applying resistance battery to conductor BY. The closure of contacts 2GD2 causes ground to be applied to sleeve conductor S, as shown.

In response to the operation of relay 2PLD, normally closed contacts 2PLD1 and 2PLD4 thereof are opened and normally open contacts 2PLD2, 2PLD3, 2PLD5, 2PLD6 and 2PLD7 thereof are closed. The opening of contacts 2PLD1 further breaks the previously described path for applying resistance battery to conductor BY. The closure of contacts 2PLD5 applies an alternate ground to conductor GD and to relay 2GD. The closure of contacts 2PLD6 applies an additional ground to sleeve conductor S. The closure of contacts 2PLD7 applies ground to master ground conductor MG.

Figure 5:
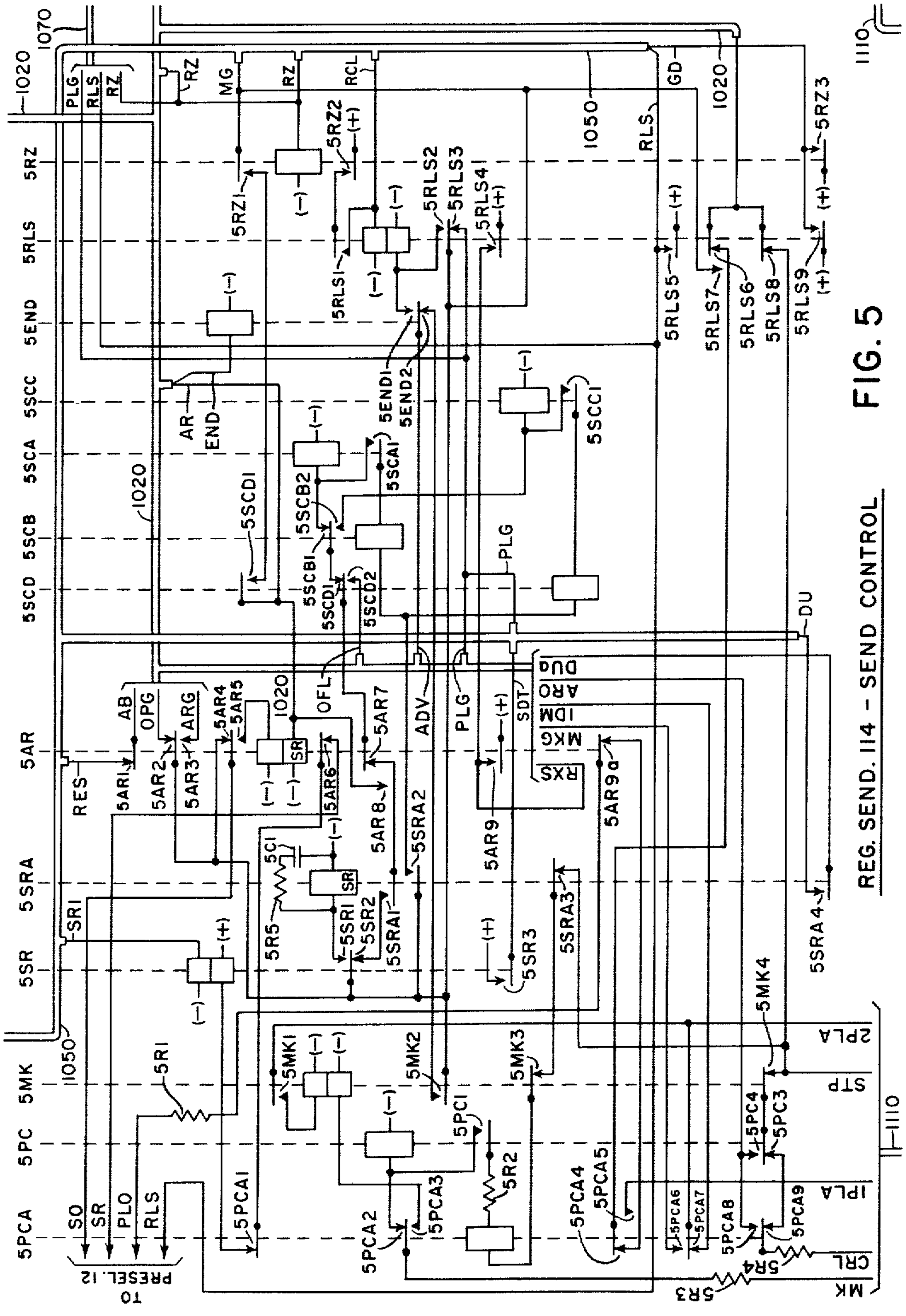

Master ground is forwarded over conductor MG through cable 1050 to FIG. 5, which shows the sender control portion of register sender 114. In FIG. 5, master ground is applied through normal contacts 5RLS3 of release relay 5RLS to pulse ground conductor PLG and through normal contacts 5AR2 to outpulsing ground conductor OPG. The ground present on conductor PLG hereinafter will be referred to as pulse ground and the ground present on conductor OPG will hereinafter be referred to as outpulsing ground.

Pulse ground is returned to FIG. 2 over conductor PLG through cable 1050, where it is applied, as shown, through normal contacts 2AL9, 2XD5, 2EOD2, and motor magnet 2DCX of a digit counting switch to grounded battery, thereby energizing motor magnet 2DCX.

In response to the energization thereof, motor magnet 2DCX operates, and in so doing causes the wipers of banks 2DC1, 2DC2, 2DC3 and 2DC4, respectively, of the digit counting switch to be stepped to the first or A level thereof.

Figure 3:
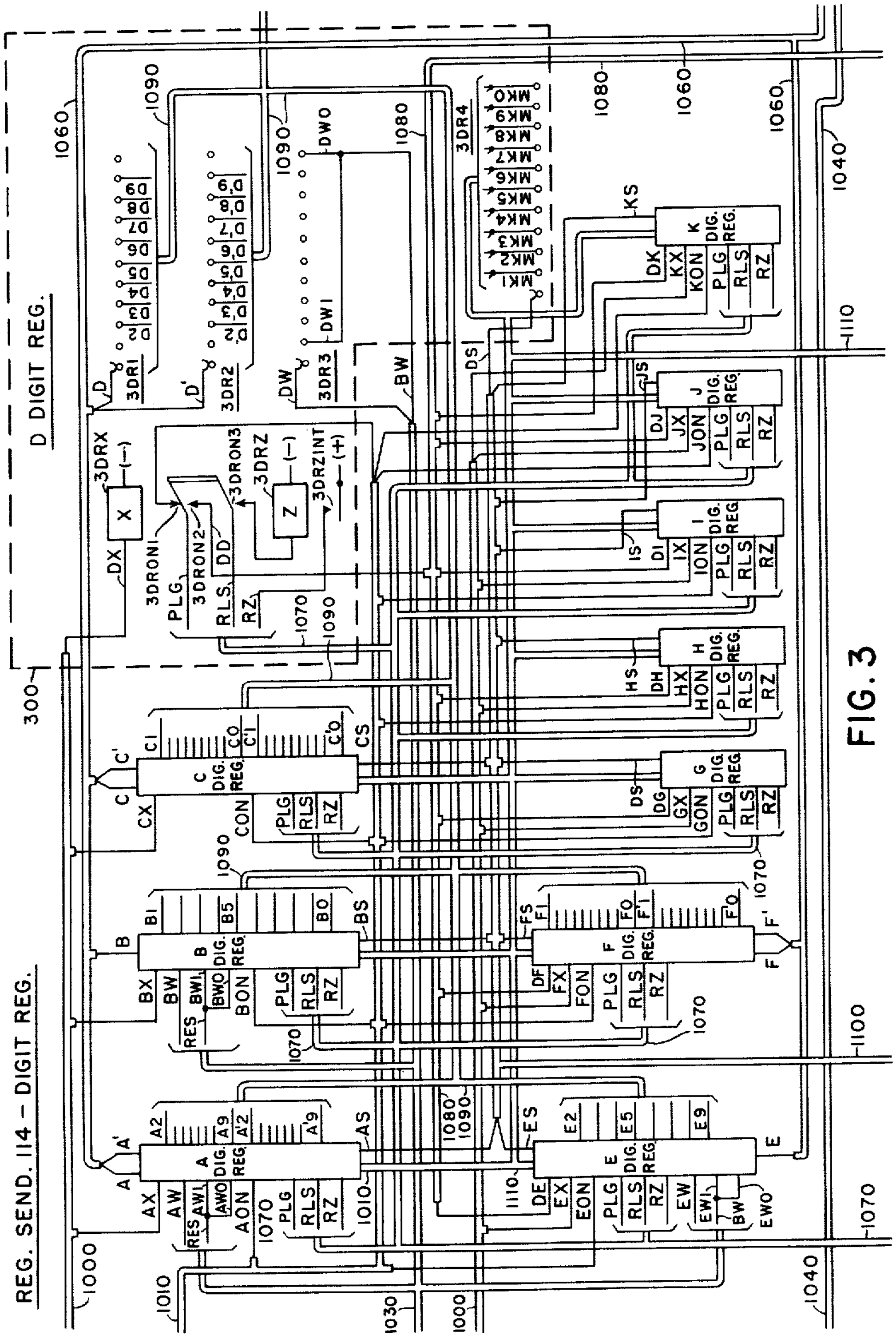

Before going on, it is necessary to refer for a moment to FIG. 3, which shows the digit register portion of register sender 114. FIG. 3 includes eleven registers, designated A–K, inclusive, only the D digit register being shown in detail. As shown, the D digit register, which is contained within outlined box 300, comprises a stepping switch including motor magnet 3DRX, release magnet 3DRZ, release magnet interrupter contacts 3DRZINT, one normally closed off-normal contact 3DRON1, two normally open off-normal contacts 3DRON2 and 3DRON3, respectively, and four switch banks 3DR1, 3DR2, 3DR3 and 3DR4, respectively. Motor magnet 3DRX is energized by a signal applied thereto over conductor DX. Release magnet 3DRZ is energized by a signal applied thereto over conductor RLS through off-normal contacts 3DRON3. Ground is applied to conductor RZ through interrupter contacts 3DRZINT. Pulse ground, which is forwarded to FIG. 3 from FIG. 5 over conductor PLG through cable 1070, is applied to conductor DON through normally closed off-normal contacts 3DRON1 and is applied to conductor DD through normally open off-normal contacts 3DRON2.

Switch bank 3DR1 has the wiper thereof connected to conductor D and levels 2–9 thereof connected to conductors D2–D9, respectively. Levels 1 and 0 of switch bank 3DR1 are not connected. Switch bank 3DR2 has the wiper thereof connected to conductor D′ and has levels 2–9 thereof connected to conductors D′2 to D′9 respectively. Levels 1 and 0 of switch bank 3DR2 are not connected. Switch bank 3RD3 has the wiper thereof connected to conductor DW and has levels 1 and 0 thereof connected to conductors DW1 and DW0, respectively. Levels 2–9 of switch bank 3DR3 are not connected. Switch bank 3DR4 has the wiper thereof connected to conductor DS and has levels 1–0 thereof connected respectively to conductors MK1–MK0.

Each of digit registers A–C and E–K, which are shown only in block form, includes a stepping switch, which corresponds identically to the stepping switch, shown in detail, of the D digit register. The wiring of each of digit registers A–C and E–K correspond generally to the wiring, shown in detail, of the D digit register. However, there exists the following omissions and/or additions in the wiring of each of digit registers A–C and E–K, with respect to the wiring, shown in detail, of the D digit register:

In each of digit registers A, B and C, the conductor corresponding to conductor DD in the D digit register is omitted, so that the normally open off-normal contacts of each of the A, B and C digit registers, corresponding to off-normal contacts 3DRON2 of the D digit register, is not wired. Although the 1 and 0 levels of switch bank 3DR1 of the D digit register are not wired, and 1 and 0 levels of the switch bank corresponding to 3DR1 of each of digit registers B, C and F are wired to provide conductors B1, B0, C1, C0, F1 and F0, respectively. In each of digit registers G–K, inclusive, the switch bank thereof corresponding to 3DR1 is not wired at all.

Although the 1 and 0 levels of switch bank 3DR2 of the D digit register are not wired, the 1 and 0 levels of the switch bank of each of digit registers C and F corresponding to bank 3DR2 are wired to provide conductors C′1, C′0, F′1 and F′0, respectively. The switch bank of each of digit registers B, E, and G–K, inclusive, corresponding to switch bank 3DR2 of the D digit register, is not wired at all.

The switch bank of each of digit registers C and F–K, inclusive, corresponding to switch bank 3DR3 of the D digit register is not wired at all.

Each of conductors MK1–MK10, inclusive, connected as shown to the 1–0 levels inclusive of switch bank 3DR4 of the D digit register, is also multipled through cable 1110 to the corresponding levels of that switch bank of each of digit registers A–C and E–K which corresponds to switch bank 3DR4 of the D digit register.

From the preceding discussion of the digit registers shown in FIG. 3, it will be seen that each unoperated digit register will apply pulse ground from conductor PLG to its associated off-normal conductor, viz., AON–KON, respectively, through its normally closed off-normal contacts corresponding to 3DRON1 of the D digit register. Conductors AON–KON inclusive are extended through cable 1010 to FIG. 2, where they are connected as shown to levels 1–10, respectively, of switch bank 2DC2.

Thus, when the wipers of the digit counting switch are stepped to the first or A level by the motor magnet 2DCX, as previously described, the pulse ground present on conductor AON will be applied through the first level and wiper of switch bank 2DC2, normal contacts 2AL3, and the lower winding of slow release relay 2XD to grounded battery, causing relay 2XD to operate.

In operating, relay 2XD opens normally closed contacts 2XD4 and 2XD5 thereof and closes normally open contacts 2XD1, 2XD2, 2XD3 and 2XD6 thereof. The opening of contacts 2XD5 breaks the previously described energizing path for motor magnet 2DCX, which restores without effect.

Register sender 114 is now seized and is ready to register the digits, dialed by the calling subscriber, required to control the extension of the connection to the called subscriber.

2. REGISTRATION OF DIALED DIGITS

As previously described, in response to each pulse of a dialed digit, ground is momentarily removed from incoming pulsing conductor PL1. Therefore, in response to each pulse of the first digit dialed by the calling subscriber, relay 2PL will momentarily restore and then reoperate.

In response to each momentary restoration of relay 2PL, contacts 2PL1 are momentarily reopened and contacts 2PL2 are momentarily reclosed. The momentary reopening of contacts 2PL1 breaks the previously described operating path for relay 2PLD. However, this relay does not restore because of its slow release characteristics. The momentary reclosure of contacts 2PL2 applies a ground pulse signal through operated contacts 2PLD3 and 2XD1 both to the upper winding of relay 2XD and, through normal contacts 2AL5 and the wiper and first level of switch bank 2CD1, to conductor AX, which is connected through cable 1000 to the motor magnet of the A digit register in FIG. 3. In response to each pulse signal received by the motor magnet of the A digit register, the wipers of the stepping switch thereof are advanced one level, so that at the end of dialing of the first digit, the wipers of the stepping switch of the A digit register are in contact with that level which corresponds in number to the value of this first dialed digit.

In response to the stepping switch of the A digit register moving off-normal, the normally closed off-normal contacts thereof, corresponding to off-normal contacts 3DRON1 of the D digit register, are opened, and the two normally open off-normal contacts thereof corresponding to off-normal contacts 3DRON2 and 3DRON3 of the D digit register are closed. The opening of the normally closed off-normal contacts corresponding to 3DRON1 breaks the previously described energizing path over conductor AON for the lower winding of relay 2XD. However, due to its slow release characteristics, relay 2XD is maintained operated during the entire dialing period of the first digit by the ground pulse signals applied to its upper winding over the path previously described. Relay 2XD restores after a short interval, determined by its slow release characteristics, following the end of dialing of the first digit.

In restoring, relay 2XD recloses contacts 2XD5 thereof, reestablishing the previously described operating path for motor magnet 2DCX. Therefore, motor magnet 2DCX reoperates, causing the wipers of switch banks 2DC1, 2DC2, 2DC3 and 2DC4 to advance to a second or B level of the digit counting switch. This results in the pulse ground present on conductor BON being applied to the lower winding of relay 2XD over the path previously described in connection with conductor AON, causing relay 2XD to operate again. In operating, relay 2XD reopens contacts 2XD5, breaking the energization path for motor magnet 2DCX, which restores without effect. Register sender 114 is now in condition to register the second dialed digit in the B digit register in a manner corresponding identically to the way in which the first digit was registered in the A digit register. Similarly, each of the dialed digits subsequent to the second digit are successively registered in the C, D, etc. digit registers.

As stated earlier, the number of digits required to be dialed in any given case may range from four to eleven. If only four digits are dialed, only the A, B, C and D registers will be operated and the E–K registers will remain unoperated. Only if eleven digits are required will all eleven digit registers be operated.

As will be described in detail below, register sender 114 includes means responsive to the values of the first three registered digits, or in some cases the first six registered digits, for determining the maximum number of dialed digits to be expected. In response to the dialing of this maximum expected digit, ground is supplied to end-of-dial conductor EOD, in a manner to be described below, and is applied as shown, through relay 2EOD to grounded battery, causing relay 2EOD to operate. In operating, relay 2EOD opens normally closed contacts 2EOD2 thereof, breaking the previously described operating path for motor magnet 2DCX. Therefore, when relay 2XD restores, following the end of dialing of this maximum expected digit, reclosing contacts 2XD5 thereof, the operating path for motor magnet 2DCX is not reestablished, as it was following the dialing of the digits preceding this maximum expected digit. Therefore, any superfluous digits which may be dialed by the calling subscriber after this maximum expected digit will not be effective in further advancing the digit counting switch.

Since the standard stepping switch provides only ten switching steps, and register sender 114 is designed to accommodate a maximum of eleven digits, it is necessary either to provide a special eleven-step stepping switch as the digit counting switch in register sender 114 or to provide special means in the register sender 114 for counting the eleventh digit. In the preferred embodiment of the register control portion of register sender 114 shown in FIG. 2, a standard ten-step stepping switch is employed as the digit counter and an additional level two-step relay 2AL is utilized to accommodate the eleventh dialed digit.

Figure 4:
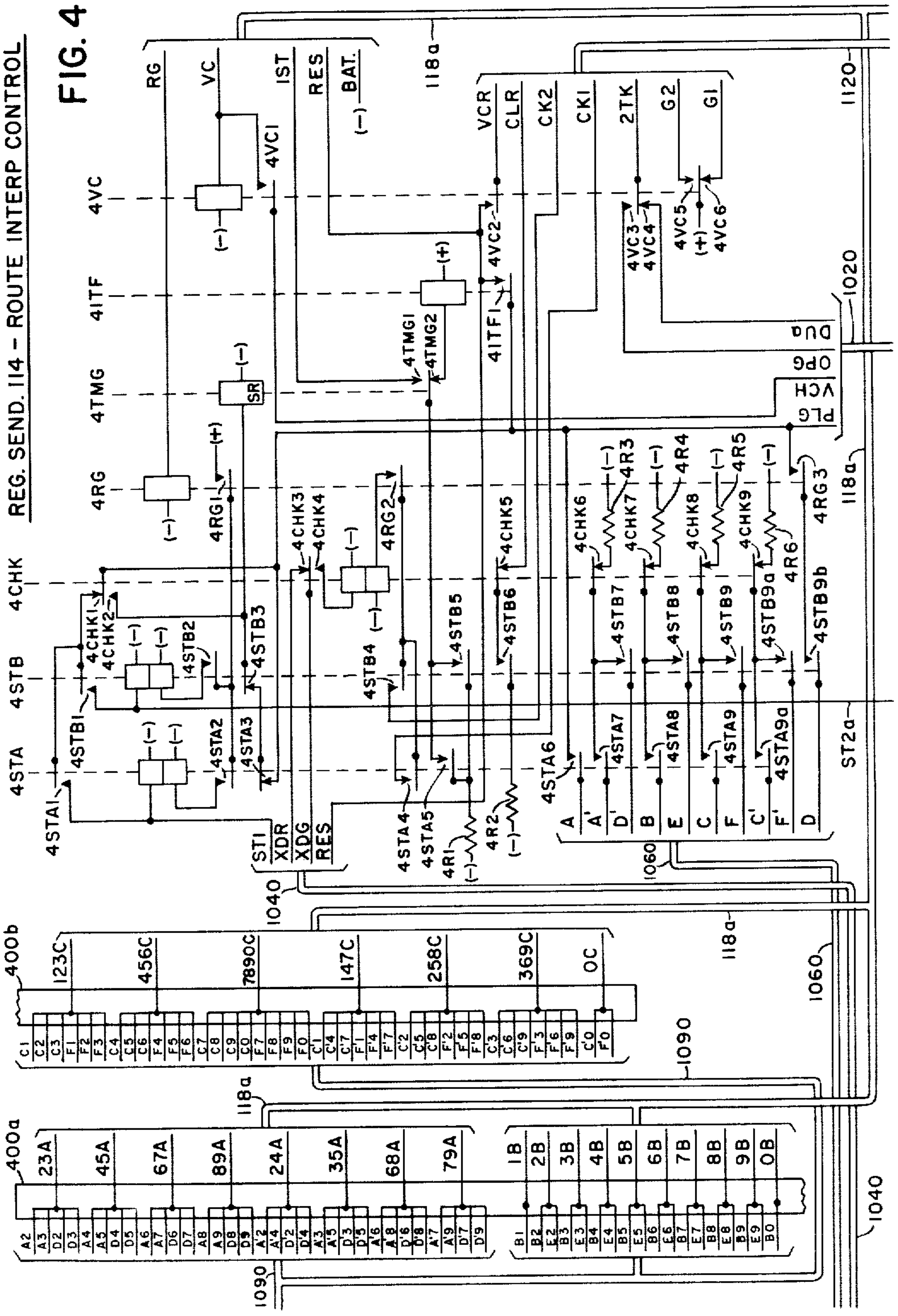

In response to the digit counting switch being stepped to its tenth or J level, relay 2XD is operated by the ground on conductor JON in the manner previously described. In response to the operation of relay 2XD, pulse ground from conductor PLG is applied through operated contacts 2XD6 to conductor XDG. Conductor XDG is connected through cable 1040 to FIG. 4, which shows the route interpreter control portion of register sender 114. In FIG. 4, the pulse ground forwarded over conductor XDG is applied through normal contacts 4CHK3 to conductor XDR. Conductor XDR is connected through cable 1040 back to FIG. 2. The pulse ground returned on conductor XDR is then applied through normally closed contacts 2AL7, and the wiper and tenth level of switch bank 2DC4 to the right side of the upper winding and through the lower winding of relay 2AL to grounded battery, thereby energizing only the lower winding of relay 2AL.

In response to the energization of only the lower winding of relay 2AL, normally open preliminary contacts 2AL8 are operated, but the remaining contacts of relay 2AL remain unoperated. The closure of preliminary contacts 2AL8 results in pulse ground being applied therethrough to the other side of the upper winding of relay 2AL. Thus, pulse ground is now applied to both sides of the upper winding of relay 2AL, so that the upper winding of relay 2AL is shunted.

However, following the end of dialing of the tenth digit relay 2XD will restore, in the manner previously described, reopening contacts 2XD6 thereof. The reopening of contacts 2XD6 breaks the previously described energization path for relay 2AL, removing the shunt across the upper winding of relay 2AL. This results in both windings of relay 2AL being energized over a path extending from pulse ground through preliminary contacts 2AL8, the upper and lower windings of relay 2AL in series to grounded battery.

In response to the energization of both windings of relay 2AL, normally closed contacts 2AL1, 2AL3, 2AL5 and 2AL9 thereof are opened and normally open contacts 2AL2, 2AL4 and 2AL6 thereof are closed. The opening of contacts 2AL1 and the closure of contacts 2AL2 transfers pulse ground, which is usually applied to the wiper of switch bank 2DC3, to conductor K. The opening of contacts 2AL3 and the closure of contacts 2AL4 transfers the lower winding of relay 2XD, which is usually connected to the wiper of switch bank 2DC2, to conductor KON. The opening of contacts 2AL5 and the closure of contacts 2AL6 transfers the ground pulse signal, which is usually applied to the wiper of switch bank 2DC1, to conductor KX. The opening of contacts 2AL7 provides an additional break in the original energizing path for the lower winding of relay 2AL. The opening of contacts 2AL9 breaks the previously described energizing path for motor magnet 2DCX.

The operate time of motor magnet 2DCX is slower than the second step operate time of relay 2AL. Thus, although the energization path for motor magnet 2DCX is reestablished by the reclosure of contacts 2XD5 in response to the restoration of relay 2XD, this path is broken again by the opening of contacts 2AL9 before motor magnet 2DCX has a chance to operate. Therefore, motor magnet 2DCX will not operate between the tenth and eleventh digits.

Following the operation of relay 2AL, relay 2XD will reoperate in response to the pulse ground on conductor KON, reclosing contacts 2XD6 in the original energization path for the lower winding of relay 2AL. However, this original energization path will still remain broken because contacts 2AL7, forming part of this path, are now operated.

3. FAILURE TO DIAL A DIGIT

As previously described, relay 2XD is originally operated upon seizure of register sender 114 by the pulse ground applied to the lower winding thereof over conductor AON. The pulse ground on conductor AON is removed when the A digit register moves off-normal in response to the first dialed digit. However, relay 2XD does not restore until the end of the dialing of the first digit because of the ground pulsing signal applied through its upper winding. When relay 2XD restores at the end of the dialing of the first digit, motor magnet 2DCX is operated and the digit counting switch is stepped to its second or B level, causing relay 2XD to be reoperated by the pulse ground on a conductor BON. This process continues for each of the dialed digits.

As shown, the pulse ground on any one of conductors AON–KON, inclusive, when applied to the lower winding of relay 2XD through the wiper of switch bank 2DC2 to effect the operation of relay 2XD, is also applied through operated contacts 2XD2, rectifier 2RE1, normal contacts 2DU4, adjustable resistance 2R2 and slow operate time-out relay 2TO to grounded battery, to effect the energization of relay 2TO.

Relay 2TO is a dash pot relay having an operate time of between five and six seconds, the exact operating time being fixed by the setting of adjustable resistance 2R2. As previously described, the pulse ground on any one of conductors AON to KON inclusive is removed when its associated digit register moves off-normal in response to a dialed digit. Thus, if a digit is dialed within the operate time of relay 2TO, pulse ground will be removed in response thereto from the energizing one of conductors AON to KON inclusive, which will cause the plunger of dash pot relay 2TO to restore. Therefore, when pulse ground is reapplied to relay 2TO over the next succeeding one of conductors AON to KON inclusive, another complete operate time period for relay 2TO will commence.

However, should the calling subscriber, following the seizure of register sender 114, fail to dial the first digit within the operate time period of relay 2TO, or should he, following the dialing of a preceding digit, fail to dial the next digit within the operate time period of relay 2TO, relay 2TO will operate, closing normally open contacts 2TO1 thereof.

In response to the operation of contacts 2TO1, a ground marking will be applied through operated contacts 2TO1, normal contacts 2DU1 and operated contacts 2PLD2 to busy conductor BY. As previously described, this ground marking on conductor BY will be returned through preselector 112 to adapter 108 (FIG. 1), where it will cause register sender 114 to be released and busy tone to be returned to the calling subscriber.

Thus, it will be seen from the foregoing, that failure of the calling subscriber to begin or to continue to dial all the required digits will result in register sender 114 being timed-out.

4. DIALING OF IMPROPER DIGITS

As set forth hereinabove, the area numbering plan is such that the values 1 and 0 are never used for the first digit of an area code and the office code numbering plan is such that the values 1 and 0 are never used for the first and second digits, respectively, of an office code. Furthermore, an area code is manifested by the fact that the second digit thereof is either a one or a zero.

Assume that the calling subscriber inadvertently dials a first digit having the value 1 or 0. Since neither an area code nor an office code can have a first digit having a value 1 or 0, the first digit dialed by the calling subscriber is an improper digit.

In response to the dialing of the first digit by the calling subscriber, the register control portion of register sender 114 shown in FIG. 2 and the digit register portion of register sender 114 shown in FIG. 3 will operate in the manner previously described to register the first dialed digit in the A digit register, and then step the digit counting switch to the second or B level thereof, causing relay 2XD to be operated by pulse ground on conductor BON.

The closure of contacts 2XD6, in response to the operation of relay 2XD, applies pulse ground, over the connection previously described in connection with the original operating path for the lower winding of relay 2AL, through conductor XDG and XDR to the wiper of switch bank 2DC4, which is now in contact with the second level thereof. This pulse ground is forwarded over conductor AW, which is connected to the second level of switch bank 2DC4, through cable 1030 to the A digit register in FIG. 3. Conductor AW, associated with the A digit register, corresponds to conductor DW, associated with the D digit register. As shown, conductor DW is connected to the wiper of switch bank 3DR3 of the D digit register. Furthermore, conductors AW1 and AW0, associated with the A digit register correspond to conductors DW1 and DW0, respectively, associated with the D digit register. As shown, the DW1 and DW0 conductors, respectively, are connected to the first and tenth levels, respectively, of switch bank 3DR3. In a similar manner, conductor AW is connected to the wiper and conductors AW1 and AW0, respectively, are connected to the first and tenth levels, respectively, of the switch bank of the A digit register which corresponds to switch bank 3DR3 of the D digit register.

Therefore, in accordnace with the assumption that the first dialed digit registered in the A digit register is an improper digit having the value 1 or 0, as the case may be, the wipers of the switch banks of the A digit register, in which the first dialed digit has been registered, will be in contact with the first or tenth levels, respectively, depending upon whether the improper dialed digit was a 1 or a 0, respectively. Therefore, the pulse ground present on conductor AW will be applied through either conductor AW1 or AW0 to conductor RES, and over conductor RES through cable 1030 back to FIG. 2. In FIG. 2, conductor RES is connected, as shown, through operated contacts 2PLD2 to conductor BY. Therefore, any ground applied to conductor RES will result in a ground marking being returned to adapter 108 through preselector 112 (FIG. 1) over conductor BY. As previously described, a ground marking on conductor BY causes register sender 114 to be released and a busy tone to be returned to the calling subscriber.

Assume now that the calling subscriber correctly dials an area code. In this case, the digit registered in the B digit register will have a value of either 1 or 0. Also, in this case the fourth and fifth digits to be dialed by the calling subscriber will manifest the first and second digits, respectively, of the office code. Therefore, in this case, a fourth or fifth dialed digit having a value of 1 or 0 would be an improper digit, since, as discussed above, the first and second digits of an office code can never have the values 1 or 0.

Now assume further that the calling subscriber, after properly dialing the first three digit area code, improperly dials a 1 or 0 as the fourth digit.

In this case, the D digit register will, in the manner previously described, register the improper dialed digit. The digit counting switch in FIG. 2 will then step to its fifth level. In the manner previously described, pulse ground will be forwarded from the wiper of switch bank 2DC4 over conductor DW through cable 1030 to the wiper of switch bank 3DR3 of the D digit register. If, as is the case here, the stepping switch of the D digit register has been stepped to its first or tenth levels, the pulse ground on conductor DW will be applied through conductor DW1 or DW0 to conductor BW, and over conductor BW through cable 1030 to the wiper of the switch bank associated with the B digit register corresponding to switch bank 3DR3 of the D digit register. Since it has been assumed that the calling subscriber has dialed an area code, the digit registered in the B digit register has a value of either 1 or 0. Therefore, the wiper of the switch bank of the B digit register to which conductor BW is connected is in contact with the first or tenth level thereof. Thus, the pulse ground present on conductor BW is applied through either of conductors BW1 or BW0 to conductor RES, and over conductor RES through cable 1030 back to FIG. 2, where it is applied through operated contacts 2PLD2 to conductor BY as a ground marking. As previously described, conductor BY, in response to a ground marking placed thereon, causes register sender 114 to be released and a busy tone to be returned to the calling subscriber.

If instead of dialing an improper fourth digit, manifesting the first digit of the office code following an area code, as just described, the calling subscriber should dial a proper fourth digit, but an improper fifth digit, manifesting the second digit of an office code following an area code, the E digit register will operate in the manner previously described in connection with the registration of an improper fourth digit in the D digit register, to forward pulse ground on conductor EW through either of conductors EW1 or EW0 to conductor BW. As previously discussed, the pulse ground on conductor BW is extended through the B digit register and conductor RES to provide a ground marking on busy conductor BY, which in response thereto causes register sender 114 to be released and busy tone to be returned to the calling subscriber.

Thus, it will be seen that register sender 114 includes means for causing the release thereof and the return of busy tone to the calling subscriber in response to the registration of improper dialed digits.

B. *Route Interpretation*

1. ROUTE INTERPRETATION CONTROL

Previously discussed conductors A2–A9 and A'2–A'9, associated with the A digit register, B1–B0, associated with the B digit register, C1–C0 and C'1–C'0, associated with the C digit register, D2–D9 and D'2–D'9, associated with the D digit register, E2–E9, associated with the E digit register, and F1–F0 and F'1–F'0, associated with the F digit register, are connected as shown through cable 1090 to a terminal strip in FIG. 4, which includes the route interpreter control portion of register sender 114.

At terminal strip portion 400*a*, conductors A2, A3, D2 and D3 are connected to conductor 23A; conductors A4, A5, D4 and D5 are connected to conductor 45A; conductors A6, A7, D6 and D7 are connected to conductor 67A; conductors A8, A9, D8 and D9 are connected to conductor 89A; conductors A'2, A'4, D'2 and D'4 are connected to conductor 24A; conductors A'3, A'5, D'3 and D'5 are connected to conductor 35A; conductors A'6, A'8, D'6 and D'8 are connected to conductor 68A; and conductors A'7, A'9, D'7 and D'9 are connected to conductor 79A. Also at terminal strip portion 400*a*, conductor B1 is connected to conductor 1B; conductors B2 and E2 are connected to conductor 2B; conductors B3 and E3 are connected to conductor 3B; conductors B4 and E4 are connected to conductor 4B; conductors B5 and E5 are connected to conductor 5B; conductors B6 and E6 are connected to conductor 6B; conductors B7 and E7 are connected to conductor 7B; conductors B8 and E8 are connected to conductor 8B; conductors B9 and E9 are connected to conductor 9B; and conductor E0 is connected to conductor 0B.

At terminal strip portion 400*b*, conductors C1, C2, C3, F1, F2 and F3 are connected to conductor 123C; conductors C4, C5, C6, F4, F5 and F6 are conneced to conductor 456C; conductors C7, C8, C9, C0, F7, F8, F9 and F0 are connected to conductor 7890C; conductors C'1, C'4, C'7, F'1, F'4 and F'7 are connected to conductor 147C; conductors C'2, C'5, C'8, F'2, F'5 and F'8 are connected to conductor 258C; conductors C'3, C'6, C'9, F'3, F'6 and F'9 are connected to conductor 369C; and conductors C'0 and F'0 are connected to conductor 0C.

Conductors 23A, 45A, 67A, 89A, 24A, 35A, 68A, 79A, 1B–0B inclusive, 123C, 456C, 7890C, 147C, 258C, 369C and 0C, are connected through cable 118*a* which, as shown in FIG. 1, extends from register sender 114 to route interpreter 116.

As previously described, at the time of seizure of register sender 114, pulse ground was applied in FIG. 5 to conductor PLG. Conductor PLG extends through cable 1020 to the route interpreter control portion of register sender 114 shown in FIG. 4. The pulse ground on conductor PLG in FIG. 4 is applied, as shown, through normal contacts 4STA3 and 4STB3 and relay 4TMG to grounded battery, thereby energizing relay 4TMG. Therefore, at the time of seizure of register sender 114, relay 4TMG is operated, closing normally open contacts 4TMG1 thereof and opening normally closed contacts 4TMG2 thereof.

In the manner previously described, immediately following the registration of the third digit in the C digit register, relay 2XD in FIG. 2 will restore, the wiper of switch banks 2DC1, 2DC2, 2DC3, and 2DC4 of the digit counting switch will be stepped to the fourth level thereof, and the pulse ground on conductor DON will reoperate relay 2XD. In response thereto, an operating path for relay 4STA in FIG. 4 is completed, which extends from pulse ground on conductor PLG in FIG. 2 through operated contacts 2XD6, conductor XDG which extends through cable 1040 to FIG. 4, and then through normal contacts 4CHK3 to conductor XDR which extends back to FIG. 2 through cable 1040, and then through normal contacts 2AL7, the wiper and fourth level of switch bank 2DC4 to conductor ST1 which extends back to FIG. 4 through cable 1040, and then through the upper winding of relay 4STA to grounded battery.

In operating, relay 4STA closes normally open contacts 4STA1, 4STA2, 4STA4, 4STA5, 4STA6, 4STA7, 4STA8, 4STA9, and 4STA9*a* thereof, and opens normally closed contacts 4STA3 thereof. The closure of contacts 4STA1 provides a first holding ground for relay 4STA extending from conductor PLG in FIG. 4 through normal contacts 4CHK1, operated contacts 4STA1 and the upper winding of relay 4STA to grounded battery. The opening of contacts 4STA3 breaks the previously described energizing path for relay 4TMG. However, relay 4TMG is a slow release relay so that it remains operated for a period determined by its slow release characteristics.

The closure of contacts 4STA5 applies resistance battery to interpreter start conductor IST over a connection extending from battery through resistance 4R1, operated contacts 4STA5 and 4TMG1 to conductor IST, which extends through cable 118*a* to route interpreter 116. The application of resistance battery to conductor IST indicates to route interpreter 116 that register sender 114 is in need of its services. In addition, raw battery from FIG. 4 of register sender 114 is applied over conductor BAT through cable 118*a* to route interpreter 116.

Simultaneously with the application of resistance battery to conductor IST, pulse ground from conductor PLG of FIG. 4 is applied through operated contacts 4STA6 to conductor A; resistance battery is applied from battery through resistance 4R3, normal contacts 4CHK6 and operated contacts 4STA7 to conductor A'; resistance battery is applied from battery through resistance 4R4, normal contacts 4CHK7 and operated contacts 4STA8 to conductor B; resistance battery is applied from battery through resistance 4R5, normal contacts 4CHK8 and operated contacts 4STA9 to conductor C; and resistance battery is applied from battery through resistance 4R6, operated contacts 4CHK9 and operated contacts 4STA9*a* to conductor C'. Conductors A, A', B, C and C' extend through cable 1060 to FIG. 3, where each of these conductors is connected to the wiper of the switch bank, corresponding to switch bank 3DR1, of the digit register with which it is associated. In a similar manner, conductors A' and C' are extended through cable 1060 to FIG. 3, where each conductor is connected to the wiper of the switch bank, corresponding to switch bank 3DR2, of the digit register with which it is associated.

In accordance with the value of the dialed digits registered in each of digit registers A, B and C, the ground on conductor A and the resistance battery on each of conductors A', B, C and C', respectively, will be forwarded over a selected conductor from each of conductor groups A2–A9, A'2–A'9, B1–B0, C1–C0, and C'1–C'0, respectively, and then through cable 1090 to FIG. 4, where, at terminal strip portion 400*a* and 400*b*, the selected conductors are cross-connected, in the manner previously described, to an appropriate one of each of conductor groups 23A–89A, inclusive, 24A–79A inclusive, 1B–0B inclusive, 123C–7890C inclusive, and 147C–0C inclusive, respectively. As previously discussed, each of the conductors in the latter groups of conductors is connected through cable 118*a* to route interpreter 116.

Route interpreter 116 will be discussed in detail below. However, it is important at this time to state that since route interpreter 116 is common equipment, having access to all the register senders in the entire group of register senders, the fact that resistance battery has been applied to interpreter start conductor IST, in the manner previously described, does not necessarily mean that register sender 114 will be immediately cut through to route interpreter 116. If interpreter starts are in from one or more other register senders in the group of register senders at the time resistance battery is applied to conductor IST, a register sender may have to wait a period before being cut through to route interpreter 116.

It will be remembered that the energizing path for relay 4TMG was broken by the opening of contacts 4STA3 in response to the operation of relay 4STA. Therefore, during the period in which register sender 114 is waiting to be cut through to route interpreter 116, relay 4TMG is maintained operated solely by its slow release characteristics. Fortunately, the time needed by route interpreter 116 to make a translation is extremely short so that register sender 114 will usually be reached by route interpreter 116 within the period in which relay 4TMG remains operated by its slow release characteristics. However, under exceptionally high traffic conditions, it is possible that relay 4TMG will restore before route interpreter 116 reaches register sender 114. In this case, contacts 4TMG1 will be reopened and contacts 4TMG2 will be reclosed. The reopening of contacts 4TMG1 breaks the previously described connection for applying resistance battery to conductor IST. The reclosure of contacts 4TMG2 completes an energization path for interpretation fail relay 4ITF extending from battery through resistance 4R1, operated contacts 4STA5, reclosed contacts 4TMG2 and relay 4ITF to ground, causing relay 4ITF to operate. In operating, relay 4ITF closes normally open contacts 4ITF1 thereof, which extends pulse ground on conductor PLG in FIG. 4 through operated contacts 4ITF1 to conductor RES. Conductor RES extends through cable 1040 back to FIG. 2, where, as previously described, it applies the pulse ground thereon as a ground marking to busy conductor BY through operated contacts 2PLD2. As previously discussed, in response to a ground marking on conductor BY, register sender 114 is released and busy tone is returned to calling subscriber.

However, as set forth above, register sender 114 is usually reached by route interpreter 116 and cut through thereto before relay 4TMG restores. In response to register sender 114 being cut through to route interpreter 116, one or more translating relays in route interpreter 116, which will be discussed in detail below, is operated. In response to any of these translating relays in route interpreter 116 being operated, ground is returned therefrom over return ground conductor RG, which is connected to route interpreter 116 through cable 118*a*, and is applied, as shown, through relay 4RG to grounded battery, thereby causing relay 4RG to operate. In operating, relay 4RG closes normally open contacts 4RG1, 4RG2 and 4RG3 thereof. The closure of contacts 4RG1 completes a second holding ground for relay 4STA extending from ground through operated contacts 4RG1 and 4STA2, and the lower winding of relay 4STA to grounded battery.

Figure 7:
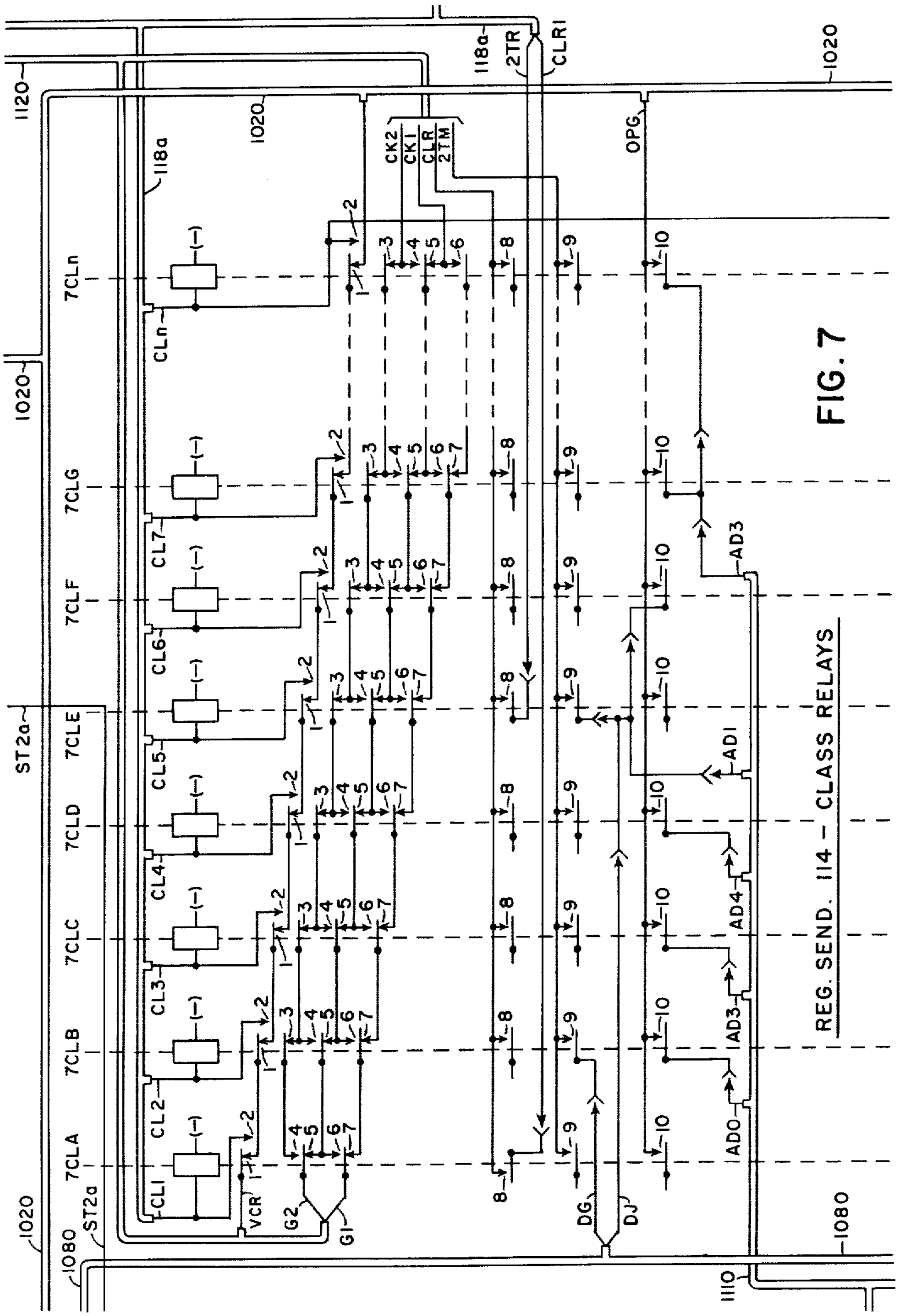

The translation of the first three dialed digits registered in digit registers A, B and C, ordinarily represent a valid area or office code, in which case one and only one of the group of class relays 7CLA to 7CL*n* will be operated in a manner to be described in detail below. In response thereto, check relay 4CHK will be energized over a path which extends from ground in FIG. 4 through normal contacts 4VC6 to conductor G1 which extends through cable 1120 to FIG. 7. In FIG. 7, the ground on conductor G1 is applied through the number "7" contacts of each class relay lower in the chain than the one operated class relay, contacts number 6 of the one operated class relay, and the number "5" contacts of each unoperated class relay in the chain higher than the one operated class relay, to conductor CK1, which is returned to FIG. 4 through cable 1120. The ground on conductor CK1 in FIG. 4 is applied, as shown, through operated contacts 4STA4 and 4RG2, and the lower winding of relay 4CHK to grounded battery, thereby operating relay 4CHK.

In operating, relay CHK opens normally closed contacts CHK1, CHK3, CHK5, CHK6, CHK7, CHK8 and CHK9 thereof and closes normally open contacts 4CHK2 and 4CHK4 thereof.

The opening of contacts 4CHK1 breaks the previously described first-mentioned holding path for relay 4STA. The closure of contacts 4CHK2 provides a reenergization path for relay 4TM extending from pulse ground through operated contacts 4CHK2 and relay 4TMG to grounded battery. Since this reenergization path for relay 4TMG is completed during the period in which it has remained operated due to its slow release characteristics, relay 4TMG is maintained operated now that it has been reenergized. The opening of contacts 4CHK3 breaks the previously described original operating path for relay 4STA over conductor ST1. Relay 4STA remains operated over its second holding ground through operated contacts 4RG1, however. The closure of contacts 4CHK4 completes a holding path for relay 4CHK extending from pulse ground on conductor XDG through operated contacts 4CHK4 and the upper winding of relay 4CHK to grounded battery. The opening of contacts 4CHK6, 4CHK7, 4CHK8 and 4CHK9, respectively, breaks the previously described paths for applying resistance battery to conductors A', B, C and C', respectively. In response thereto, any of the aforementioned translating relays in route interpreter 116 which may have been operated now release, thereby removing ground from conductor RG. In response to the removal of ground from conductor RG, relay 4RG releases, reopening contacts 4RG1, 4RG2 and 4RG3 thereof. The reopening of contacts 4RG1 breaks the previously described second holding ground for relay 4STA so that relay 4STA now releases. The reopening of contacts 4RG2 breaks the original operating path for relay 4CHK through the lower winding thereof. However, relay 4CHK remains operated through the previously described holding ground which is still applied to its upper winding.

Returning to FIG. 2 for a moment, following the registration of the fourth digit, relay 2XD restores, reopening contacts 2XD6 thereof and reclosing contacts 2XD5 thereof. In response to the reclosure of contacts 2XD5, motor magnet 2DCX is reenergized and the wipers of switch banks 2DC1, 2DC2, 2DC3 and 2DC4 are stepped to the fifth level thereof, in the manner previously described. In response to the reopening of contacts 2XD6, pulse ground is removed from conductor XDG.

Returning to FIG. 4, since the holding ground for relay 4CHK is applied over conductor XDG, removal of pulse ground therefrom causes relay 4CHK to restore. Since the digit counting switch in FIG. 2 is no longer on its fourth level, the restoration of relay 4CHK does not reestablish the previously described original energizing circuit through conductor ST1 for relay 4STA.

In the case where the translation of the first three dialed digits registered in the digit registers A, B and C manifest a vacant code, none of the group of class relays in FIG. 7 is operated, but, instead, ground is returned to register sender 114 from route interpreter 116 through cable 118*a* over conductor VC, all in a manner to be described in detail below. The ground on conductor VC is applied through relay 4VC, which is now being used as a vacant code relay, to grounded battery, causing relay 4VC to operate. In operating, relay 4VC closes normally open contacts 4VC1, 4VC2, 4VC3 and 4VC5 thereof, and opens normally closed contacts 4VC4 and 4VC6 thereof. The closure of contacts 4VC1 applies a holding ground to relay 4VC from outpulsing ground on conductor OPG in FIG. 6 through normal contacts 6SKE1 to conductor VCH which extends through cable 1020 to FIG. 4, and then through operated contacts 4VC1 and relay 4VC to grounded battery.

The closure of contacts 4VC2 results in pulse ground on conductor PLG in FIG. 7 being applied through the chain of number "1" contacts of all the class relays, none of which has been operated, to conductor VCR which extends through cable 1120 back to FIG. 4, and then through operated contacts 4VC2 to conductor RES. As previously described, a ground applied to conductor RES is returned to FIG. 2 and applied through operated contacts 2PLD2 as a ground marking on conductor BY, causing register sender 114 to be released and busy tone to be returned to calling subscriber.

The closure of contacts 4VC5 results in ground being extended through operated contacts 4VC5 to conductor G2 which extends through cable 1120 to FIG. 7, and then through the chain of normal contacts number "5" of each of the class relays, none of which is operated, to conductor CK1. As described above, the application of ground to conductor CK1 causes relay 4CHK to be operated, which, in turn, causes route interpreter 116 to be released from register sender 114.

Summarizing, if the first three digits registered in the A, B and C digit registers manifest a vacant code, register sender 114 will be released and busy tone will be returned to the calling subscriber; while if the first three digits registered in the A, B and C digit registers manifest a valid code, a particular one, and only one, class relay in the group of class relays will be operated.

Assuming that a valid code was manifested by the first three digits registered in the A, B and C digit registers, so that some one class relay in the group of class relays has been operated, the initiation of outpulsing is determined, in a manner to be described in detail below, by the strapping of the operated class relay. At this time it is necessary to state merely that if the operated class relay indicates that no second translation is required, outpulsing will be commenced immediately. However, if the operated class relay indicates that a second translation is required, outpulsing will not be commenced.

Following the registration of the sixth dialed digit in the F digit register, relay 2XD in FIG. 2 will restore, causing the digit counting switch to be stepped to its seventh level, thereby resulting in relay 2XD being reoperated, all in the manner previously described. In response thereto, assuming outpulsing not to have commenced, an energization path for relay 4STB is completed which extends from pulse ground in FIG. 2 to the wiper of switch bank 2DC4 over the path previously described in connection with the operation of relay 4STA, and then through the seventh level of switch bank 2DC4 to conductor ST2 which extends through cable 1020 to FIG. 6 and then in FIG. 6 through normally closed off-normal contacts 6DSON2, and a chain of number "1" contacts of a group of add relays ADA to ADF to conductor ST2*a*. Conductor ST2*a* extends through FIG. 7 to FIG. 4 where it is connected through the lower winding of relay 4STB to grounded battery. Therefore, relay 4STB will operate.

As will be described in detail below, during outpulsing, at least one of normally closed off-normal contacts 6DSON2 and the chain of normally closed number "1" contacts of the group of add relays 6ADA–6ADF will be operated. Thus, if outpulsing has already commenced at the time pulse ground is applied to conductor ST2, the previously described energizing path for relay 4STB will be broken so that, in this case, relay 4STB will not operate.

However, assuming that a second translation is required, so that outpulsing has not commenced and relay 4STB is operated, the operation of relay 4STB is effective in closing normally open contacts 4STB1, 4STB2, 4STB4, 4STB5, 4STB6, 4STB7, 4STB8, 4STB9, 4STB9*a* and 4STB9*b* thereof, and in opening normally closed contacts 4STB3 thereof.

The operation of relay 4STB performs functions generally similar to those previously described in connection with relay 4STA. The closure of contacts 4STB1 is effective in applying a first holding ground for relay 4STB through the upper winding thereof. The opening of contacts 4STB3 is effective in breaking the previously described energizing path for relay 4TMG. The closure of contacts 4STB5 is effective in applying resistance battery to interrupter start conductor IST. The closure of contacts 4STB7, 4STB8, 4STB9 and 4STB9*a*, respectively, is effective in applying resistance battery to conductors D′, E, F and F′, respectively. The application of resistance battery to conductors E′, E, F and F′ causes the operation of certain translating relays in route interpreter 116, in accordance with the values of the registered fourth, fifth and sixth digits, in the same manner, previously described, in which the application of resistance battery to conductors A′, B, C and C′, respectively, selected certain translating relays during the first translation in accordance with the first three dialed digits registered in the A, B and C digit registers.

The closure of contacts 4STB6 is effective in applying resistance battery to conductor CLR over a connection extending from battery through resistance 4R2, operated contacts 4STB6 and normal contacts 4CHK5. Conductor CLR is extended through cable 1120 to FIG. 7, where it is applied through the number "8" contacts of each of the group of class relays 7CLA–7CL*n*.

As previously mentioned, a second translation is required when a calling subscriber is making a call to a called subscriber in a foreign area and a translation of the office code of the called subscriber is needed either to ascertain the routing, or to discriminate between a valid and a restricted office code dialed by the calling subscriber. As will be described in more detail below, the number "8" contacts of the operated class relay are strapped to one of a group of CLR($x$) conductors, such as conductor CLR1, in the former case, and are strapped to conductor 2TR in the latter case. The resistance battery on conductor CLR is therefore forwarded to conductor CLR1 or conductor 2TR, as the case may be, each of which is extended through cable **118*a* to route interpreter 116**, to operate a particular translating relay therein.

In response to the operation of the translating relays in route interpreter 116, ground is returned over conductor RG and relay 4RG is operated, in the manner previously described. The closure of contacts 4RG1 applies a second holding ground to relay 4STB through the lower winding thereof. The closure of contacts 4RG3 applies pulse ground to conductor D through operated contacts 4RG3 and 4STB9*b*. The pulse ground on conductor D is applied to route interpreter 116 in the same manner, previously described, in which the pulse ground on conductor A was applied thereto during the first translation. The inclusion of contacts 4RG3 in the energization path of conductor D insures that all the translating relays, and particularly the translating relay operated over conductor CLR1, are operated before the second translation takes place, since two different translations will be obtained from the same set of three digits, depending upon whether or not the particular translating relay associated with conductor CLR1 is operated or unoperated, as will be described in detail below.

If the second translation was made merely to determine whether the fourth, fifth and sixth dialed digits registered in the D, E and F registers represents a valid, rather than a restricted, office code, and the second translation shows the office code to be valid, ground will be returned to register sender 114 from route interpreter 116 over conductor VC which extends through cable **118*a***. This ground on conductor VC is applied through relay 4VC, which now acts as a valid code relay, to grounded battery, causing relay 4VC to operate.

As previously described, the closure of contacts 4VC1 applies holding ground to relay 4VC from conductor VCH. Therefore, relay 4VC will remain operated until the holding ground on conductor 4VCH is removed.

Since one of the group of class relays is now operated, the previously described path for applying pulse ground to conductor VCR in FIG. 7 is broken. Therefore, in this case, the closure of contacts 4VC2, which connects conductor VCR in FIG. 4 to conductor RES is without effect.

The closure of contacts 4VC3 applies outpulsing ground on conductor OPG to conductor 2TK through operated contacts 4VC3, causing outpulsing to be initiated, in a manner to be described in detail below.

If the second translation was needed to ascertain the routing required, some class relay, higher in number than the initially operated class relay, will be operated in a manner to be described in detail below, and the initially operated class relay will be restored in response thereto. However, there will be a short interval, after the second-operated class relay has been operated and before the first-operated class relay restores, when two class relays will be simultaneously operated. During this interval, ground will be applied through normal contacts 4VC6 to conductor G1 which extends through cable 1120 to FIG. 7, where it is applied through the number "7" contacts of the class relays lower in number than the first-operated class relay, contacts number "6" of the first-operated class relay, contacts number "5" of the class relays intermediate the first-operated and second-operated class relays, contacts number "4" of the second-operated class relay, and contacts number "3" of class relays higher in number than the second-operated class relay to conductor CK2. Conductor CK2 extends through cable 1120 back to FIG. 4, where the ground thereupon is applied through operated contacts 4STB4 and 4RG2, and the lower winding of relay 4CHK to grounded battery, causing relay 4CHK to reoperate. In reoperating, relay 4CHK opens normally closed contacts 4CHK1, 4CHK3, 4CHK5, 4CHK6, 4CHK7, 4CHK8 and 4CHK9 thereof and closes normally open contacts 4CHK2 and 4CHK4 thereof. The opening of contacts 4CHK1 breaks the previously described path for applying the first holding ground to relay 4STB, the closure of contacts 4CHK2 reestablishes the energization path for relay 4TMG, the opening of contacts 4CHK3 breaks the original operating path through conductor ST2*a* for operating relay 4STB. However, relay 4STB remains operated over its second holding ground applied through operated contacts 4RG1. The closure of contacts 4CHK4 applies a holding ground to the upper winding of relay 4CHK. The opening of contacts 4CHK5, 4CHK6, 4CHK7, 4CHK8 and 4CHK9, respectively, breaks the paths for applying resistance battery to conductors CLR, D', E, F and F', respectively. The removal of resistance battery from these conductors results in the translating relays in route interpreter 116 being restored.

In response to the restoration of the translating relays in route interpreter 116, ground is removed from conductor RG, so that relay 4RG restores. In restoring, relay 4RG reopens contacts 4RG1 thereof, breaking the previously described path for applying the second holding ground to relay 4STB, so that relay 4STB restores. The reopening of contacts 4RG2 breaks the energization path for the lower winding of relay 4CHK. However, relay 4CHK remains operated over its upper winding, which is still energized. The opening of contacts 4RG3 breaks the previously described path for applying pulse ground to conductor D.

Relay 4CHK remains operated over its upper winding until relay 2XD restores in response to the end of dialing of the seventh digit, at which time contacts thereof 2XD6 are opened, removing pulse ground from conductor XDG, causing relay 4CHK to restore.

In the case discussed above, where relay 4VC operates to manifest a valid office code and no second class relay is operated, ground is applied through operated contacts 4VC5 to conductor G2, which extends through cable 1120 to FIG. 7, where it is applied through contacts number "5" of the unoperated class relays lower in number than the only operated class relay, contacts number "4" of the operated class relay, and contacts number "3" of the unoperated class relays higher in number than the operated class relay to conductor CK2. The application of ground to conductor CK2 causes relay 4CHK to be operated and perform the functions described just above.

2. ROUTE INTERPRETER 116

As stated earlier, route interpreter 116 is common equipment having access to each register sender in the entire group of register senders in the originating exchange. As illustratively shown in FIG. 1, route interpreter 116 is coupled to register sender 114 through cable 118*a*. Route interpreter 116 is coupled to each other register sender in the group of register senders over a similar cable, such as cables 118*b* and 118*c*, respectively.

Reference is now made to FIGS. 10–27 inclusive, which show in detail the structure of route interpreter 116.

Figure 10:
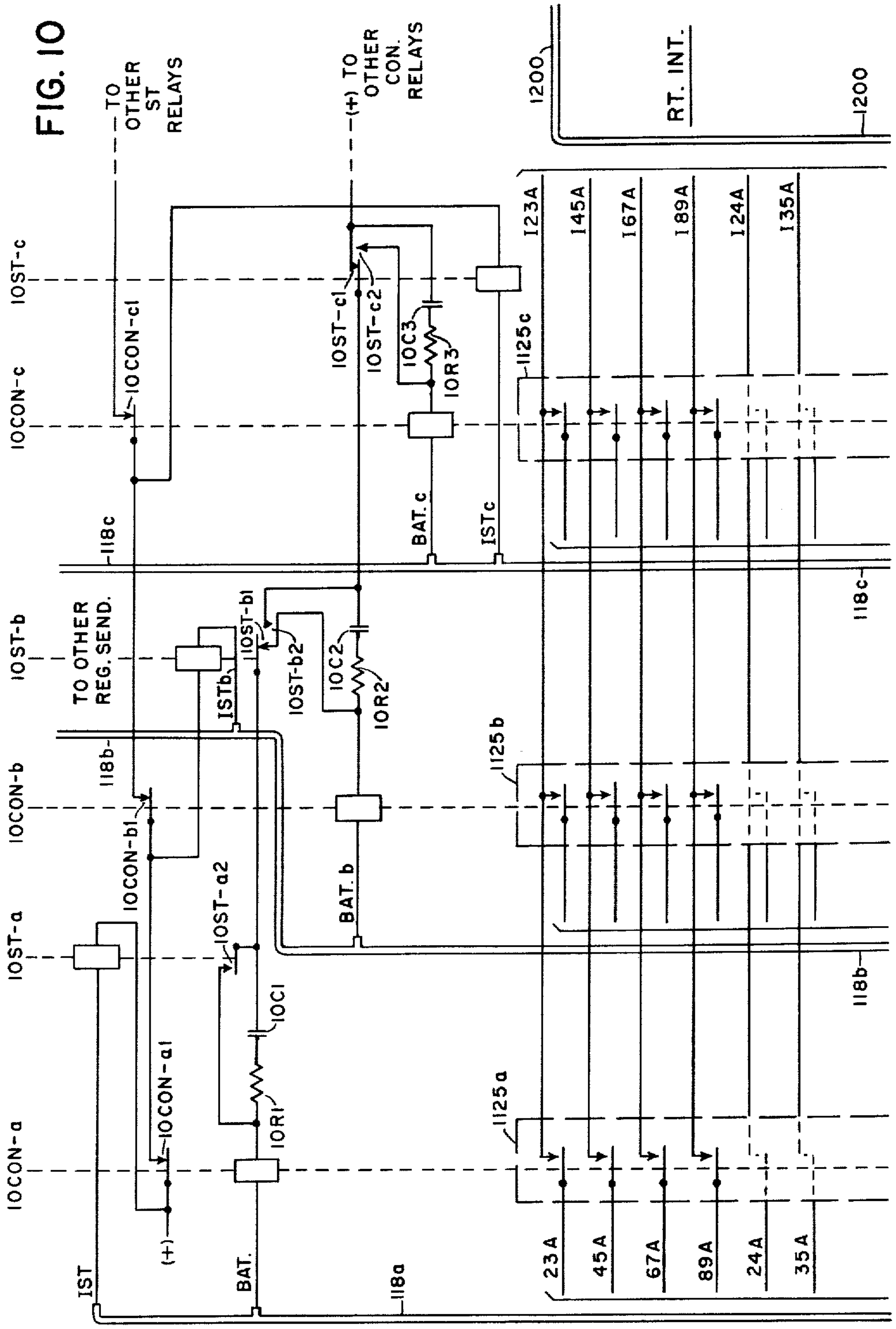
Figure 11:
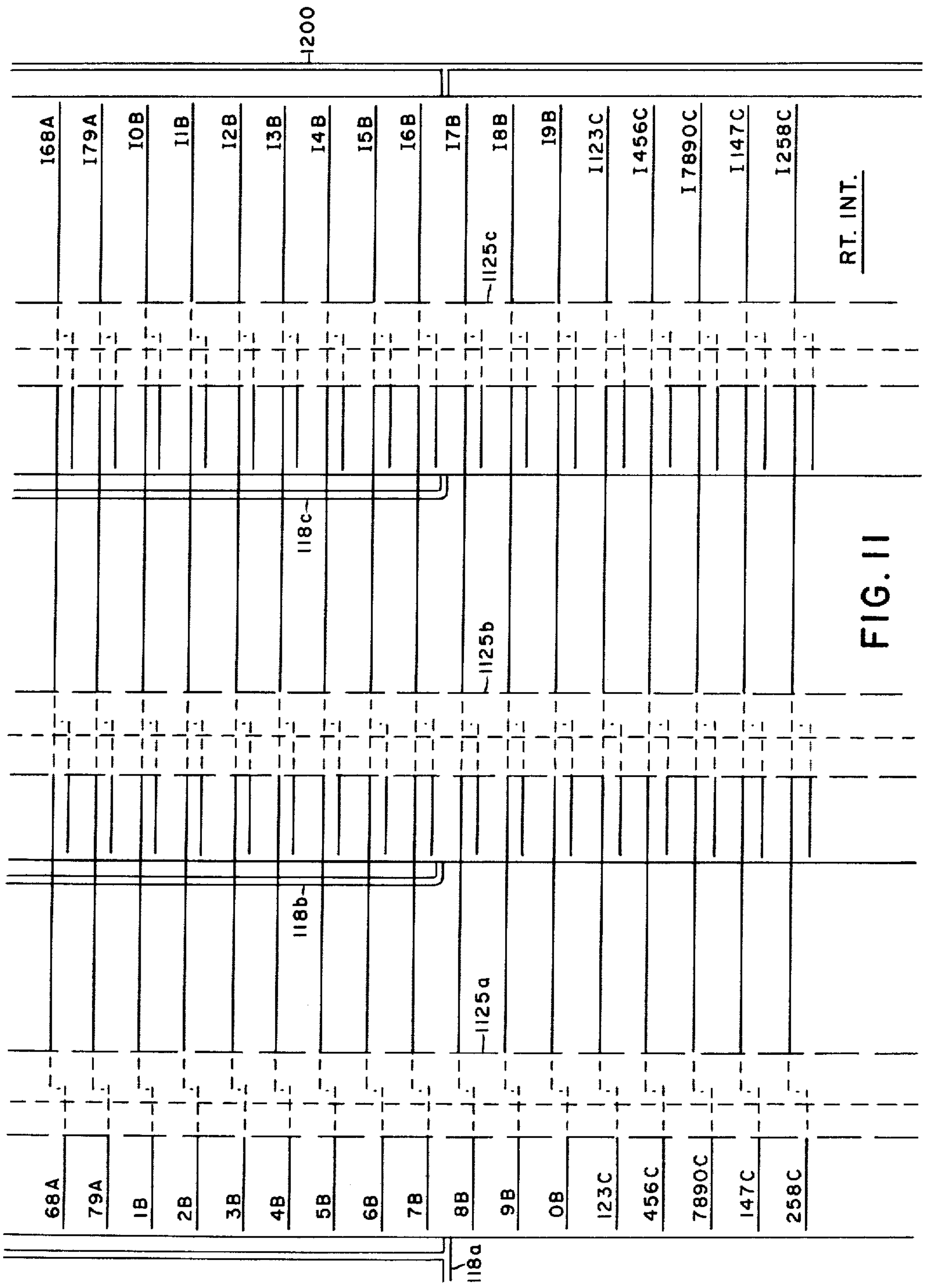
Figure 12:
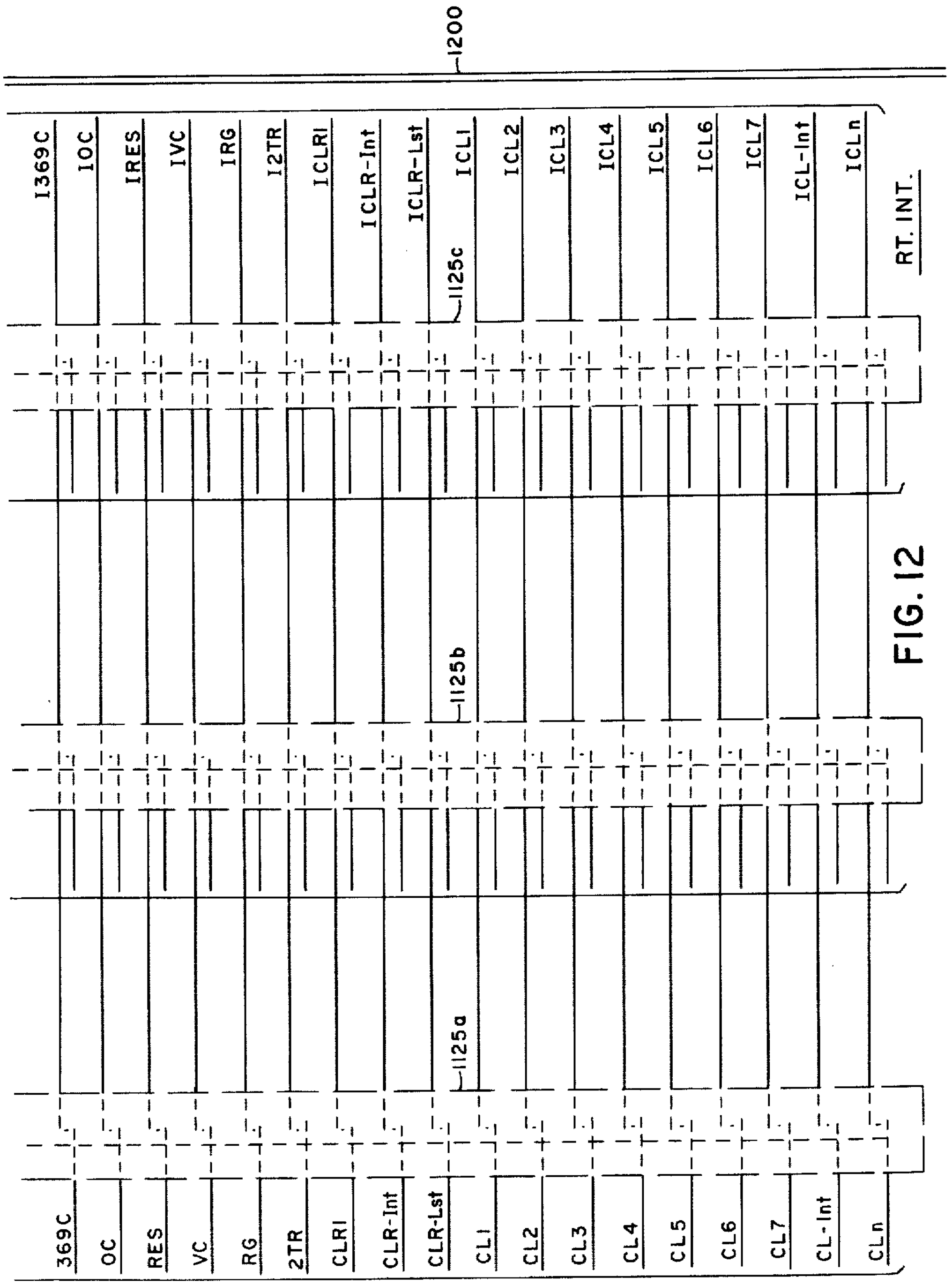

Referring first to FIGS. 10–12, there is shown cable 118*a* which extends a large plurality of conductors from register sender 114 to route interpreter 116. This large plurality of conductors from register sender 114 includes conductors IST, BAT, 23A, 45A, 67A, 89A, 24A, 35A, 68A, 79A, 1B–0B inclusive, 123C, 456C, 7890C, 147C, 258C, 369C, 0C, RES, VC, RG, and 2TR; a group of CLR($x$) conductors, only the first, CLR1, an intermediate one, CLR–*int*, and the last CLR–*lst*, of which are shown, and a group of CL($x$) conductors, the first seven, CL1–CL7 inclusive, an intermediate one, CL–*int*, and the last one, CL*n*, of which are shown.

In a similar manner, each of the cables, such as cables 118*b* and 118*c*, respectively, emanating individually from each other register sender in the group of register senders, includes a large plurality of conductors from the register sender with which it is associated which correspond in all respects to the conductors enumerated above, which are included in cable 118*a* and are associated with register sender 114.

Associated with each individual register sender are a start relay and a connector relay, such as start relay 10ST–*a* and connector relay 10CON–*a* which are associated with register sender 114 over cable 118*a*, start relay 10ST–*b* and connector relay 10CON–*b* which are associated with a second register sender over cable 118*b*, and start relay 10ST–*c* and connector relay 10CON–*c* which are associated with the third register sender over cable 118*c*. In a similar manner, an additional start relay and an additional connector relay is associated with each other register sender in the entire group of register senders.

As shown in FIG. 10, the start relays are connected in a chain with ground being applied through one side of each start relay in the chain through normal contacts of the connector relays associated with the lower numbered start relays in the chain, so that ground is applied directly to one side of start relay 10ST–*a*, which is the first start relay in the chain, and is applied through normal contacts 10CON–*a*1 to one side of start relay 10ST–*b*, which is the second start relay in the chain, and is applied through normal contacts 10CON–*a*1 and 10CON–*b*1 to start relay 10ST–*c*, which is the third start relay in the chain, and is applied through contacts 10CON–*a*1, 10CON–*b*1 and 10CON–*c*1 to one side of the next start relay in the chain (not shown), etc.

Also, the connector relays are connected in a chain with ground being applied to one side of each connector relay in the chain through operated contacts of the particular start relay associated with the particular connector relay in the chain and through normal contacts of the start relays associated with the higher numbered connector relays in the chain, so that one side of connector relay 10CON–*a* is connected through normally open contacts 10ST–*a*2, normally closed contacts 10ST–*b*1, 10ST–*c*1, and the corresponding normally closed contacts of the other higher numbered start relays to ground; one side of connector relay 10CON–*b* is connected through normally open contacts 10ST–*b*2, normally closed contacts 10ST–*c*1, and the corresponding normally closed contacts of the other higher numbered start relays to ground; one side of connector relay 10CON–*c* is connected through normally open contacts 10ST–*c*2, and the normally closed contacts corresponding to contacts 10ST–*c*1, of the other higher numbered start relays to ground, etc.

Interpreter start conductor IST from register sender 114 is connected to the other side of start relay 10ST–*a*, interpreter start conductor IST*b*, from the second register sender in the group of register senders, is connected to the other side of relay 10ST–*b*, interpreter start conductor IST*c* of the third register sender in the group of register senders is connected to the other side of start relay 10ST–*c*, and in a similar manner each of the other interpreter start conductors from the other register senders in the group of register senders is connected individually to the other side of the start relay (not shown) associated therewith.

Battery conductor BAT from register sender 114 is connected to the other side of relay 10CON–*a* associated therewith, battery conductor BAT*b* from the second register sender in the group of register senders is connected to the other side of relay 10CON–*b* associated therewith, battery conductor BAT*c* from the third register sender in the group of register senders is connected to the other side of relay 10CON–*c* associated therewith, and in a similar manner each of the battery conductors from the other register senders in the group of register senders is individually connected to the other side of the connector relay associated therewith.

Serially connected resistance 10R1 and capacitance 10C1 shunts normally open contacts 10ST–*a*2, serially connected resistance 10R2 and capacitance 10C2 shunts normally open contacts 10ST–*b*2, serially connected resistance 10R3 and capacitance 10C3 shunts normally open contacts 10ST–*c*2, and in a similar manner each of the normally open contacts corresponding to 10ST–*c*2 of the other start relays is shunted by a serially connected resistance and capacitance. Each serially connected resistance and capacitance merely provides spark protection for the contacts which it shunts.

As previously described, raw battery is applied at all times to each battery conductor BAT, BAT*b*, etc., from its associated register sender and resistance battery is applied to any of interrupter start conductors IST, IST*b*, etc., in response to its associated register sender requiring the services of interpreter 116.

With the start relays and connector relays connected in chains as described above, route interpreter 116 will be cut through consecutively to each register sender requiring its service in a predetermined order starting with that register sender associated with the highest numbered start and connector relays and ending with that register sender associated with the lowest numbered start and connector relays. For instance, assume that a resistance battery start signal is applied from the second register sender in the group of register senders to relay 10ST–*b* over start conductor IST*b*. If, at that time, connector relay 10CON–*a* is operated, so that contacts thereof 10CON–*a*1 are open, ground will not be applied to relay 10ST–*b*, so that relay 10ST–*b* will not operate. However, assuming that relay 10CON–*a* is not operated, ground is applied to relay 10ST*b* through normal contacts 10CON–*a*1, causing relay 10ST–*b* to operate. In operating, relay 10ST–*b* opens normally closed contacts 10ST–*b*1 thereof and closes normally open contacts 10ST–*b*2 thereof. The closure of contacts 10ST–*b*2 is effective in applying ground to connector relay 10CON–*b*, causing the operation thereof, only if all the start relays higher in number than the start relay 10ST–*b* are unoperated, so that all the contacts corresponding to 10ST–*c*1 of the higher numbered start relays are closed. In operating, relay 10CON–*b* opens normally closed contacts 10CON–*b*1 thereof.

Now assume that immediately after relay 10CON–*b* operates, resistance battery start signals are applied to start relay 10ST–*a* from register sender 114 and to start relay 10ST–*c* from the third register sender in the group of register senders. Start relay 10ST–*c*, which is higher numbered than operated start relay 10ST–*b*, will not operate because the previously described path for applying ground thereto is open at operated contacts 10CON–*b*1. However, start relay 10ST–*a*, which is lower numbered than operated start relay 10ST–*b*, will operate, since operated contacts 10CON–*b*1 are not in the path for applying ground to start relay 10ST–*a*. In operating, relay 10ST–*a* will close normally open contacts 10ST–*a*2 thereof. The closure of contacts 10ST–*a*2 prepares the previously described path for applying ground to connector relay 10CON–*a*. However, connector relay 10CON–*a* does not operate since this path for applying ground is open at operated contacts 10ST–*b*1.

After route interpreter 116 has completed servicing the second register sender in the group of register senders, the resistance battery signal applied to start relay 10ST–*b* over conductor IST*b* is removed, in the manner previously described. In response thereto, contacts 10ST–*b*1 thereof are reclosed and contacts 10ST–*b*2 thereof are reopened. The reclosure of contacts 10ST–*b*1 completes the previously prepared path for operating connector relay 10CON–*a* and the reopening of contacts 10ST–*b*2 breaks the previously described path for operating connector relay 10CON–*b*. Therefore, connector relay 10CON–*a* operates and connector relay 10CON–*b* restores. In operating, connector relay 10CON–*a* opens normally closed contacts 10CON–*a*1 thereof, and in restoring connector relay 10CON–*b* recloses contacts 10CON–*b*1 thereof.

As previously described, the path for applying ground to start relay 10ST–*c* was broken at operated contacts 10CON–*b*1. However, the reclosing of contacts 10CON–*b*1 is not effective in completing this ground path to start relay 10ST–*c*, because it is now broken at operated contacts 10CON–*a*1. Therefore, start relay 10ST–*c* remains unoperated.

When route interpreter 116 has completed servicing register sender 114, the resistance battery signal applied to relay 10ST–*a* over conductor IST is removed in the manner previously described and relay 10ST–*a* restores. In restoring, relay 10ST–*a* reopens contacts 10ST–*a*2 thereof breaking the previously described path for applying ground to connector relay 10CON–*a*. Therefore, connector relay 10CON–*a* restores, reclosing contacts 10CON–*a*1 thereof. Since start relay 10ST–*a* and connector relay 10CON–*a* are the lowest numbered relays in the chain, the restoration thereof completes a cycle of operation of route interpreter 116.

Since a resistance battery start signal is still applied to start relay 10ST–*c*, route interpreter 116 begins a new cycle of operation. With the reclosure of contacts 10CON–*a*1 ground is applied to all the start relays in the chain, so that those start relays which have a resistance battery start signal applied thereto at this time, such as start relay 10ST–*c*, are operated. However, the opening of the contacts corresponding to 10ST–*c*1 and the closure of contacts corresponding to 10ST–*c*2 of all the operated start relays permits ground to be applied only to the connector relay associated with the highest numbered operated start relay, so that some start relay (not shown) which is higher numbered than start relay 10ST–*c* may be operated. If this is the case the closure of contacts 10ST–*c*2 will not be effective in applying ground to connector relay 10CON–*c*. However, after all the register senders associated with the higher numbered start relays have been serviced and these higher numbered start relays have restored, in the manner previously described, the path for applying ground to connector relay 10CON–*c* will be completed, causing connector relay 10CON–*c* to operate at that time, permitting the third register sender in the group of register senders which is associated with connector relay 10CON–*c* to be serviced by route interpreter 116.

If a new interpreter start signal is applied to start relay 10ST–*b* or to start relay 10ST–*a*, the register senders associated therewith will be serviced in turn, in the manner previously described, by route interpreter 116, after the third register sender of the group of register senders associated with start relay 10ST–*c* has been serviced.

Each of the connector relays, such as connector relays 10CON–*a*, 10CON–*b* and 10CON–*c*, respectively, includes a large plurality of normally open contacts, which are shown in outlined boxes 1125*a*, 1125*b* and 1125*c*, respectively.

In response to the operation of connector relay 10CON–*a*, each of conductors 23A to CL*n* inclusive, respectively, emanating from register sender 114, is connected through an individual one of the operated contacts shown in outlined box 1125*a* to an appropriate one of conductors I23A–ICL*n* inclusive, respectively.

In a similar manner, each of the other connector relays, such as connector relays 10CON–*b* and 10CON–*c*, respectively, when operated, connects each of the conductors, corresponding to conductors 23A–CL*n* inclusive, emanating from the register sender with which that connector relay is associated through individual contacts of that connector relay to the appropriate one of conductors I23A–ICL*n* inclusive. As shown, conductors I23A–ICL*n* inclusive extend through cable 1200 to other portions of route interpreter 116.

As previously described, in accordance with the value of the first of the three digits to be translated, pulse ground is applied to one of conductors 23A, 45A, 67A and 89A, and resistance battery is applied to one of conductors 24A, 35A, 68A and 79A. In accordance with the value of the second of the three digits to be translated, resistance battery is applied to one of conductors 1B–0B inclusive. In accordance with the value of the third of the three digits to be translated, resistance battery is applied to one of conductors 123C, 456C and 7890C, and to one of conductors 147C, 258C, 369C and 0C.

Also, as previously described, if a second translation is required to ascertain the routing, resistance battery is applied to one of conductors CLR1 to CLR–1st inclusive, and if a second translation is required to provide an office code restriction check, resistance battery is applied to conductor 2TR.

Reference is now made to FIG. 13 which shows translating relays 13B0 and 13B1, respectively, which have ground applied to one side thereof and conductors I0B and I1B, respectively, connected as shown to the other side thereof. If the value of the second of the three digits to be translated is zero, resistance battery will be applied to relay 13B0 over conductor I0B, and relay 13B0 will be operated. In a similar manner, relay 13B1 will be operated if the value of the second of the three digits to be translated is one. As shown, the operation of either translating relays 13B0 or 13B1 will be effective in applying ground to conductor IRG through operated contacts thereof. In addition, the operation of relays 13B0 or 13B1 is effective in closing a plurality of normally open translating contacts thereof, as shown.

Referring now to FIGS. 14–25, there is shown a plurality of translating relays, namely, relays 14C123, 14C456, 14C7890, 14B2–14B7 inclusive, 15B7–15B9 inclusive, 15A24, 15A35, 21A68 and 21A79. Each of these relays has one side thereof connected to ground and the other side thereof connected to an individual conductor which is associated therewith, i.e., conductor I123C is connected to relay 14C123, conductor I2B is connected to relay 14B2, conductor I24A is connected to relay 15A24, etc. As shown, each of these translating relays includes contacts responsive to the operation thereof for applying ground to conductor IRG. In addition, as shown, each of these relays includes a plurality of normally open translating contacts.

Each of outlined boxes 1625, 1626, 1627, 1825 and 1826 includes a tree of translating contacts of relays 14B2–15B9 inclusive and relays 15A24 and 15A35, which is identical to the tree of translating contacts of these relays shown in detail in outlined box 1325. In a similar manner, each of outlined boxes 2026, 2225, 2226, 2227 and 2425 includes a tree of translating contacts of relays 14B2–15B9 and relays 21A68 and 21A79 which is identical to the tree of translating contacts of these relays shown in detail in outlined box 2025.

As shown, conductor I23A is connected through translating contacts of each of relays 14C123, 14C456 and 14C7890, respectively, to the translating contacts included in each of outlined boxes 1425, 1625, and 1626, respectively. In a similar manner, each of conductors I45A, I67A and I89A is connected through translating contacts of each of relays 14C123, 14C456 and 14C7890, respectively, to the translating contacts included in each of outlined boxes 1627, 1825 and 1826, respectively, 2025, 2026 and 2225, respectively, and 2226, 2227 and 2425, respectively.

As previously described, pulse ground is forwarded over a selected one of conductors I23A, I45A, I67A and I89A in accordance with the value of the first of the three digits to be translated. If the second digit of the three digits to be translated has a value between 2 and 8 inclusive, which is the case when the three digits to be translated manifests an office code, the pulse ground on the selected one of conductors I23A, I45A, I67A and I89A will be applied to a particular one of the sixteen conductors emanating from a particular one of the relay trees included in outlined boxes 1425, 1625, 1626, 1627, 1825, 1826, 2025, 2026, 2225, 2226, 2227 and 2425, respectively, in accordance with which ones of relays 14C123, 14C456 and 14C7890, respectively, 14B2–15B9, respectively, and 15A24, 15A35, 21A68 and 21A79, respectively, have been operated. For instance, if all three of the digits to be translated have the value 2, pulse ground will be forwarded over conductor I23A and then applied through operated contacts of relay 14C123, and operated contacts of relay 14B2 and 15A24 in outlined box 1425 to conductor 22 of outlined box 1425.

It will be noted that after passing through the relay tree of a particular one of the outlined boxes shown in FIGS. 14–25 to a particular one of the sixteen conductors emanating therefrom, the values of the first two digits of the three digits to be translated have been uniquely determined, but the value of the third digit of the three digits to be translated has merely been broken down into one of three groups, 123, 456, 7890, respectively.

All the conductors emanating from the outlined boxes are connected through cable 1210 to other portions of route interpreter 116.

Figure 24:
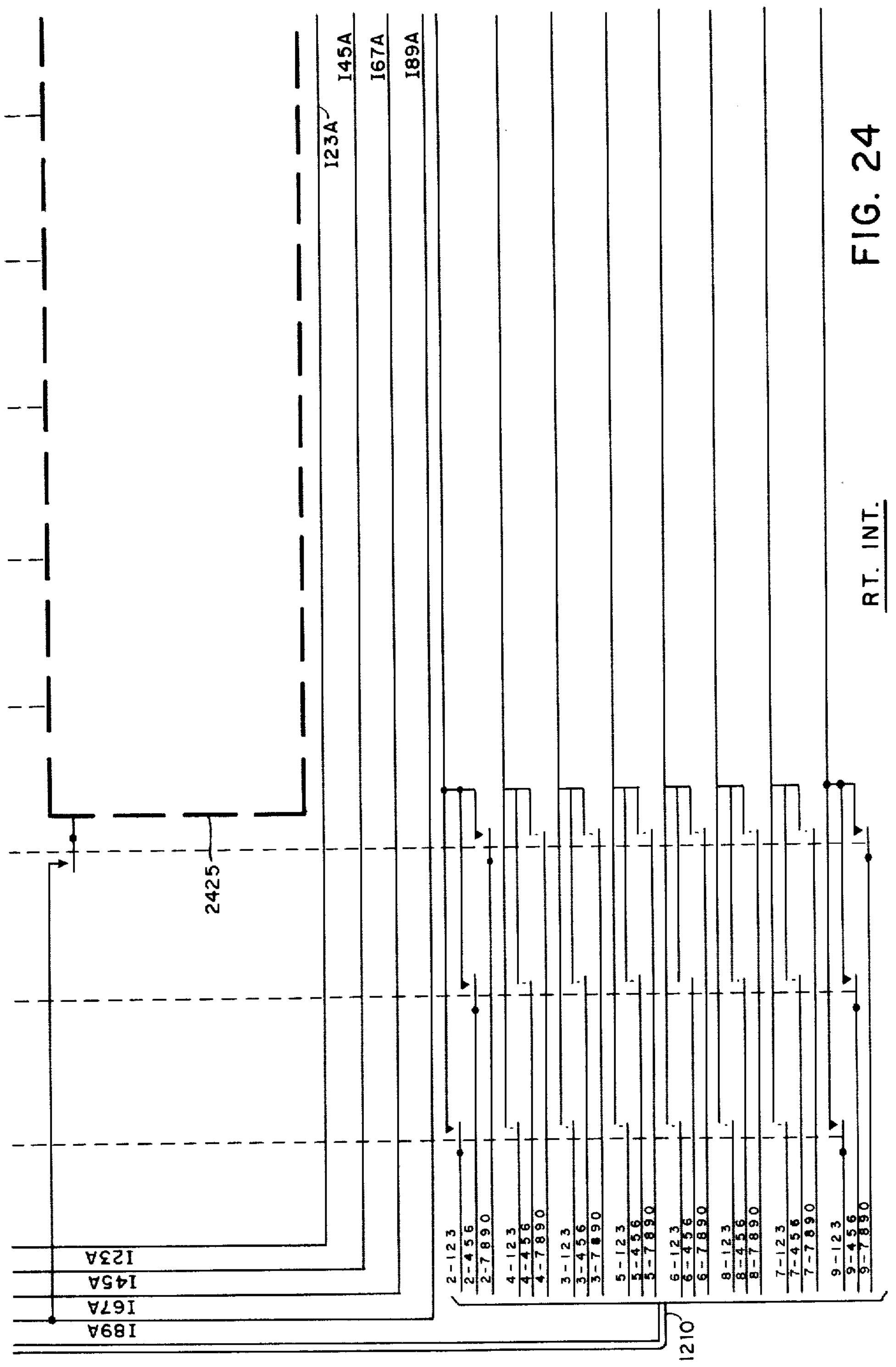
Figure 25:
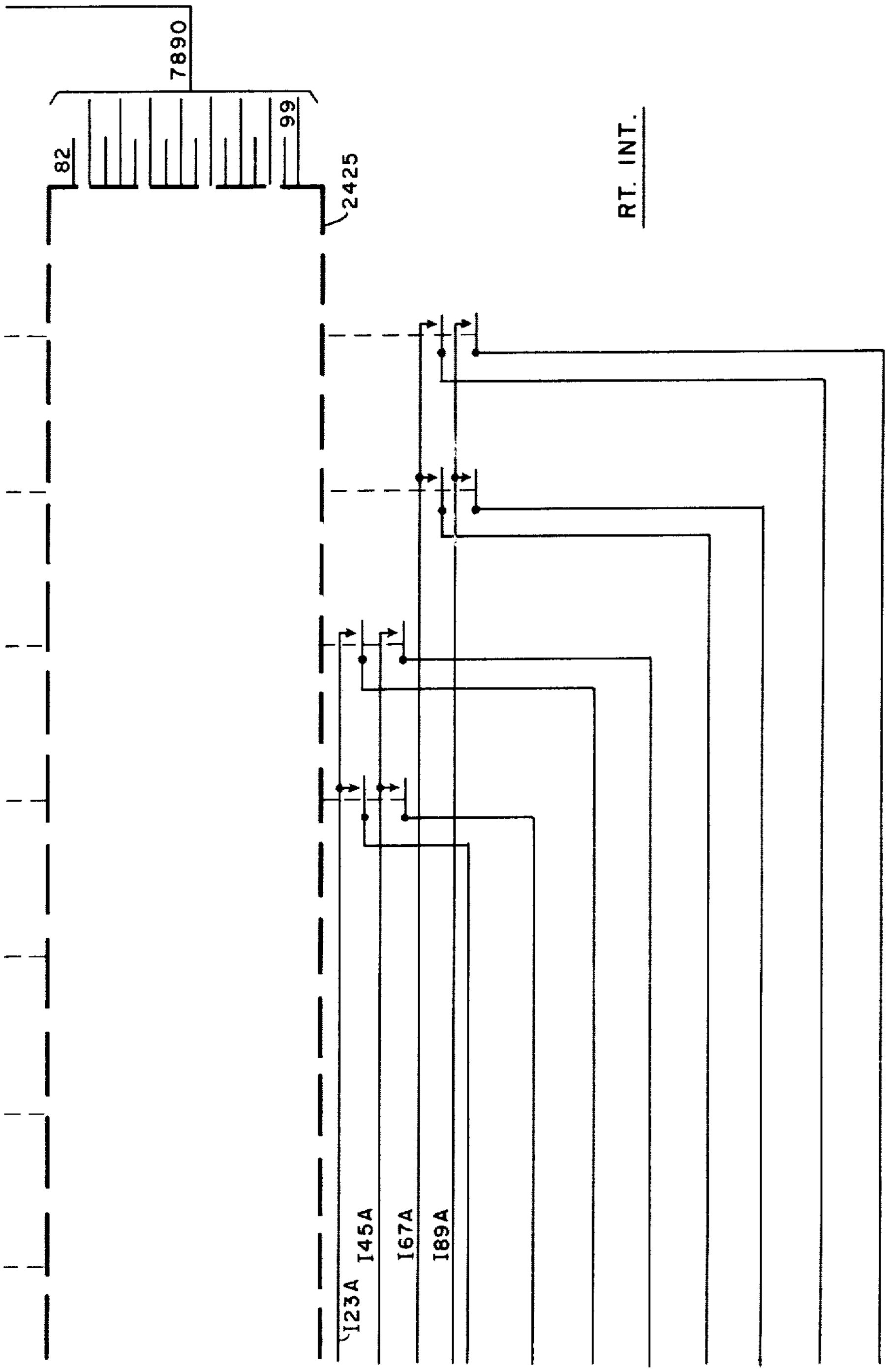

In the case where the three digits to be translated manifest an area code, so that the value of the second of the three digits is zero or one, the ground on the selected one of conductors I23A, I45A, I67A and I89A is forwarded through a particular one of the translating contacts shown in FIG. 25 of relays 15A24, 15A35, 21A68 or 21A79, respectively, and through a particular one of the translating contacts, shown in FIG. 24, of relays 14C123, 14C456 or 14C7890, respectively, to one of conductors 2–123 to 9–7890 inclusive. Conductors 2–123 to 9–7890 extend through cable 1210 to FIG. 13.

In FIG. 13, the ground on a selected one of conductors 2–123 to 9–7890 inclusive, such as conductors 3–456, 4–456, 5–123 and 6–7890, respectively, for example, shown in FIG. 13, is applied through the translating contacts of one of relay 13B0 or 13B1 to a selected one of conductors 30–456 to 61–7890. Conductors 30–456 to 61–7890 extend to other portions of route interpreter 116 through cable 1210.

It will be noted that the selected one of conductors such as conductors 30–456 to 61–7890 uniquely determine the values of the first and second digits of the area code to be translated, but that the third digit of the area code to be translated is merely broken down into groups 123, 456 and 7890.

Figure 26:
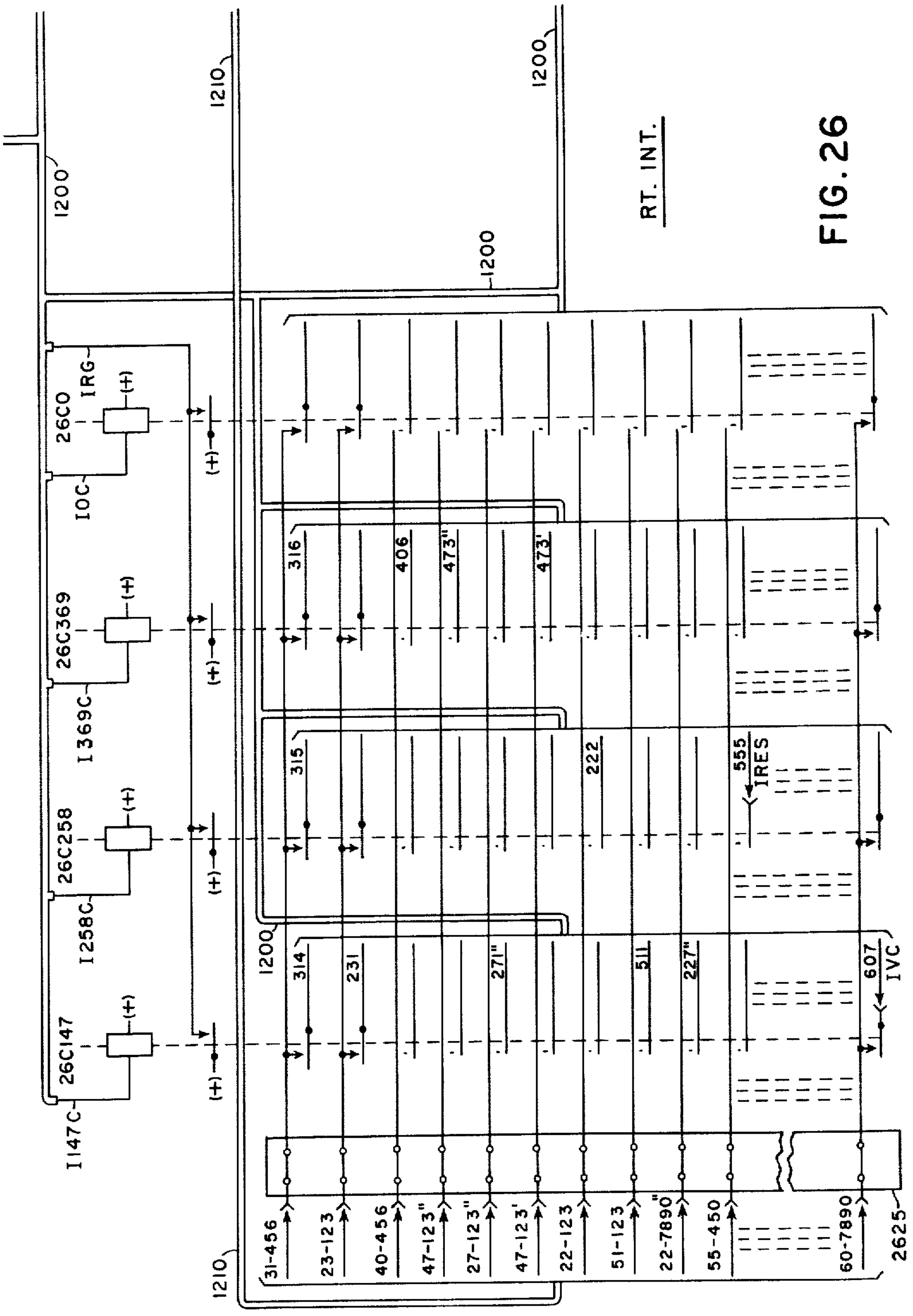
Figure 27:
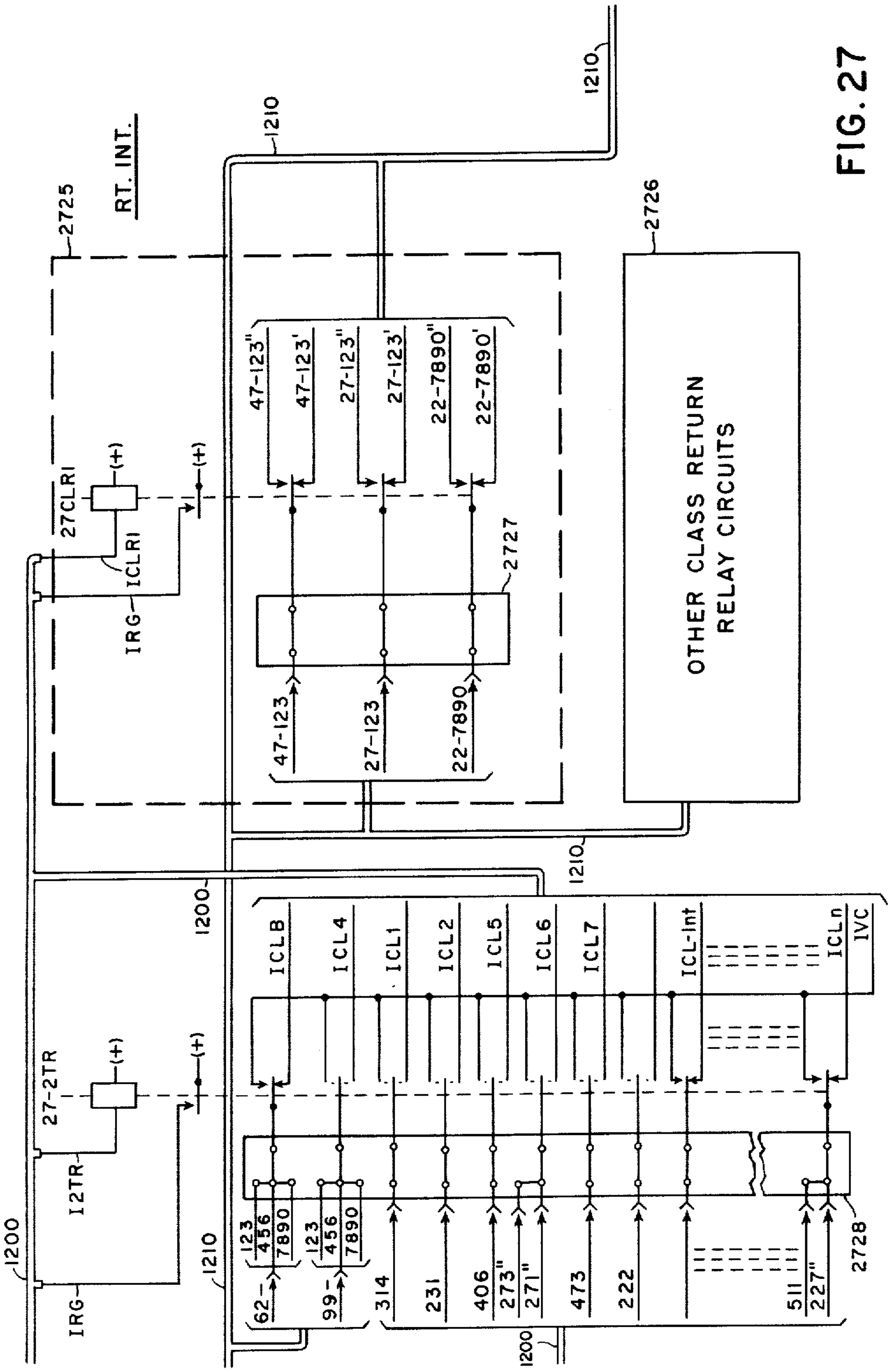

Referring now to FIGS. 26 and 27, there is shown translating relays 26C147, 26C258, 26C369, 26C0, 27–2TR and 27CLR1. Relay 27CLR1 is one of a group of identical class return relays, the others of which are indicated as included in block 2726. One side of each of these relays is connected to ground and the other side thereof is connected to a conductor corresponding thereto, conductors I147C, I258C, I369C, I0C, I2TR and ICLR1, respectively, being connected to relays 26C147, 26C258, 26C369, 26C0, 27-2TR and 27CLR1, respectively. Each relay is operated in response to resistance battery being applied thereto over the conductor connected thereto. As shown, in response to the operation of any of these relays ground is applied through contacts thereof to conductor IRG.

As previously described, resistance battery is applied to conductor ICLR1 only during a second translation which is required to ascertain the routing to a certain office, having a given office code, which is located in a certain foreign area. However, this given office code has a different significance during a first translation. It may represent the office code of a called office in the same area as the originating exchange, or it may represent a vacant or restricted code in the area in which the originating exchange is located. Therefore, all the class return relays, such as class return relay 27CLR1 includes a plurality of transfer contacts for discriminating between translations made in response to the same office code, depending upon whether the class return relay is operated or is unoperated at that time.

More particularly, as shown, the swingers of the transfer contacts of relay 27CLR1 are individually connected to terminal strip 2727. Strapped to each of the swingers at terminal strip 2727 are those particular conductors emanating from the outlined boxes shown in FIGS. 14–25 which represent office codes requiring discrimination by class return relay 27CLR1, as illustrated by conductors 47–123, 27–123 and 22–7890. The conductors connected to the stationary portions of the transfer contacts of relay 27CLR1, illustrated by conductors 47–123″, 47–123′, 27–123″, 27–123′, 22–7890″ and 22–7890′ extend through cable 1210 to terminal strip 2625.

All other conductors emanating from the outlined boxes of FIGS. 14–25 which manifest three-digit office codes, and the conductors emanating from FIG. 13, which manifest area codes, are extended to terminal strip 2625 in FIG. 26.

As shown, each terminal of terminal strip 2625 is connected to corresponding translating contacts of each of relays 26C147, 26C258, 26C369 and 26C0. The previously described conductors connected to terminal strip 2625, such as conductors 31–456, 23–123, 40–456, 47–123″, 27–123″, 47–123′, 22–123, 51–123, 22–7890, 55–456 and 60–7890, are, as shown, individually strapped to each terminal of terminal strip 2625.

As previously described, ground will be forwarded over a selected one of the conductors connected to terminal strip 2625 in accordance with the specific values of the first and second digits and the particular grouping, 123, 456 or 7890, of the third digit. Since one, and only one, of relays 26C147, 26C258, 26C369 and 26C0 is operated during any given translation, the ambiguity in the specific value of the third digit is resolved by the ground on the selected one of these conductors being applied through the translating contacts of the operated relay. For instance, ground will be forwarded over conductor 31–456, if the three digits to be translated are either 314, 315 or 316. If the value of the third digit is a 4, relay 26C147 will be operated, if it is a 5 relay 26C258 will be operated and if it is a 6, relay 26C369 will be operated.

If the three digits to be translated manifest a restricted code, such as is the case for the code 555, conductor IRES is strapped to the translating contacts associated with that code. This will result in ground being returned over conductor RES to the register sender then associated with route interpreter 116 if the three digits to be translated manifest the restricted code. In a manner previously described, a ground applied to conductor RES causes register sender to be released and a busy tone to be returned to the calling subscriber.

If a code manifests a vacant code, such as 607, for example, the translating contacts associated therewith are connected to conductor IVC. This will result in ground being applied to conductor IVC and returned over conductor VC to the register sender than associated with route interpreter 116. As previously described, the vacant code relay in the register sender is operated in response to ground being placed on conductor VC.

A conductor, such as conductors 314, 231, etc., is associated with each valid code. These conductors extend through cable 1200 to FIG. 27, where they are strapped to particular terminals of terminal strip 2728.

In the case where an office code is manifested by only two digits, the third or C digit represents the first digit of the directory number of the called subscriber. In this case, the same called office is indicated regardless of the specific value of the third digit. Therefore, it is not necessary to connect the conductors emanating from the outlined boxes shown in FIGS. 14–25 which manifest two-digit office code through the translating contacts of relays 26C147, 26C258, 26C369 and 26C0. Insaead, they are extended through cable 1210 directly to terminal strip 2728. Furthermore, there will be three of such conductors associated with any given first and second digit, such as 62, namely, conductors 62–123, 62–456 and 62–7890. This group of three conductors is connected to the same terminal on terminal strip 2728.

Each terminal on terminal strip 2728 is connected, as shown, through an individual one of a plurality of normal contacts of relay 27-2TR to a particular class conductor, such as conductors ICL3, ICL4, etc. The transfer contacts of relay 27-2TR are connected together to conductor IVC.

Thus, it will be seen that with relay 27-2TR unoperated, ground forwarded over any of the conductors connected to terminal strip 2728 will be applied to a particular class conductor in accordance with the particular terminal to which the first-mentioned conductor is strapped. In accordance therewith, a particular class relay in the register sender then associated with route interpreter 116 will be operated.

It is possible for the required routing instructions for two or more different codes to be identical. In that case, as shown for example by conductors 473″ and 271″, both conductors are strapped to the same terminal of terminal strip 2728, to thereby control the operation of the same class relay in response to ground being forwarded over either of conductors 473″ or 271″.

As previously described, resistance battery is applied to conductor I2TR to operate relay 27-2TR only where a second translation is required to provide an office code restriction check. With relay 27-2TR operated, ground will be forwarded to conductor VC for all codes except those which are restricted, and are therefore connected to conductor IRES, as described above. As previously described, the forwarding of ground over conductor IVC results in the operation of the VC relay in the register sender then associated with route interpreter 116.

It will be noted that all of the relays in route interpreter 116, except the connector relays, operate in response to resistance battery applied thereto from the register sender with which it is then associated, and that each of the connector relays is energized by raw battery applied thereto from the register sender with which it is associated. Therefore, route interpreter 116 is a passive circuit, including no battery supply of its own. This is a most desirable feature, since a short circuit of one of the battery conductors energizing the connector relay will, at most, blow a fuse in the register sender with which it is associated, putting that one register sender out of service, and a short circuit of any of the resistance battery carrying conductors in route interpreter 116 will not even be capable of blowing a fuse in the register sender because of the current limiting effect of the resistance in series therewith. Since route interpreter 116 is common equipment, it is much more desirable that a single one of the group of register senders fail in response to a short circuit, than that route interpreter 116 fail, putting the entire direct distance dialing portion of the originating exchange out of service.

In summary, route interpreter 116 includes means for translating a three-digit code applied thereto, means for altering the translation obtained from a particular code applied thereto during a second translation required to ascertain initially ambiguous routing instructions, means for discriminating between valid codes, and restricted or vacant codes, and means for selectively operating a particular class relay in accordance with the translation of a valid code.

3. CLASS RELAYS

Figure 8:
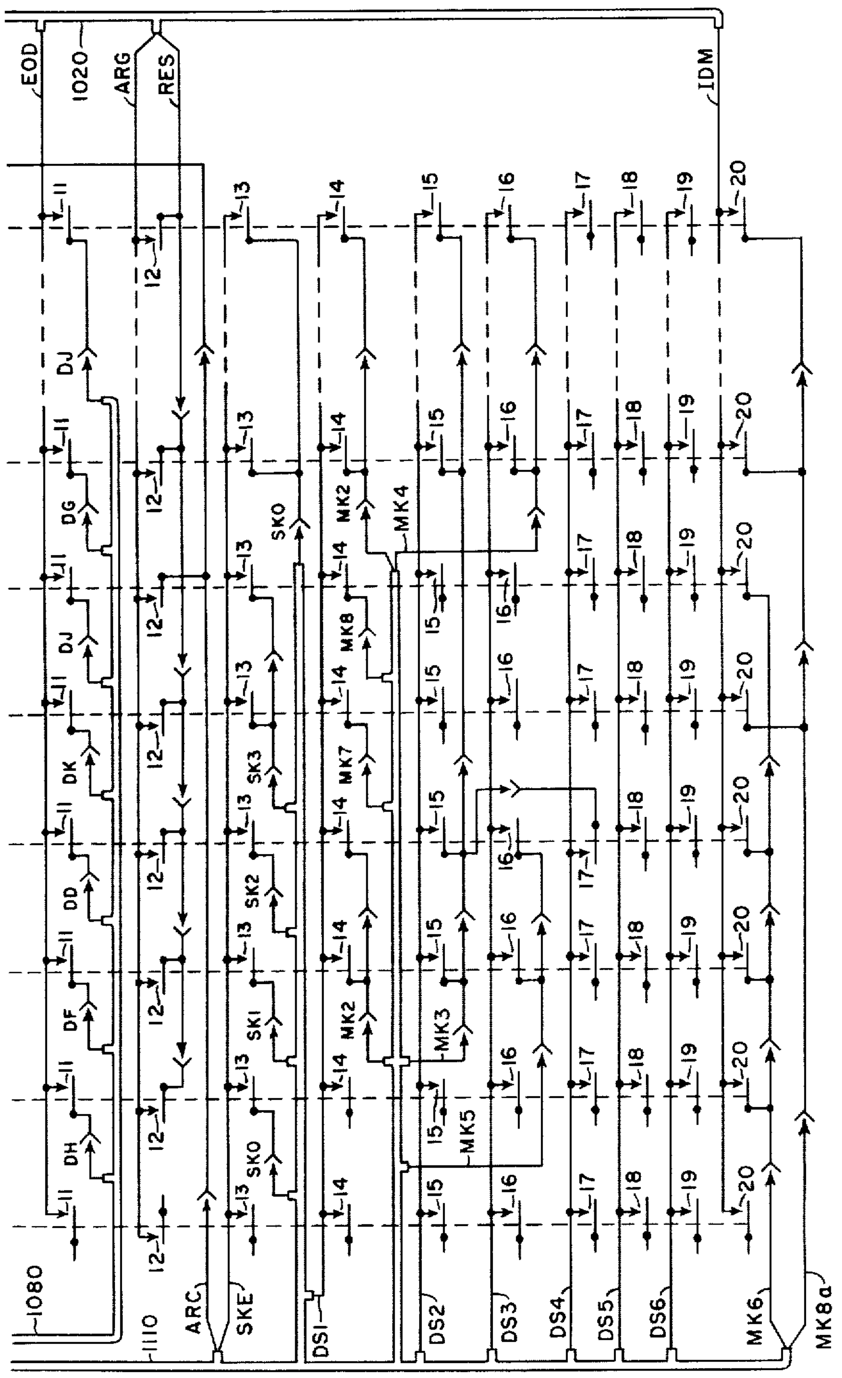

Reference will now be made to FIGS. 7 and 8 which show the class relay portion of register sender 114.

The class relay portion of register sender 114 consists of a group of *n* class relays, only the first seven of which, 7CLA to 7CLG inclusive, and the last of which, 7CL*n*, have been shown. The total number of class relays in the group in the actual system is determined by the specific routing requirements of that system. In practice, a group of between fifteen and twenty class relays is usually sufficient to handle all routing requirements.

As shown, each of the class relays has one side thereof connected to battery, and the other side thereof connected to a particular one of the class conductors CL1–CL*n* inclusive, which extend to FIG. 7 from route interpreter 116 through cable **118*a***.

As previously described, in response to a first translation of a valid code, ground will be returned to FIG. 7 from route interpreter 116 over a particular one of class conductors CL1–CL*n* inclusive, causing the class relay associated with this particular class conductor to be operated.

In operating, a class relay opens normally closed contacts 1, 3, 5 and 7 thereof, and closes normally open contacts 2, 4, 6 and 8–20 inclusive, thereof.

The opening of contacts 1 of the operated class relay breaks the previously described path for extending pulse ground on conductor PLG to conductor VCR. The closure of contacts 2 of the operated class relay completes a path for applying a holding ground thereto from conductor PLG through a chain of number "1" contacts of the unoperated class relays which are higher numbered than the operated class relay. The closure of contacts 6 of the operated class relay completes the previously described path for forwarding ground on conductor G1 to conductor CK1. As previously described, the application of ground to conductor CK1 is effective in causing route interpreter 116 to be dismissed. In response to the dismissal of route interpreter 116, the original operating ground for the operated class relay on the class conductor associated therewith is removed. However, the operated class relay remains operated over the previously described holding ground applied thereto through operated contacts 2 thereof.

The routing provided in response to the operation of any given class relay is controlled in accordance with the manner in which contacts 8 to 20 inclusive thereof are strapped.

The manner in which contacts 8 to 20 of any class relay are to be strapped to provide any given set of routing instructions is shown in the "Class Relay Strapping Chart" included in this specification.

CLASS RELAY STRAPPING CHART

| Condition | | Connect Through Contacts Of Cl Relay | |
|---|---|---|---|
| | | From Conductor | To Conductor |
| If Foreign Area Is Involved and | 2nd Translation Required | CLR | CLR (x) |
| | Office Code Restriction Check | | 2TR |
| If Number Of Prefix Routing Digits To Be Sent Is | 0 | OPG (usual) or 2TK (if CLR connected to 2TR) | AD0 |
| | 1 | | AD1 |
| | 2 | | AD2 |
| | 3 | | AD3 |
| | 4 | | AD4 |
| | 5 | | AD5 |
| | 6 | | AD6 |
| If Number Of Dialed Digits To Be Registered Is | 4 | EOD | DD |
| | 5 | | DE |
| | 6 | | DF |
| | 7 | | DG |
| | 8 | | DH |
| | 9 | | DI |
| | 10 | | DJ |
| | 7 or 8 | 2TK | DG |
| | | EOD | DH |
| | 10 or 11 | 2TK | DJ |
| | | EOD | DK |
| Alternate Route | No | ARG | RES |
| | Yes | | ARC |

CLASS RELAY STRAPPING CHART—Continued

| Condition | | Connect Through Contacts Of C1 Relay — From Conductor | To Conductor |
|---|---|---|---|
| If Number Of Registered Digits To Be Skipped In Outpulsing Is | 0 | SKE | SK0 |
| | 1 | | SK1 |
| | 2 | | SK2 |
| | 3 | | SK3 |
| | 4 | | SK4 |
| | 5 | | SK5 |
| If Specific Value Of Each Prefix Routing Digit To Be Sent Is | 1 | DS1 (AD1) | MK1 |
| | 2 | | MK2 |
| | 3 | DS2-DS1 (AD2) | MK3 |
| | 4 | | MK4 |
| | 5 | DS3-DS1 (AD3) | MK5 |
| | 6 | | MK6 |
| | 7 | DS4-DS1 (AD4) | MK7 |
| | 8 | | MK8 |
| | 9 | DS5-DS1 (AD5) | MK9 |
| | 0 | DS6-DS1 (AD6) | MK0 |
| If Interdigital Time Is | 600 ms | IDM | MK6 |
| | 800 ms | | MK8a |

Referring to the "Class Relay Strapping Chart," it will be seen that if a foreign area is involved and a second translation is required to ascertain the routing, one of the conductors CLR($x$), such as CLR1, will be strapped to conductor CLR through contacts 8 of the operated class relay. In this case, contacts 9 to 20 inclusive of the operated class relay are not strapped, since the ascertaining of the specific routing instructions must await a second translation. In response to the second translation, a second different class relay will be operated in the manner previously described. It is required that the second-operated class relay be higher numbered than the first-operated class relay, so that the opening of contacts 1 of the second-operated class relay will break the previously described path for applying holding ground to the first-operated class relay, causing the first-operated class relay to restore. This can be accomplished by properly choosing the strapping in route interpreter 116 to the class conductors associated with the first- and second-operated class relays.

The specific routing instructions are ascertained by the strapping of contacts 9 to 20 inclusive of the second-operated class relay.

As shown in the "Class Relay Strapping Chart," if a foreign area is involved and an office code restriction check is required, second trial conductor 2TR is strapped to conductor CLR through contacts 8 of the class relay operated in response to the translation of the foreign area code. As previously described, this will result in relay 2TR in route interpreter 116 being operated during the second translation, so that if a valid office code is indicated by the second translation, relay 4VC will be operated.

In this case, contacts 9 to 20 inclusive of the operated class relay are strapped to provide the required routing instructions.

If no second translation is required either to ascertain the routing or to provide an office code restriction check, contacts 8 of the operated class relay will be left unstrapped.

The number of prefix routing digits to be sent may vary from 0 to 6. As shown in the "Class Relay Strapping Chart," a selected one of add conductors AD0 to AD6 inclusive, in accordance with the particular number of prefix routing digits to be sent in any given case, is usually strapped to outpulsing ground conductor OPG through contacts 10 of an operated class relay.

Outpulsing ground is therefore applied from conductor OPG to the selected one of conductors AD0 to AD6 inclusive, if the selected one of conductors AD0 to AD6 inclusive is, as usual, strapped to conductor OPG through contacts 10 of the operated class relay. As will hereinafter be described in detail, the application of outpulsing ground to any one of conductors AD0 to AD6 inclusive causes outpulsing to be initiated.

As previously mentioned, the initiation of outpulsing prevents a second translation from taking place. Therefore, if a second translation is required, it is essential that outpulsing be delayed until after the second translation has been made.

The situation when a second translation is required to ascertain the routing instructions need not be considered, since in this case, as previously described, all of contacts 9 to 20 of the first-operated class relay are left unstrapped. However, in the case where a second translation is required to provide an office code restriction check, so that, as previously described, conductor 2TR is strapped to conductor CLR through contacts 8 of the operated class relay, it is necessary, as shown in the "Class Relay Strapping Chart" to strap the selected one of conductors AD0 to AD6 inclusive to second trial check conductor 2TK through contacts 9 of the operated class relay, instead of conductor OPG through contacts 10 of the operated class relay. Conductor 2TK extends through cable 1120 to FIG. 4, where it is connected through normally open contacts 4VC3 of relay 4VC to outpulsing ground conductor OPG.

Since the path, just described, for applying outpulsing ground to the selected one of conductors AD0 to AD6 inclusive is broken at normally open contacts 4VC3, the initiation of outpulsing will be prevented until contacts 4VC3 are closed in response to the operation of relay 4VC. As previously described, relay 4VC will be operated in response to the office code restriction check provided by the second translation indicating a valid code. In response thereto, outpulsing is initiated by the completion of the previously described path for applying outpulsing ground on conductor OPG in FIG. 4 to the selected one of conductors AD0 to AD6 inclusive through now-operated contacts 4VC3.

Included in the routing instructions provided by an operated class relay is the total number of dialed digits to be registered. This number is made up of the sum of the digits in the area code, if the call is to a foreign area, the office code and the directory number of the called subscriber. In most cases, all called subscribers of any given office have the same number of digits in their respective directory numbers. However, there are some offices in which the directory number of called subscribers on party lines has one more digit than the directory number of called subscribers on private lines.

In the former case, the total number of digits to be expected is certain. However, in the latter case, the total number of digits to be expected is uncertain. It is only possible to determine that at least a given number of digits is to be expected, and that the total number of digits is equal to either this given number or to one more than this given number.

As shown in the "Class Relay Strapping Chart," where the number of dialed digits to be registered is certain, the one of digit conductors DD to DJ inclusive, which corresponds to the number of dialed digits to be registered, is strapped to conductor EOD through contacts 11 of the operated class relay. Each of digit conductors DD to DK inclusive extends through cable 1080 to FIG. 3, where, as previously described, it is connected through off-normal contacts corresponding to 3DRON2 of the digit register with which it is associated to conductor PLG. Thus, pulse ground will be applied to each digit conductor DD to DK inclusive, in response to the registration of a dialed digit in the digit register with which it is associated. Therefore, in response to the registration of the last dialed digit to be expected, pulse ground will be forwarded to end-of-dial conductor EOD through the digit conductor strapped thereto and through contacts 11 of the operated class relay. Conductor EOD extends through cable 1020 back to FIG. 2, where the pulse ground thereon is effective in operating relay 2EOD.

In operating, relay 2EOD closes normally open contacts 2EOD1 thereof and opens normally closed contacts 2EOD2 thereof. In the manner previously described, the opening of contacts 2EOD2 prevents any further digits dialed by the calling subscriber to be registered.

As shown in the "Class Relay Strapping Chart," if the number of dialed digits to be registered is uncertain, such as 7 or 8, or 10 or 11, the digit conductor associated with the lower of the two uncertain numbers is strapped to conductor 2TK through contacts 9 of the operated class relay, and the digit conductor associated with the higher of the two uncertain numbers is strapped to conductor EOD through contacts 11 of the operated class relay.

In response to the registration of the lower of the two uncertain digits, pulse ground will be forwarded from the digit register associated therewith over the digit conductor associated therewith, in the manner previously described, and applied to conductor 2TK through contacts 9 of the operated class relay. This ground on conductor 2TK prepares a path for the operation of relay 2DU in FIG. 2, which extends over conductor 2TK through cable 1120 to FIG. 4, through normal contacts 4VC4 to conductor DU*a* which extends to FIG. 5 through cable 1020, and then through normally open contacts 5SRA4 to conductor DU which extends through cable 1050 to FIG. 2, and then through normally closed contacts 2DU6 and relay 2DU to grounded battery. Since this path is broken at normally open contacts 5SRA4, relay 2DU will operate only in response to the operation of relay 5SRA. The operation of relay 5SRA will be discussed below in connection with outpulsing.

If the called subscriber is on a private line, the calling subscriber will not dial the higher numbered of the two uncertain digits. However, if the called subscriber is on a party line, the calling subscriber will dial the higher numbered of the two uncertain digits. In response to the registration of the higher numbered uncertain digit in the digit register associated therewith, pulse ground will be applied over the digit conductor associated therewith to conductor EOD through contacts 11 of the operated class relay, in the manner previously described. As previously described, the application of ground to conductor EOD will result in the operation of relay 2EOD in FIG. 2.

As shown in the "Class Relay Strapping Chart," if no alternate route exists conductor RES is strapped to alternate route ground conductor ARG through contacts 12 of the operated class relay. If an alternate route does exist, alternate route control conductor ARC is strapped to conductor ARG through contacts 12 of the operated class relay.

As will be discussed in detail hereinafter in connection with out-pulsing, ground is applied to conductor ARG in response to the primary route being found busy. If no alternate route exists, this ground is forwarded through conductor RES, which, as previously described, results in the register sender being released and busy tone being returned to the calling subscriber.

As shown, conductor ARC is strapped to a second different class relay higher in number than the operated class relay. Therefore, if an alternate route does exist, in response to the primary route being found busy, ground will be applied to this second class relay, causing it to operate. As previously described, the operation of the second-operated class relay breaks the holding ground for the first-operated class relay, so that the first-operated class relay restores. The second-operated class relay provides routing instructions for the alternate route.

Alternate route control conductor ARC is also extended through cable 1110 to FIG. 6, where it performs functions which will be described hereinafter in connection with outpulsing.

In outpulsing, the sender may skip outpulsing the digits registered in a first portion of the digit registers. The number of digits to be skipped in outpulsing is controlled by strapping a selected one of conductors SK0–SK5 inclusive, in accordance with the number of registered digits to be skipped, to conductor SKE through contacts 13 of the operated class relay. Conductors SKE and SK0–SK5 inclusive, extend through cable 1110 to FIG. 6, where they perform functions which will be described hereinafter in connection with outpulsing.

As shown in the "Class Relay Strapping Chart," if one prefix routing digit is to be sent, a selected one of conductors MK1–MK0 inclusive, in accordance with the specific value of the prefix routing digit to be sent, is strapped to conductor DS1 through contacts 14 of the operated class relay. If two prefix routing digits are to be sent, a first selected one of conductors MK1–MK0 inclusive, in accordance with the specific value of the first prefix routing digit to be sent, is strapped to conductor DS2 through contacts 14 of the operated class relay, and a second selected one of conductors MK1–MK0 inclusive, in accordance with the specific value of the second prefix routing digit to be sent, is strapped to conductor DS1 through contacts 13 of the operated class relay. In general, a selected one of conductors MK1–MK0 inclusive, in accordance with the last prefix routing digit to be sent, is connected to conductor DS1; a selected one of conductors MK1–MK0 inclusive, in accordance with the specific value of the next-to-last prefix routing digit to be sent, is strapped to conductor DS2; a selected one of conductors MK1–MK0 inclusive, in accordance with the second from the last prefix routing digit to be sent, is strapped to conductor DS3, etc.

The interdigital time normally provided during outpulsing is 600 milliseconds. However, if the call is to be extended through a switching center which has facilities for returning a stop dial signal, an 800 millisecond interdigital time is provided until the call has been extended to the switching center. As shown in the "Class Relay Strapping Chart," if a 600 millisecond interdigital time is to be provided at all times, conductor MK6 is strapped to interdigital marking conductor IDM through contacts 20 of the operated class relay, and if an 800 millisecond interdigital time is to be provided after the call has been extended to a switching center, conductor MK8*a* is strapped to conductor IFM through contacts 20 of the operated class relay.

In summary, it will be seen that the routing provided by the operation of any class relay is completely controlled by the strapping of the contacts thereof.

C. *Outpulsing*

1. INITIATION OF OUTPULSING

As previously discussed, outpulsing is initiated in response to outpulsing ground on conductor OPG being applied to a selected one of conductors AD0–AD6 inclusive, in accordance with the strapping of the operated class relay.

Assuming the selected one of connectors AD0–AD6 inclusive is conductor AD6, add relay 6ADF will be operated by outpulsing ground on AD6, which is applied through the lower and upper windings of two-step relay 6ADF to grounded battery, causing complete operation thereof. In operating, relay 6ADF opens normally closed contacts 1, 3 and 6 thereof, and closes normally open contacts 2, 4 and 5 thereof.

The opening of contacts 1 of relay 6ADF, breaks the previously described path for applying operating ground to relay 4STB. The closure of contacts 2 of relay 6ADF causes outpulsing ground on conductor OPG to be applied to conductor PST. Conductor PST extends through cable 1020 to FIG. 5, where the ground thereon is applied through normal contacts 5RLS8 to conductor STP, and is also applied through normal contacts 5RLS6, 5PCA4, 5AR9*a* and resistance 5R1 to conductor PLO. In addition, master ground is applied through normal contacts 5AR4 to conductor SO. As previously described, the grounds applied to conductors PLO and SO are effective in seizing and holding outgoing selector 110.

Figure 9:
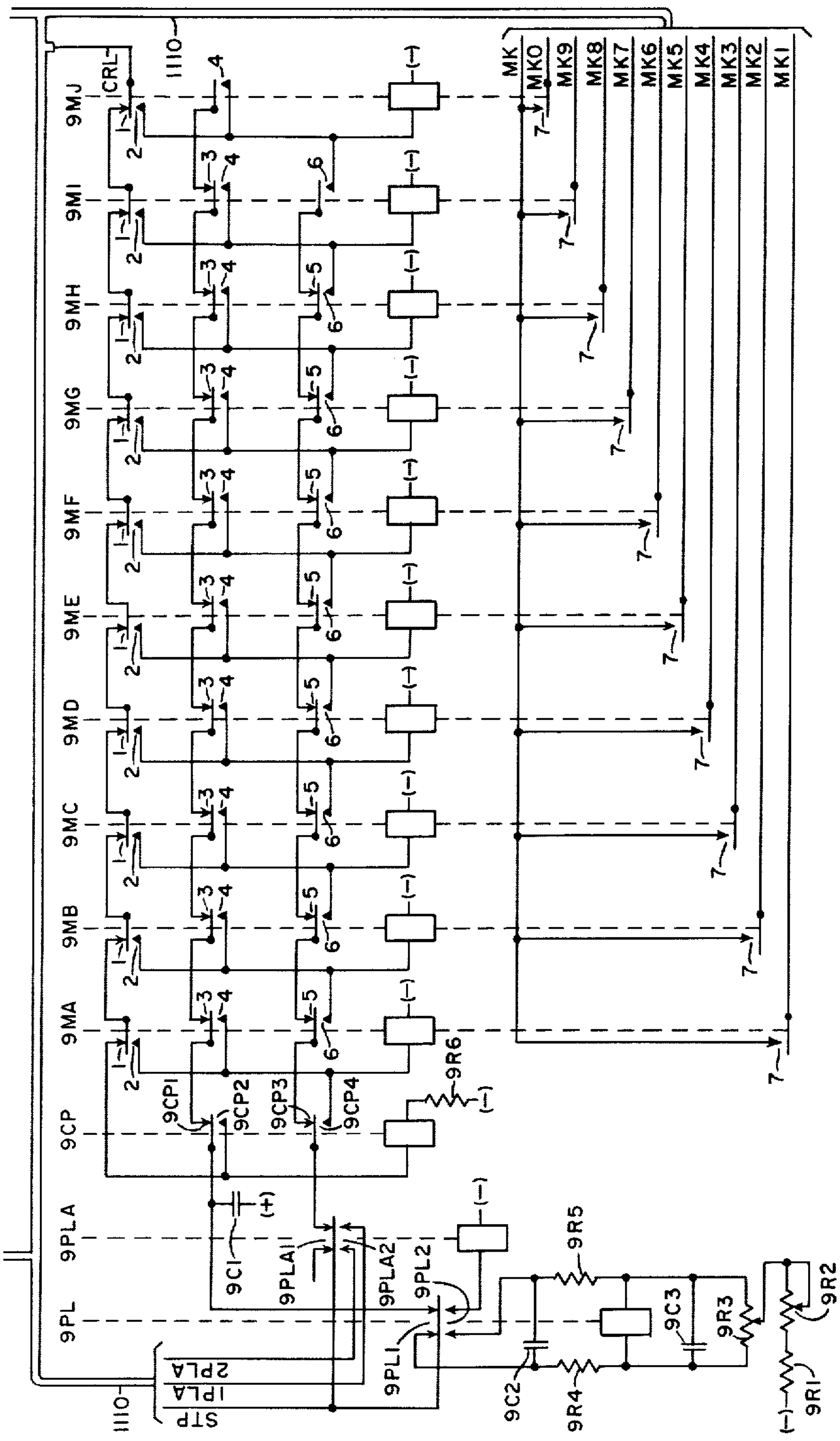

The ground applied to conductor STP is extended through cable 1110 to FIG. 9, which includes the pulse generator and counter portion of register sender 114, and is then applied through normal contacts 9PL1 and resistance 9R4 to one side of mercury pulse generator relay 9PL. Relay 9PL has resistance battery applied to both sides thereof through resistance 9R1, 9R2 and voltage divider 9R3. Relay 9PL is shunted by capacitance 9C3, and by resistance 9R4, capacitance 9C2 and resistance 9R5, as shown. As connected, the current through relay 9PL will build up in accordance with the charging time constant of the network made up of resistances 9R1–9R5 inclusive and capacitance 9C2 and 9C3, to finally cause relay 9PL to operate. In operating relay 9PL will open normally closed contacts 9PL1 thereof and close normally open contacts 9PL2 thereof.

The opening of contacts 9PL1 and the closure of contacts 9PL2 transfers the application of ground on conductor STP from one side of relay 9PL to the other side thereof. This causes relay 9PL to restore after a time determined by the discharge time constant of the network made up of resistances 9R1–9R5 inclusive and capacitances 9C2 and 9C3. The process is then repeated so long as ground is maintained on conductor STP. In this manner, relay 9PL generates pulses.

The repetition rate and the duration of each pulse may be set by adjustment of resistances 9R2 and 9R3.

As shown, mercury relay 9PLA is energized intermittently by the ground on conductor STP in response to each closure of contacts 9PL2, so that it will operate as a slave to relay 9PL.

In response to each operation of relay 9PLA, normally closed contacts 9PLA1 thereof are opened and normally open contacts 9PLA2 thereof are closed. Each closure of contacts 9PLA2 is effective in applying a ground pulse to each of conductors 1PLA and 2PLA. Each of the ground pulses applied to conductors 1PLA and 2PLA are slightly delayed relative to the pulse generated by relay 9PL, due to the operate time of relay 9PLA.

The ground present on conductor STP is applied in FIG. 5 to conductor CRL through normal contacts 5MK4, 5PC3 and 5PCA9, and resistance 5R4. Conductor CRL extends through cable 1110 to FIG. 9, where the ground thereon is applied through the chain of number "1" contacts of relays 9MJ to 9MA inclusive, and then applied through counter prime relay 9CP and resistance 9R6 to grounded battery, causing relay 9CP to operate. In operating, relay 9CP opens normally closed contacts 9CP1 and 9CP3 thereof and closes normally open contacts 9CP2 and 9CP4 thereof.

In response to relays 9PL and 9PLA being in a restored condition, holding ground for relay 9CP is applied thereto through contacts 9PL1 and operated contacts 9CP2 thereof, and operating ground for relay 9MA is applied thereto through contacts 9PLA1 and operated contacts 9CP4 thereof, causing relay 9MA to operate.

In operating, relay 9MA opens normally closed contacts 1, 3 and 5 thereof and closes normally open contacts 2, 4, 6 and 7 thereof. The opening of contacts 1 and the closure of contacts 2 on relay 9MA transfers the ground formerly extending to relay 9CP from conductor CRL to relay 9MA. Relay 9CP remains operated over the previously described holding ground applied thereto through contacts 9PL1, until relay 9PL operates. At that time relay 9CP restores. Relay 9MA remains operated over the ground extended thereto from conductor CRL, after relay 9PLA operates.

When relay 9PL and 9PLA again restore, at the end of a pulse, a holding ground is applied to relay 9MA through normal contacts 9PL1, 9CP1 and operated contacts 4 of relay 9MA, and an operating ground for relay 9MB is applied through normal contacts 9PLA1, 9CP3 and operated contacts 9MA6, causing relay 9MB to operate.

In operating, relay 9MB opens normally closed contacts 1, 3 and 5 thereof, and closes normally open contacts 2, 4 6 and 7 thereof. The opening of contacts 1 and the closure of contacts 2 of relay 9MB has the same affect as that previously described for relay 9MA, so that when relay 9PL and 9PLA reoperate, at the beginning of the next pulse, relay 9MA will restore in response to the removal of the holding ground therefor.

In a similar manner, each of relays 9MC to 9MJ will tend to operate in response to successive pulses.

However, depending on the strapping of an operated class relay, the operation of either relays 9MF or 9MH prepares a path for applying ground to conductor MK. The path extends from conductor 2PLA in FIG. 9 through cable 1110 to FIG. 5, and then through normal contacts 5PCA7 to conductor IDM which extends through cable 1020 to FIG. 8, and then through contacts 20 of an operated class relay either to conductor MK6 or conductor MK8*a*, as the case may be. Conductor MK6 extends back to FIG. 9 through cable 1110, and then in FIG. 9 through contacts 7 of operated relay 9MF to conductor MK. Conductor MK8*a* extends to FIG. 6 through cable 1110, and then through normal contacts 6ARO6 to conductor MK8, which extends through cable 1110 back to FIG. 9, where it is connected through contacts 7 of operated relay 9MH to conductor MK. Conductor MK extends through cable 1110 back to FIG. 5, and then through resistance 5R3, normal contacts 5PCA2, and relay 5PC to grounded battery.

When, in response to the next operation of relay 9LA, ground is applied from conductor STP to conductor 2PLA through operated contacts 9PLA2, relay 5PC will operate over the prepared path described above; relay 9ME will release in response to the removal of the holding ground therefor, and relay 9MF will be held operated solely through the ground extended therethrough over conductor CRL, in the manner described above.

In operating, relay 5PC closes normally open contacts 5PC1 and 5PC2 thereof, and opens normally closed contacts 5PC3 thereof. The closure of contacts 5PC1 forwards the ground on conductor MK to the right side of relay 5PCA through normal contacts 5PCA2, operated contacts 5PC1 and resistance 5R2. However, ground is also applied from conductor STP to the left side of relay 5PCA through normal contacts 5SRA3 and 5MK3. Therefore, relay 5PCA is shunted, and does not operate at this time.

The opening of contacts 5PC3 breaks the previously described path for applying ground to conductor CRL through normal contacts 5PC3 and 5PCA9. Since relay 9MF is held operated solely by the ground extended thereto over conductor CRL, the removal of ground from conductor CRL causes relay 9MF to restore, thereby reopening contacts 7 thereof and breaking the previously described path for applying ground to conductor MK.

Removal of ground from conductor MK removes the previously described shunting of relay 5PCA, which now operates in series with relay 5PC over a path extending from conductor STP through normal contacts 5SRA3, 5MK3, relay 5PCA, resistance 5R2, operated contacts 5PC1, relay 5PC to grounded battery.

In operating, relay 5PCA opens normally closed contacts 5PCA1, 5PCA2, 5PCA4, 5PCA7 and 5PCA9 thereof, and closes normally open contacts 5PCA3, 5PCA5, 5PCA6 and 5PCA8 thereof.

The opening of contacts 5PCA4 and the simultaneous closure of contacts 5PCA5 transfers the previously described connection on outpulsing conductor PLO from conductor PST, which applies a steady ground thereto, to conductor 1PLA, which applies a pulse ground thereto. Since relay 9PLA is operated at the time relay 5PCA operates, the ground on conductor PLO is maintained momentarily. However, with the next restoration of relay 9PLA, outpulsing of the first digit to be sent is commenced.

The closure of contacts 5PCA8 reestablishes the ground on conductor CRL over a path extending from conductor STP through normal contacts 5MK4 and operated contacts 5PC2 and 5PCA8. Therefore, relay 9CP is reoperated and the pulse counter starts a new cycle of operation, counting the number of pulses in the first outpulsed digit.

Thus, it will be seen that a preliminary interdigital period precedes the initiation of outpulsing, to provide time for the pulse generator to stabilize.

2. OUTPULSING OF PRELIMINARY ROUTING DIGITS

As previously described, relay 6ADF has been operated, on the assumption that conductor AD6 is the selected one of conductors AD0–AD6 inclusive strapped through contacts fo the operated class relay.

Figure 6:
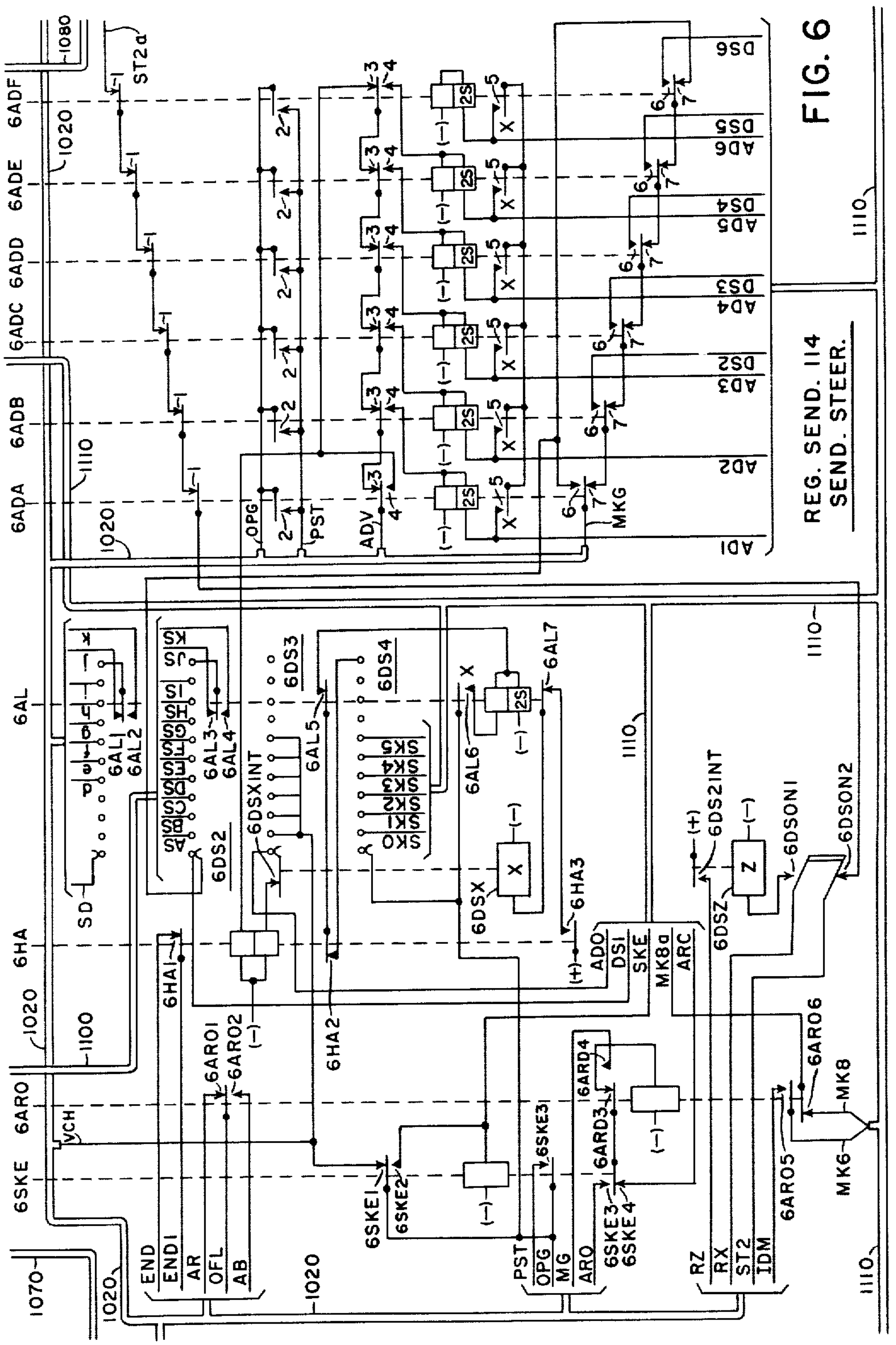

The closure of contacts 5PCA6 completes a connection from conductor 2PLA through operated contacts 5PCA6 to marking ground conductor MKG which extends through cable 1020 to FIG. 6, where it is extended through a chain of contacts number 7 of add relays 6ADA to 6ADE inclusive, and contacts 6 of operated relay 6ADF to conductor DS6. As previously described, conductor DS6 is strapped through contacts of the operated class relay to a selected one of conductors MK1 to MK0 inclusive, in accordance with the specific value of the first prefix routing digit. Conductors MK1 to MK0 inclusive, extend through cable 1110 to FIG. 9.

As previously described, a ground pulse is applied to conductor 2PLA from conductor STP through contacts 9PLA2 each time relay 9PLA operates. These ground pulses are therefore applied to the selected one of conductors MK1–MK0 inclusive over the above-described connection. Nothing happens in response to these ground pulses, until the particular one of relays 9MA–9MJ, associated with the selected one of conductors MK1–MK0 inclusive, operates in response to the counter having counted the proper number of pulses in the first outpulsed digit. In operating, this particular one of relays 9MA–9MJ closes normally open contacts 7 thereof, connecting the selected one of conductors MK1–MK0 inclusive to conductor MK. Therefore, the next following ground pulse on conductor 2PLA is applied to conductor MK.

This ground pulse on conductor MK is forwarded through resistance 5R3, operated contacts 5PCA3 and the lower winding of relay 5MK to grounded battery, causing relay 5MK to operate. In operating, relay 5MK closes normally open contacts 5MK1 and 5MK2 thereof, and opens normally closed contacts 5MK3 and 5MK4 thereof.

The closure of contacts 5MK1 completes a path for applying the ground pulse on conductor 2PLA through operated contacts 5MK1 and the upper winding of relay 5MK to grounded battery, insuring that relay 5MK will remain operated until the end of this ground pulse. The opening of contacts 5MK4 breaks the previously described connection for applying ground to conductor CRL, causing the operated one of relays 9MA–9MJ inclusive to restore in a manner previously described. The opening of contacts 5MK3 breaks the previously described energizing path for relays 5PCA and 5PC, causing them to restore. The closure of contacts 5MK2 completes a path for applying master ground through operated contacts 5MK2 and normal contacts 5END2 to advance conductor ADV. Conductor ADV extends through cable 1020 to FIG. 6, where the ground thereon is extended through a chain of number "3" contacts of relays 6ADA–6ADE inclusive, and contacts 4 of operated relay 6ADF to the right side of the lower winding of two-step relay 6ADE and through the upper winding thereof to grounded battery. In response to the energization of only the upper winding of two-step relay 6ADE, only preliminary contacts 5 thereof are closed. The closure of contacts 5 of relay 6ADE causes the ground on conductor AD6 to be applied through operated contacts 5 of relay 6ADF and 6ADE to the left side of the lower winding of relay 6ADE, thereby shunting the lower winding of relay 6ADE.

In response to the next restoration of relay 9PLA, ground is removed from conductor 2PLA, causing relay 5MK to be deenergized, so that relay 5MK restores. The reopening of contacts 5MK2 in response to the restoration of relay 5MK removes the previously described ground on conductor ADV, breaking the shunt on the lower winding of relay 6ADE, causing both windings thereof to be energized in series. Therefore, relay 6ADE operates, opening normally closed contacts 1, 3 and 7 thereof and closing normally open contacts 2, 4 and 6 thereof.

The opening of contacts 3 and the closure of contacts 4 of relay 6ADE, transfers the extension of conductor ADV from relay 6ADE to relay 6ADD. The opening of contacts 7 and the closure of contacts 6 of relay 6ADE transfers the extension of conductor MKG from conductor DS6 to conductor DS5.

The reclosure of contacts 5MK4 reestablishes the original energization path for conductor CRL through normal contacts 5MK4, 5PC3 and 5PCA9. Therefore, the counter begins a new cycle of operation.

It will be seen that, except for the fact that relay 6ADE is now operated, the situation is identical to that which existed prior to the preliminary interdigital period. Therefore, the sequence of operations is repeated, an interdigital period being first provided, followed by the outpulsing of the second prefix routing digit.

Since relay 6ADE is now operated and conductor MKG is extended to conductor DS5, instead of DS6, relay 5MK will be reoperated when the number of outpulses equals the number of the selected one of conductors MK1–MK0 inclusive strapped to conductor DS5 through the contacts of the operated class relay, which manifest the specific value of the second prefix routing digit. In response to the second operation of relay 5MK, ground will be applied over conductor ADV to effect the operation of relay 6ADD, in the same manner previously described in connection with relay 6ADE.

In a similar manner, each of add relays 6ADC, 6ADB and 6ADA, respectively, are successively operated in response to the completion of outpulsing of the third, fourth and fifth prefix routing digits, respectively, and, in the manner previously described, an interdigital period is provided between the outpulsing of successive digits, so that in response to the operation of relay 6ADA, the sixth prefix routing digit will be outpulsed following an interdigital period.

With relay 6ADA operated, conductor 14MKG is now connected to conductor DS1 through contacts 6 of operated relay 6ADA, and the wiper and home level of bank 6DS2 of the digit sender switch.

The above discussion was based on the assumption that outpulsing was initiated in response to conductor AD6 being the selected one of conductors AD0–AD6 inclusive, in accordance with the strapping of the contacts of the operated class relay. However, if the selected one of conductors AD0–AD6 inclusive is AD1–AD5, respectively, the add relay associated with this selected one of conductors AD1 to AD5 will be initially operated, rather than relay 6ADF. It will be seen that the only effect of initially operating an add relay which is lower in number than relay 6ADF, is to start outpulsing at a lower point in the add relay chain. In this case, each of the add relays lower in the chain than the initially operated add relay will be successively operated, in the manner previously described, but the add relays higher in the chain than the initially operated add relay will never be operated. In this manner, the number of prefix routing digits which are sent is in accordance with the selected one of conductors AD1 to AD5.

3. ALTERNATE ROUTE

The outpulsing of the prefix routing digits is normally effective in operating the forward switch train to extend a connection to a given office or switching center. However, if a busy condition is encountered in attempting this extension, a flash resistance battery busy signal will be returned through preselector 112 to register sender 114 over conductor SR in FIG. 5.

As shown, conductor SR connected through normal contacts 5AR6 and 5PCA1 and the lower winding of relay 5SR to ground. As previously described, relay 5PCA is restored during the interdigital period following the outpulsing of each prefix routing digit. Therefore, in response to the restoration of relay 5PCA, relay 5SR will be intermittently energized by the flash resistance battery returned over conductor SR, causing relay 5SR to continually operate and restore in synchronism with the flash resistance battery applied thereto.

In operating, relay 5SR closes normally open contacts 5SR1 and 5SR3 thereof, and opens normally closed contacts 5SR2 thereof. In response to the first closure of contacts 5SR1, master ground is applied through operated contacts 5SR1 and slow release relay 5SRA to grounded battery, causing relay 5SRA to operate. Due to its slow release characteristics, relay 5SRA remains operated during the restoration periods of relay 5SR, despite the fact that it is not energized at those times. In operating, relay 5SRA closes normally open contacts 5SRA1, 5SRA2 and 5SRA4 thereof and opens normally closed contacts 5SRA3 thereof.

When relay 5SR restores at the end of the first flash, supervisory counting relay 5SCA is operated over a path extending from master ground through normal contacts 5SR2, operated contacts 5SRA1, normal contacts 5AR7, 5SCD2 and 5SCB1, and relay 5SCA to grounded battery. In operating, relay 5SCA closes normally open contacts 5SCA1 thereof, thereby extending the ground applied thereto through operated contacts 5SCA1 to the right side of relay 5SCB. Master ground is also applied to the left side of relay 5SCB through operated contacts 5SRA2, to thereby shunt relay 5SCB.

In response to the second resistance battery flash, relay 5SR is reoperated, reopening contacts 5SR2 to break the previously described path for applying ground to relay 5SCA, and through operated contacts 5SCA1 to the right side of relay 5SCB. This breaks the ground shunt on relay 5SCB, and relay 5SCB operates in series with relay 5SCA. In operating, relay 5SCB opens normally closed contacts 5SCB1 thereof, and closes normally open contacts 5SCB2 thereof. The opening of contacts 5SCB1 and the closure of contacts 5SCB2 transfers the previously described path for applying ground to relay 5SCA, to relay 5SCC.

Relay 5SCC and 5SCD are connected in the same manner as relays 5SCA and 5SCB, so that with relay 5SCB operated, relay 5SCC will operate in response to the reclosure of contacts 5SR2 on the next restoration of relay 5SR and relay 5SCD will operate in response to the next operation of relay 5SR. In operating, relay 5SCD opens normally closed contacts 5SCD2 thereof and closes normally open contacts 5SCD1 and 5SCD3 thereof. The opening of contacts 5SCD2 and the closure of contacts 5SCD3 transfers the previously described path for applying ground to relay 5SCC through operated contacts 5SCB2 to overflow conductor OFL. Therefore, in response to the next following restoration of relay 5SR, master ground is applied through normal contacts 5SR2, operated contacts 5SRA1, normal contacts 5SRA7 and operated contacts 5SCD3 to conductor OFL.

Conductor OFL extends through cable 1020 to FIG. 6, where the ground thereon is applied through normal contacts 6ARO1 to alternate route conductor AR which extends through cable 1020 back to FIG. 5, where the ground thereon is applied through the lower winding of slow release relay 5AR to grounded battery, causing relay 5AR to operate.

In operating, relay 5AR opens normally closed contacts 5AR1, 5AR2, 5AR4, 5AR6, 5AR7 and 5AR9*a* thereof, and closes normally open contacts 5AR3, 5AR5, 5AR8 and 5AR9 thereof. The opening of contacts 5AR2 removes ground from conductor OPG, causing the operated add relays, which are held operated by the ground on conductor OPG, to restore. The closure of contacts 5AR3 applies ground to conductor ARG.

As previously described, conductor ARG is strapped through contacts of the operated class relay to either conductors ARC or RES, depending on whether an alternate route is supplied or is not supplied. As previously described, if conductor ARG is strapped to conductor RES, register sender 114 will be released and busy tone will be returned to the calling subscriber. If ARG is connected to ARC, a second class relay, supplying routing instructions for the alternate route, will be operated. Conductor ARC also extends from FIG. 8 through cable 1110 to FIG. 6, where the ground thereon is applied through normal contacts 6SKE5 and 6ARO3, and alternate route operated relay 6ARO to grounded battery, causing relay 6ARO to operate. In operating relay 6ARO opens normally closed contacts 6ARO1, 6ARO3 and 6ARO6 thereof, and closes normally open contacts 6ARO2, 6ARO4 and 6ARO5 thereof. The simultaneous opening of contacts 6ARO3 and closure of contacts 6ARO4 transfers the operating ground for relay 6ARO to master ground, so that relay 6ARO will henceforth remain operated.

The opening of contacts 5AR9*a* opens the previously described path for applying steady ground to conductor PLO during interdigital periods, and the opening of contacts 5AR4 removes ground from conductor SO, causing the forward switch train to release.

Certain outgoing selectors, instead of needing a holding ground forwarded over conductor SO, return a ground over conductor SO so long as they are operated. The closure of contacts 5AR5 transfers conductor SO to the upper winding of relay 5AR, so that if a ground is returned over conductor SO, relay 5AR will be maintained energized until the release of the outgoing selector.

The opening of contacts 5AR6 breaks the previously described energization path between conductor SR and relay 5SR, so that relay 5SR remains restored. This causes relay 5SRA to restore after a period determined by its slow release characteristics.

The simultaneous opening of contacts 5AR7 and closure of contacts 5AR8 results in operating ground therefor being applied directly through normal contacts 5SR1 and operated contacts 5SRA1, instead of through the previously described longer path which included conductors OFL and AR. Therefore, relay 5AR will remain energized until relay 5SRA restores, after which relay 5AR will restore following a period determined by its slow release characteristics.

Outpulsing will then be resumed in the manner previously described over the alternate route.

Should the alternate route also be found to be busy, register sender 114 will again operate in the manner previously described up to the point where ground is applied to conductor OFL. However, since relay 6ARO is now operated, as described above, the ground on conductor OFL will be applied through operated contacts 6ARO2 to alternate busy conductor AB, instead of conductor AR as in the previous case. Conductor AB extends through cable 1020 to FIG. 5, where the ground thereon is applied through normal contacts 5AR1 to conductor RES, which, in the manner previously described, will cause register sender 114 to be released and busy tone to be returned to the calling subscriber. Thus, the operation of register sender 114 on finding a busy alternate route is not dependent on the strapping to conductor ARG through the contacts of the second class relay which controls the alternate routing.

4. OUTPULSING OF REGISTERED DIGITS

As previously described, a selected one of conductors AD0 to AD6 inclusive is strapped to conductor OPG through contacts of the operated class relay.

If the selected one of these conductors is between AD1 and AD6, one or more prefix routing digits, as the case may be, will be outpulsed in the manner previously described, so that relay ADA will be operated during the entire outpulsing of the last prefix routing digit. Therefore, when momentary ground is forwarded over conductor ADV, in the manner previously described, immediately after the completion of outpulsing of the last prefix routing digit, it will be applied through contacts 4 of operated relay 6ADA and the upper winding of hunt assist relay 6HA to grounded battery, causing relay 6HA to operate.

If the selected one of conductors AD0 to AD6 is AD0, outpulsing ground will be forwarded thereover through cable 1110 to FIG. 6, where the ground thereon will be applied through the home level and wiper of bank 6DS3 of the digit sending switch, and then through interrupter contacts 6DSXINT and the lower winding of relay 6HA to grounded battery, causing relay 6HA to operate.

Thus, relay 6HA is operated in both the case where the outpulsing of prefix routing digits preceded the operation thereof, and in the case where no prefix routing digits were required.

In operating, relay 6HA opens normally closed contacts 6HA1 and 6HA2 thereof and closes normally open contacts 6HA3 thereof. The closure of contacts 6HA3 completes an obvious energization path for motor magnet 6DSX, which operates to cause the wipers of bank 6DS1 to 6DS4 inclusive to be stepped to level 1 thereof, and interrupter contacts 6DSXINT thereof to be opened. The opening of contacts 6DSXINT breaks the energization path for the lower winding of relay 6HA. In response thereto or to the end of the momentary ground on conductor ADV, which is extended through the upper winding of relay 6HA, relay 6HA restores. The reopening of contacts 6HA3 breaks the energization path for motor magnet 6DSX and it releases, reclosing interrupter contacts 6DSXINT thereof.

What will happen in response to the digit sender switch being stepped to level 1 thereof depends on which selected one of conductors SK0 to SK5 inclusive is strapped to conductor SKE through contacts of the operated class relay. If, and only if, the selected one of conductors SK0–SK5 is SK0, a path will be completed for operating end skip relay 6SKE over a connection extending from conductor OPG in FIG. 6, the wiper and level 1 of switch bank 6DS4, conductor SK0 which extends through cable 1110 to FIG. 8, conductor SKE which extends through cable 1110 to FIG. 6, and relay SKE to grounded battery. In operating, relay SKE opens normally closed contacts 6SKE1 and 6SKE5 thereof and closes normally open contacts 6SKE2, 6SKE3 and 6SKE4 thereof. The closure of contacts 6SKE2 applies a holding ground to relay 6SKE from conductor OPG.

If the selected one of conductors SK0–SK6 is SK1–SK5, respectively, relay 6SKE will not operate, but, instead, outpulsing ground on conductor OPG, which is extended to levels 1 to 6 inclusive of switch banks 6DS3, will be applied, in response to the reclosure of interrupter contacts 6DSXINT, to the lower winding of relay 6HA, causing it to reoperate and reenergize motor magnet 6DSX in the manner previously described. Therefore, the digit sender switch is stepped to level 2 thereof. If conductor SK1 is the selected one of conductors SK0–SK5, relay SKE will now be operated in the manner previously described. Otherwise, the digit sending switch will be stepped again one or more times, in the manner described above, until it reaches the level to which the selected one of conductors SK2 to SK5 is connected, at which time relay SKE will operate. The opening of contacts 6SKE1, in response to the operation of relay 6SKE, prevents any further hunting from taking place, and also removes ground from conductor VCH, which, as previously described, supplies the holding ground for relay 4VC. Therefore, if relay 4VC has been operated, it now restores. In response thereto, any operated add relays will restore, since, in this case the ground on a selected one of conductors AD1 to AD6 inclusive, as previously described, is obtained from conductor OPG through operated contacts 4VC3, conductor 2TK and contacts of the operated class relay. However, if relay 4VC has not been operated, any operated add relays will remain operated, since, in this case, the ground on a selected one of conductors AD1 to AD6 inclusive, as previously described, is obtained from conductor OPG directly through contacts of the operated class relay.

The closure of contacts 6SKE3 applies outpulsing ground to conductor PST. This is without effect if any of the add relays have been previously operated and relay 4VC has not been operated, since the ground then already applied to conductor PST is maintained thereon. However, if no prefix routing digits were required, the application of ground to conductor PST initiates outpulsing, in the manner previously described.

The opening of contacts 6SKE5 and the closure of contacts 6SKE4 transfers control of relay ARO from conductor ARC to conductor ARO.

Before proceeding, it should be pointed out that it is possible for a busy condition to be encountered in response to the outpulsing of the last prefix routing digit. If this should be the case, relay 5SCD and relay 5AR will be operated, in the manner previously described, immediately after the completion of outpulsing of the last prefix routing digit—that is, just at the same time that the digit sender switch is being stepped off normal, as described above. If this busy condition occurs, it is necessary that the digit sender switch be restored before an alternate route is provided. Therefore, the closure of normally open contacts 5AR9 applies ground to conductor RXS which extends through cable 1020 to FIG. 6, where the ground thereon is applied through operated off-normal contacts 6DSON1 and release magnet 6DSZ of the digit sender switch to grounded battery, causing release magnet 6DSZ to operate to release the digit sender switch and close interrupter contacts 6DSZINT thereof.

In response to the closure of interrupter contacts 6DSZINT, ground is applied to conductor RZ which extends through cable 1020 to FIG. 5, where the ground thereon is applied through relay 5RZ to grounded battery, causing relay 5RZ to operate. In operating, relay 5RZ closes normally open contacts 5RZ1 thereof to complete a holding path for relay 5AR extending from master ground through operated contacts 5RZ1 and 5SCD1 and the lower winding of relay 5AR to grounded battry. When the digit sender switch is fully released, off-normal contacts 6DSON1 will restore, causing release magnet 6DS2 to be released and interrupter contacts 6DSZINT thereof to reopen. Therefore, relay 5RZ will restore, and the holding ground on relay 5AR applied through operated contacts 5RZ1 will be removed.

Assuming, however, that no busy condition has been encountered in response to the outpulsing of the last prefix routing digit, nothing further happens until the completion of the interdigital period following the outpulsing of the last prefix digit, or the preliminary interdigital period in case no prefix routing digits were required. At that time relay 5PC and 5PCA operate in the manner previously described to start outpulsing of the first registered digit, beyond those that have been skipped, to be sent.

In response to the closure of contacts 5PC2, ground on conductor STP is applied through normal contacts 5MK4 and operated contacts 5PC2 to conductor ARO which extends through cable 1020 to FIG. 6, where the ground thereon is applied through operated contacts 6SKE4, normal contacts 6ARO3 and relay 6ARO to grounded battery, causing relay 6ARO to operate.

In operating, relay 6ARO opens normally closed contacts 6ARO1, 6ARO3 and 6ARO6 thereof, and closes normally open contacts 6ARO2, 6ARO4 and 6ARO5 thereof.

As previously described, the transfer of conductor OFL from conductor AR to conductor AB, in response to the opening of contacts 6ARO1 and the closure of contacts 6ARO2, causes register sender 114 to be released in response to a flash busy returned from the forward switch train, instead of operating relay 5AR. Thus, only in response to a return of busy occurring in response to the outpulsing of the prefix routing digits will an alternate route be provided, assuming that the operated class relay is strapped to provide an alternate route.

As previously described, the simultaneous opening of contacts 6ARO3 and the closure of contacts 6ARO4 transfers the operating ground for relay 6ARO to master ground.

The opening of contacts 6ARO6 and the closure of contacts 6ARO5 transfers control over the length of an interdigital period from the operated class relay, in accordance with the strapping thereof, to a given period of 600 milliseconds.

As previously described, ground pulse on conductor 2PLA is forwarded to conductor MKG. This ground pulse on conductor MKG is connected either through contacts 6 of operated relay 6ADA or the chain of contacts number 7 of relays 6ADA to 6ADF inclusive, depending on whether or not relay 6ADA is then operated, to the wiper of switch bank 6DS2. It is then applied to a selected one of conductors AS to FS inclusive, depending on the level with which the wipers of the digit sender switch are then in contact. This, in turn, depends upon the number of registered digits which were skipped.

Each of conductors AS to KS inclusive extends through cable 1100 to FIG. 3, where it is connected to the wiper of the switch bank corresponding to switch bank 3DR4 of the digit register with which it is associated. The wipers of each digit register are in contact with the level thereof corresponding to the specific value of the digit registered therein. As shown, conductors MK1 to MK0, respectively, are connected to levels 1 to 10, respectively, of the switch banks of each digit register corresponding to switch bank 3DR4. Conductors MK1 to MK0 extend through cable 1110 to FIG. 9.

Therefore, the ground pulse on the selected one of conductors AS to FS is applied to a selected one of conductors MK1 to MK0 in accordance with the specific value of the digit registered in the digit register with which the selected one of conductors AS to FS is associated.

In the manner previously described, when the sender has completed outpulsing a digit corresponding in value to the first registered digit to be sent, ground pulse will be extended to conductor MK and relay 5MK will be momentarily operated. As previously described, in response to the operation of relay 5MK an interdigital period is initiated and a momentary ground is applied to conductor ADV. The ground on conductor ADV is extended either through contacts 4 of operated relay 6ADA or through the chain of contacts number 3 of relays 6ADA to 6ADF inclusive, depending on whether or not relay 6ADA is then operated, and then through the upper winding of relay 6HA, causing relay 6HA to operate. As previously described, the operation of relay 6HA causes the wipers of the digit sender switch to be stepped to the next level thereof.

Nothing further happens until the end of the interdigital period following the outpulsing of the first registered digit sent. Immediately thereafter, however, outpulsing of the second registered digit to be sent commences.

This successive outpulsing of each registered digit to be sent continues in the manner described above until the digit sender switch in FIG. 6 has reached the same level as the digit counting switch in FIG. 2.

Additional level relay 6AL is used to provide an effective eleventh level for the digit sender switch, which has only ten levels, in the same manner, previously described in detail, that additional level relay 2AL provides an effective eleventh level for the digit counting switch.

5. STOP DIALING OPERATION

Stop dialing operation of register sender 114 is initiated either in response to a stop dial signal being received from the forward switch train over conductor SR or in response to the digit sender switch in FIG. 6 being stepped to the same level as the digit counting switch in FIG. 2.

The stop dial signal applied over conductor SR consists of steady resistance battery. As soon as relay 5PCA restores at the end of the digit then being outpulsed, in a manner pervіously described, an interdigital period is commenced and the resistance battery on conductor SR is applied through normal contacts 5AR6 and 5PCA1, and the lower winding of relay 5SR to ground, causing relay 5SR to operate. In operating, relay 5SR opens normally closed contacts 5SR2 thereof and closes normally open contacts 5SR1 and 5SR3 thereof.

The closure of contacts 5SR1 operates relay 5SRA over a path extending from master ground through operated contacts 5SR1 and relay 5SRA to grounded battery. In operating, relay 5SRA opens normally closed contacts 5SRA3 thereof, and closes normally open contacts 5SRA1, 5SRA2 and 5SRA4 thereof.

The opening of contacts 5SRA3 breaks the previously described energization path for operating relay 5PCA and 5PC in series. Therefore, at the end of the interdigital period then in progress, when, in the manner previously described, relay 5PC is operated by the ground applied thereto over conductor MK, which causes the pulse counter in FIG. 9 to reset and the ground on conductor MK to be removed, relay 5PCA will not be operated as usual in series with relay 5PC, but, instead, relay 5PC will restore. In response to the restoration of relay 5PC, a second interdigital period will commence.

If the stop dial signal is still applied to conductor SR at the end of the second interdigital period, relay 5SRA will remain operated, and a third interdigital period will take place. Thus, outpulsing of the next digit will be held up, and register sender 114 will go through successive interdigital periods, until the stop dial signal applied to conductor SR is removed and relay 5SRA restores. Outpulsing will then resume at the end of that interdigital period during which relay 5SRA restores.

The closure of contacts 5SR3 applies ground to stop dial timing conductor SDT which is extended through cable 1050 to FIG. 2, where the ground thereon is applied through resistance 2R2 and time-out relay 2TO to grounded battery. As previously described, relay 2TO is a dash pot relay having an operate time in the order of five seconds. Therefore, if the stop dial condition continues for five seconds, relay 2TO will operate to close normally open contacts 2TO1 thereof. The closure of contacts 2TO1 applies a ground marking to conductor BY through operated contacts 2TO1, normal contacts 2DU1 and operated contacts 2PLD2. As previously described, register sender 114 will be released and a busy tone returned to the calling subscriber in response to a ground marking being placed on conductor BY. Thus, a stop dial condition which lasts for the operate time of relay 2TO results in the abandonment of the call.

If the calling subscriber is slow in dialing all the required digits, it is possible for the digit sending switch in FIG. 6 to reach the same level as the digit counting switch. In response thereto, relay 5SR is operated over a path which extends from pulse ground in FIG. 2 through normal contacts 2AL1, the wiper and one of levels 4 to 10 of switch banks 2DC3 to one of conductors *d* to *j*, respectively, which extend through cable 1020 to FIG. 6, where the ground thereon is applied through the same level and wiper of switch bank 6DS1 to stop dial conductor SD. Conductor SD extends bank through cable 1020 to FIG. 2. Relay 2XD will be operated at this time in the manner previously described. Therefore, the ground on conductor SD is applied through operated contacts 2XD3 to conductor SR1, which extends through cable 1050 to FIG. 5, where the ground thereon is applied through the upper winding of relay 5SR to grounded battery.

The stop dial operation of register sender 114 in this case is identical to that described above where relay 5SR was operated in response to a stop dial signal applied thereto over conductor SR.

The stop dial condition remains until the calling subscriber dials another digit, causing the digit counting switch to be stepped to the next level thereof, in a manner previously described, which breaks the path for applying ground to conductor SR1′, or until the call is timed-out.

6. RELEASE OF REGISTER SENDER 114

As previously described, relay 2EOD will be operated either in response to the registration of the last required dialed digit, if the strapping to the operated class relay indicates a certain number of required digits, or, if the strapping to the operated class relay indicates that the required number of digits is uncertain, in response to the registration of the higher numbered of the uncertain digits. Furthermore, as previously described, the operation of relay 2EOD prevents the digit counting switch from being stepped, as usual, in response to the restoration of relay 2XD, so that the digit counting switch remains on its present level and relay 2XD remains restored.

After the end of outpulsing of next to the last digit to be sent, the digit sender switch will be stepped, in the manner previously described, to the same level as that occupied by the digit counting switch, in anticipation of the outpulsing of the last registered digit to be sent. As previously described in connection with stop dial operation, this will result in ground being forwarded to conductor SD in FIG. 2.

Assuming that relay 2EOD has been operated, the ground on conductor SD will be applied through normal contacts 2XD4 and operated contacts 2EOD1 to conductor END1 which extends through cable 1020 to FIG. 6. In FIG. 6, the ground on conductor END1 will be applied through normal contacts 6HA1 to conductor END which extends through cable 1020 of FIG. 5, where the ground thereon is applied through relay 5END to grounded battery, causing relay 5END to operate.

In operating, relay 5END opens normally closed contacts 5END2 thereof and closes normally open contacts 5END1 thereof. This is without effect until the outpulsing of the last digit to be sent is completed, at which time relay 5MK is operated, in the manner previously described, causing normally open contacts 5MK2 thereof to be closed. The closure of contacts 5MK2 completes a path for operating release relay 5RLS extending from master ground through operated contacts 5MK2 and 5END1, and the lower winding of relay 5RLS to grounded battery. In operating, relay 5RLS opens normally closed contacts 5RLS3, 5RLS6 and 5RLS8 thereof, and closes normally open contacts 5RLS1, 5RLS2, 5RLS4, 5RLS5, 5RLS7 and 5RLS9 thereof.

The closure of contacts 5RLS2 applies a holding ground to the lower winding of relay 5RLS from master ground on conductor MG. The opening of contacts 5RLS3 breaks the previously described path for applying ground to conductor PLG. The simultaneous opening of contacts 5RLS6 and the closure of contacts 5RLS7 transfers the steady ground which is applied to conductor PLO during interdigital periods from conductor PST to conductor MG. The opening of contacts 5RLS8 breaks the previously described path for applying ground to conductor STP, thereby turning off the pulse generator in FIG. 9. The closure of contacts 5RLS9 applies a holding ground to relay 2GD in FIG. 2 over conductor GD which extends thereto through cable 1050.

The closure of contacts 5RLS5 applies ground to conductor RLS. Conductor RLS is connected to preselector 112, where as shown in FIG. 1, the ground thereon is extended to adapter 108 and applied to cutthrough relay 108R to effect the operation thereof.

As previously described, the ground applied to conductor PLI is broken in response to the operation of cutthrough relay 108R. Therefore, relay 2PL restores, causing relay 2PLD to be deenergized. After a time determined by its slow release characteristics, relay 2PLD restores, removing master ground from conductor MG.

The ground on conductor RLS is also applied through cables 1050 and 1070, respectively, to the respective release magnets, such as 2DCZ and 3DRZ, of the digit counting switch in each of the operated digit register switches, through operated off-normal contacts thereof, such as 2DCON1 and 3DRON3, causing each of these switches to release and the release magnet interrupter contacts thereof, such as 2DCZINT and 3DRZINT, to close.

The closure of contacts 5RLS4 applies ground to conductor RXS, which, as previously described, extends through cable 1020 to FIG. 6, where the ground thereon is applied to release magnet 6DSZ of the digit sender switch through operated off-normal contacts 6DSON1 thereof, causing the digit sender switch to release and release magnet interrupter contacts 6DSZINT thereof to close.

In response to the closure of each of the aforesaid release magnet interrupter contacts, ground is applied over conductor RZ through cables 1020, 1050 and 1070, respectively, to FIG. 4, where it is applied through relay 5RZ to grounded battery, causing relay 5RZ to operate.

In operating, relay 5RZ closes normally open contacts 5RZ1 and 5RZ2 thereof. The closure of contacts 5RZ1 has no effect at this time. The closure of contacts 5RZ2 completes a holding ground for relay 5RLS extending through operated contacts 5RZ2 and 5RLS1 and the upper winding of relay 5RLS to grounded battery. Ground is maintained on conductor RZ until all the switches have been completely released, at which time relay 5RZ restores.

In response to the removal of master ground and the restoration of relay 5RZ, relay 5RLS restores. In restoring, relay 5RLS removes the holding ground on conductor GD applied through contacts 5RLS9. Therefore, relay 2GD restores, removing ground from sleeve conductor S and reapplying resistance battery to conductor BY. Register sender 114 is now back in an idle condition, ready to be seized by another call.

The above discussion was based on the assumption that relay 2EOD has been operated. However, as previously described, relay 2EOD will not be operated, if the operated class relay is strapped to provide for an uncertain number of digits, and the calling subscriber has only dialed the lower numbered of the uncertain digits.

In this case, the digit counting switch will be in contact with the level thereof corresponding to the higher numbered of the uncertain digits, in anticipation of the dialing of the higher numbered of the uncertain digits by the calling subscriber. When the digit sender switch reaches the same level as that occupied by the digit counting switch, a stop dial condition, as discussed above, will be encountered, since relay 2EOD is unoperated. Therefore, as previously described, relay 5SR and 5SRA will be operated. The closure of contacts 5SRA4 will complete the previously described path, extending from that one of the digit conductors DD–DJ associated with the lower numbered of the uncertain digits, for operating digit uncertain relay 2DU.

In operating, relay 2DU will open normally closed contacts 2DU1, 2DU4 and 2DU6 thereof and close normally open contacts 2DU2, 2DU3, 2DU5 and 2DU7 thereof. The simultaneous opening of contacts 2DU6 and closure of contacts 2DU7 transfers the operating ground for relay 2DU to master ground.

The opening of contacts 2DU4 and the closure of contacts 2DU5 transfers a previously described operating path for time-out relay 2TO to extra time-out relay 2ETO through resistance 2R4. Relay 2ETO is a dash pot relay having an operate time in the order of thirty seconds. Therefore, the previously described ground on the one of conductors FON to KON corresponding to the higher numbered of the uncertain digits, which has not been dialed, is applied through operated contacts 2XD2, rectifier 2RE1, operated contacts 2DU5, resistance 2R4 and relay 2ETO to grounded battery, causing relay 2ETO to be energized. However, relay 2ETO will not operate until it has been energized for thirty seconds.

If during the thirty seconds the calling subscriber dials the higher numbered of the uncertain digits, it will be registered in the digit register associated therewith. In response thereto the energizing ground for relay 2ETO will be removed and relay 2EOD will be operated, in the manner previously described. Therefore, in this case, register sender 114 will outpulse this last required digit and then release in the manner described above, where it was assumed that relay 2EOD was operated.

However, if the call being extended is destined to a called subscriber on a private line, rather than a party line, all the required digits have already been dialed. In this case, no further digit will be dialed by the calling subscriber and relay 2ETO will continue to be energized. Therefore, after thirty seconds, relay 2ETO will operate to close normally open contacts 2ETO1 thereof. The closure of contacts 2ETO1 applies ground through operated contacts 2ETO1 and 2DU2 to release control conductor RLC which extends through cable 1050 to FIG. 5, where the ground thereon is applied through the upper winding of relay 5RLS to grounded battery, causing relay 5RLS to operate.

In this case, the effect of the operation of relay 5RLS in releasing register sender 114 is the same as that described above, except for the fact that operated relay 2DU applies an extra holding ground to relay 2GD through operated contacts 2DU3 thereof. However, when master ground is broken in response to relay 2PLD restoring, relay 2DU will restore, thereby removing this extra holding ground applied to relay 2GD.

In addition to releasing in response to the outpulsing of all the required digits, as described above, register sender 114 will release in response to an abandoned call. A call is abandoned either in response to the calling subscriber hanging up before the call is completed, or in response to a ground marking being applied to busy conductor BY in any of the various manners previously described.

In response to an abandoned call, the ground on conductor PLI is removed, in the manner previously described. In response thereto, relay 2PL restores, breaking the energization path for relay 2PLD. Therefore, relay 2PLD restores after a period determined by its slow release characteristics.

In restoring, relay 2PLD completes a path for applying ground through normal contacts 2PL2 and 2PLD4 and operated off-normal contacts 2DCON2 to conductor RLC.

As previously described, the ground on conductor RLC operates relay 5RLS.

The operation of relay 5RLS performs the same functions as described above, except that the ground applied to conductor RLS is not forwarded to cutthrough relay 108R in this case, since the switchthrough relay in preselector 112 has already restored.

D. *Illustration of the Operation of the Routing Means*

In order to illustrate the modes of operation of which the routing means is capable, class relays 7CLA to 7CLG inclusive and class relay 7CL*n* has been strapped in a manner to determine the routes to the various called offices shown in FIG. 1A.

1. ROUTING OF CALL TO GR3 OR BR1 OFFICES IN AREA 314

Should a calling subscriber wish to dial a called subscriber of either the GR3 or BR1 offices in area 314, he will first dial the three digits 3, 1 and 4, which will be successively registered in the A, B and C digit registers, respectively; then he will dial either the three digits 4, 7 and 3 or 2, 7 and 1, depending on whether the call is being extended to the GR3 office or the BR1 office; which three digits will be successively registered in the D, E and F digit registers, respectively; and then he will dial the four digits of the directory number of the called subscriber, which will be successively registered in the G, H, I and J digit registers, respectively.

Immediately after the digit 4 has been registered in the C digit register, route interpreter 116 will be called in, and ground will be applied to route interpreter 116 over conductor 23A, and route interpreter translating relays 15A35, 13B1, 14C456 and 26C147 will be operated. In the manner previously described, in response to the operation of relays 15A35, 13B1 and 14C456, the ground applied to conductor 23A will be extended to conductor 31—456, which is strapped to the first terminal of terminal strip 2625 in FIG. 26. In response to the operation of relay 26C147, the ground on conductor 31-456 will be applied through translating contacts of operated relay 26C147 to conductor 314. Conductor 314 extends thorugh cable 1200 to FIG. 27, where it is strapped to the third terminal on terminal strip 2728. As shown, the third terminal on terminal strip 2728 is connected through normal contacts of relay 27-2TR to conductor ICL1. Therefore, the ground on conductor 314 is applied to conductor ICL1, and is returned to register sender 114, in the manner previously described, over conductor CL1, where it is applied through class relay 7CLA, associated with conductor CL1, to grounded battery, causing class relay 7CLA to operate.

As shown, in accordance with the "Class Relay Strapping Chart," conductor CLR1 is strapped through contacts 8 of class relay 7CLA to conductors CLR, and contacts 9 to 20 inclusive of class relay 7CLA are left unstrapped.

In the manner previously described, immediately after the digit 3 or 1, as the case may be, has been registered in the F digit register, route interpreter 116 will be called in again, ground will be applied to route interpreter 116 over conductor 45A or 23A, as the case may be, and translating relay 27CLR1 and translating relays 15A24, 15B7, 14C123 and 26C369 or 15A24, 15B7, 14C123 and 26C147, as the case may be, will be operated.

In accordance therewith, in the manner previously described, ground will be extended either to conductor 47–123 or conductor 27–123, which, as shown, are strapped to individual contacts of termial strip 2727 in FIG. 27. As shown, with translating relay 27CLR1 operated, conductor 47–123 is connected through operated contacts of relay 27CLR1 to conductor 47–123″ and conductor 27–123 is connected through operated contacts of relay 27CLR1 to conductor 27–123″. Conductors 47–123″ and 27–123″ extend through cable 1210 to FIG. 26, where they are strapped to indivdual terminals on terminal strip 2625. As shown, conductor 47–123″ is connected through translating contacts of operated relay 26C369 to conductor 473″ and conductor 27–123″ is connected through translating contacts of operated relay 26C147 to conductor 271″. Conductors 473″ and 271″ extend through cable 1200 to FIG. 27, where, as shown, they are both strapped to the sixth terminal of terminal strip 2728. This sixth terminal of terminal strip 2728 is connected through normal contacts of relay 27–2TR to conductor ICL6.

Therefore, ground will be applied to conductor ICL6 in response to ground being extended either to conductor 473″ or 271″. The ground on conductor ICL6 is returned over conductor CL6 to register sender 114, where it is applied through class relay 7CLR, associated with conductor CL6, to grounded battery, causing class relay 7CLF to operate.

In operating, relay 7CLF breaks the previously described holding ground for first-operated class relay 7CLA, so that relay 7CLA now restores.

In accordance with the "Class Relay Strapping Chart," contacts 10 and 14 of class relay 7CLF are strapped to provide the single prefix routing digit having the specific value 8. It is assumed that trunk 151, in FIG. 1A, is seized in response to the outpulsing of a single digit having the value 8. Contacts 11 of class relay 7CLF are strapped, as shown, to provide for the registration of a maximum of ten dialed digits. Contacts 13 of class relay 7CLF are strapped, as shown, to skip the first three registered digits during outpulsing. These first three digits represent the area code 314, and are not needed in extending the connection. Therefore, only the latter seven registered digits, manifesting the office code and directory number of the called subscriber, will be outpulsed over trunk 151 to the local switching center shown in FIG. 1A. The local switching center, in accordance with the office code received thereby, will selectively extend the connection to the GR3 office in area 314 over trunk 165 or the BR1 office over trunk 164.

The strapping of contacts 20 of class relay 7CLF, as shown, provide for a normal 600 millisecond interdigital period.

Contacts 12 of class relay 7CLF are strapped, as shown, to operate relay **7CL*n*, to provide an alternate route, in response to trunk 151** being found busy.

In accordance with the "Class Relay Strapping Chart," contacts 10 and 14–16 of class relay **7CL*n* are strapped, as shown, to provide for three prefix routing digits having the specific values 2, 3 and 4, respectively. It is assumed that trunk 150 is seized in response to a prefix routing digit having the value 2, and that the CE1 office will seize trunk 153** in response to receiving two digits having the values 3 and 4, respectively, so that in response to the outpulsing of 2, 3 and 4, a connection will be extended from the originating exchange to regional switching center A.

Contacts 11 of class relay **7CL*n*** are strapped, as shown, to provide for the registration of a maximum of ten dialed digits.

Contacts 12 of class relay **7CL*n*** are strapped, as shown, to provide for no alternate route.

Contacts 13 of class relay **7CL*n* are strapped, as shown, to provide for the skipping of no registered digits during outpulsing. Therefore, all ten registered digits including the area code 314, the office code 473 or 271, as the case may be, and the directory number of the called subscriber, will be outpulsed over trunks 150 and 153 to regional switching center A, where they will be applied to a 4A crossbar system assumed to be located thereat. In response thereto, the 4A crossbar system will further extend the call to the local switching center over trunks 160 and 161**, and then transmit to the local switching center the office code and directory number of the called subscriber, so that the local switching center can selectively extend the call to either the GR3 office or the BR1 office in accordance with the office code transmitted thereto from regional switching center A.

Contacts 20 of class relay **7CL*n*** are strapped, as shown, to provide an 800 millisecond interdigital period, in order to minimize the likelihood of a stop dial signal being returned from the 4A crossbar system at regional switching center A.

2. ROUTING OF A CALL TO THE BA7 OFFICE IN AREA 314 OR ANY OFFICE IN AREA 511

Now assume that the calling subscriber calls a called subscriber of the BA7 office in area 314. In this case, since the area code is again 314, class relay 7CLA will again be operated in response to the first translation, as previously described. Furthermore, since class relay 7CLA is operated, a second translation will take place in which class relay CLR1 is again operated, as it was for the previously described translation of the office code of office GR3 or BR1. However, in this case, the office code of office BA7 is to be translated. The office code BA7 is manifested by the digits 2, 2 and 7.

As shown in FIGS. 26 and 27, conductor 22–7890 is strapped to the bottom terminal of terminal strip 2727, which is connected to conductor 22–7890″ through translating contacts of operated relay 27CLR1. Conductor 22–7890″ extends through cable 1210 to FIG. 26, where it is strapped to a terminal of terminal strip 2625. This terminal of terminal strip 2625 is connected through translating contacts of now-operated relay 26C147 to conductor 227″. Conductor 227″ extends through cable 1200 to FIG. 27, where it is strapped to the bottom terminal of terminal strip 2728. As shown, the bottom terminal of terminal strip 2728 is connected through normal contacts of relay 27–2TR to conductor ICL*n*. Therefore, in the manner previously described, in response to the translation of the office code BA7, class relay **7CL*n* is operated. In response to the operation of class relay 7CL*n***, the previously described holding ground for class relay 7CLA is broken, causing relay 7CLA to restore.

It will be noted that conductor 511 is strapped to the same terminal as conductor 227″, so that class relay **7CL*n* will be operated in response to the calling subscriber calling a called subscriber of any office located in area 511, such as office TR6, assuming that all offices in area 511 have a three digit office code and a four digit directory number, and assuming further that no alternate route is available to any of the offices located in area 511**.

Since the routing instructions required in extending a call to the BR1 or GR3 offices in area 314 over the previously described alternate route, and in extending a connection to the BA7 office in area 314 or any office, such as TR6, in area 511, are identical in all respects, since in all these cases ten dialed digits are required and the call is routed over trunks 150 and 153 to the 4A crossbar system at regional switching center A, and then further routing is controlled in response to the entire ten registered digits being transmitted thereto over trunks 150 and 153. Therefore, for this reason, class relay 7CL*n* is operated in response to any of these calls.

3. ROUTING OF A CALL TO THE GR3 OFFICE LOCATED IN AREA 607

It will be noted that the routing for the GR3 exchange, located in local area 607, is also extended over trunks 150 and 153 to regional switching center A. However, since the calling subscriber does not dial the local area code, only seven digits, including the three digit office code and the four digit directory number, rather than ten digits, are required to be dialed by the calling subscriber. Therefore, class relay 7CL*n* cannot be used to control the routing to the GR3 office in area 607.

As previously mentioned, the office code for GR3 is 473. Therefore, in response to the calling subscriber calling a called subscriber of the GR3 office located in local area 607, ground will be extended to conductor 47–123, which is strapped to the top terminal of terminal strip 2727 in FIG. 27, as previously described. In this case, translating relay 27CLR1 is not operated, so that conductor 47–123 is connected through normal translating contacts of relay 27CLR1 to conductor 47–123′. Conductor 47–123′ extends through cable 1210 to FIG. 26, where it is strapped to a terminal of terminal strip 2625. This terminal of terminal strip 2625 is connected through translating contacts of now-operated relay 26C369 to conductor 473′. Conductor 473′ extends through cable 1200 to FIG. 27 where it is strapped to a terminal of terminal strip 2728. This terminal of terminal strip 2728 is connected through normal contacts of relay 27–2TR to conductor ICL7, as shown. Therefore, in the manner previously described, class relay 7CLG, associated with conductor CL7, will be operated.

All the contacts of class relay 7CLG, except contacts 11 thereof, are strapped in the same manner as the corresponding contacts of relay 7CL*n*, since the routing of a call to be extended to the GR3 office located in area 607 is the same as the routing to any of the offices controlled by class relay 7CL*n*. However, contacts 11 of class relay 7CLG are strapped, as shown, to provide for the registration of a maximum of seven dialed digits, rather than ten dialed digits as provided by the strapping of contacts 11 of class relay 7CL*n*.

4. ROUTING OF A CALL TO THE CE1 OFFICE IN AREA 607

It will be noted that the CE1 office, located in local area 607, has a directory number which may include either four or five digits. The area code of the CE1 office is 231. Therefore, in response to the translation thereof by route interpreter 116, ground will be extended to conductor 231, in the manner previously described, which is strapped to a terminal of terminal strip 2728 in FIG. 27. This terminal is connected through normal contacts of relay 27–2TR to conductor ICL2. Therefore, in the manner previously described, class relay 7CLB, associated with conductor CL2, will be operated.

Contacts 10 of class relay 7CLB are strapped, as shown, to provide for no prefix routing digits to be outpulsed, and contacts 13 of class relay 7CLB are strapped, as shown, to provide for no skipped digits. Therefore, the first digit to be outpulsed will have the value 2, which is the first digit of the office code, which, in accordance with the assumption previously made, is effective in seizing trunk 150. It is assumed that the outpulsing of the second and third digits, 3 and 1, respectively, of the office code will cause the local switching equipment of the CE1 office to be seized.

In accordance with the "Class Relay Strapping Chart," contacts 9 and 11 of class relay 7CLB are strapped, as shown, to provide for the registration of an uncertain number of digits having a maximum of eight and a minimum of seven.

Contacts 12 of class relay 7CLB are strapped, as shown, to provide for no alternate route.

Contacts 20 of class relay 7CLB are strapped, as shown, to provide a normal interdigital period of 600 milliseconds.

5. ROUTING OF A CALL TO THE MA OFFICE IN AREA 607

It will be noted that the MA office in local area 607 has an office code of only two digits, namely, 62. Therefore, in response to a calling subscriber calling a called subscriber of the MA office, ground will be extended to one of conductors 62–123, 62–456 or 62–7890, in the manner previously described, in accordance with the value of the first digit of the directory number of the called subscriber. As shown, all of conductors 62–123, 62–456 and 62–7890 are strapped to the top terminal of terminal strip 2728 in FIG. 27. This terminal, as shown, is connected through normal contacts of relay 27–2TR to conductor ICL3. Therefore, class relay 7CLC, associated with conductor CL3, will be operated in the manner previously described.

Contacts 10 and 14–16 inclusive of class relay 7CLC are strapped, as shown, to provide three prefix routing digits having the specific values 2, 3 and 5, respectively. As previously assumed, trunk 150 is seized in response to the outpulsing of a digit having the value 2. It is assumed that the CE1 office seizes trunk 154 in response to two digits having the values 3 and 5, respectively, being transmitted thereto.

Contacts 11 of class relay 7CLC are strapped, as shown, to provide for the registration of a maximum of six digits.

Contacts 12 of class relay 7CLC are strapped, as shown, to provide for no alternate route.

Contacts 13 of class relay 7CLC are strapped, as shown, to provide for the skipping of one digit. Therefore, the first registered digit to be outpulsed is the second digit of the office code of the main office, which is 2. It is assumed that the MA office seizes the local switching equipment therein in response to the transmission thereto of the digit 2.

Contacts 20 of class relay 7CLC are strapped, as shown, to provide a normal 600 millisecond interdigital period.

6. ROUTING OF A CALL TO THE WY OFFICE IN AREA 607

The WY office also has only two digits in the office code thereof, which are 9 and 9, respectively. Therefore, in response to the calling subscriber calling a called subscriber of the WY office, a ground will be extended, in the manner previously described, to one of conductors 99–123, 99–456 and 99–7890. Conductors 99–123, 99–456 and 99–7890 are strapped, as shown, to the second terminal of terminal strip 2728 in FIG. 27. This terminal is connected, as shown, through normal contacts of relay 27–2TR to conductor ICL4. Therefore, relay 7CLD, which as associated with conductor CL4, will be operated, in the manner previously described, in response to a call made to a called subscriber of the MA office.

Contacts 10 and contacts 14–17 inclusive of relay 7CLD are strapped, as shown, to provide four prefix routing digits having the specific values 2, 3, 5 and 3, respectively. As previously assumed, the outpulsing of the digits 2, 3 and 5 is effective in extending the call over trunks 150 and 154 to the MA office. It is assumed that the MA office will seize trunk 155 in response to the final prefix routing digit 3 being transmitted thereto.

Contacts 11 of class relay 7CLD are strapped, as shown, to provide for the registration of a maximum of four digits.

Contacts 12 of class relay 7CLD are strapped, as shown, to provide for no alternate route.

Contacts 13 of class relay 7CLD are strapped, as shown, to provide for the skipping of the two registered office code digits.

Contacts 20 of class relay 7CLD are strapped to provide for a normal 600 millisecond interdigital period.

7. ROUTING OF A CALL TO THE AC2 OFFICE IN AREA 406

In response to a calling subscriber calling a called subscriber of the AC2 office located in area 406, a translation of the area code 406 will be made.

In the manner previously described, in response to this translation, a ground will be extended to conductor 40–456, which is strapped to a terminal of terminal strip 2625 in FIG. 26. This terminal is connected, as shown, through translating contacts of relay 26C369, which is now operated, to conductor 406. Conductor 406 extends through cable 1200 to FIG. 27, where it is strapped to a terminal of terminal strip 2728. As shown, this terminal of terminal strip 2728 is connected through normal contacts of relay 27–2TR to conductor ICL5. Therefore, class relay 7CLE, associated with conductor CL5, will be operated in the manner previously described.

In accordance with "Class Relay Strapping Chart," contacts 8 of class relay 7CLE are strapped, as shown, to provide a second translation office code restriction check. A second translation office code restriction check is required because area 406 includes the restricted office code 555 of an overseas operator.

In accordance with the "Class Relay Strapping Chart," contacts 9, rather than contacts 10, and contacts 14 of class relay 7CLE are strapped, as shown, to provide a single prefix routing digit having a specific value 7. As previously described, the strapping of contacts 9, rather than contacts 10, insures that outpulsing will be delayed until a successful second translation office code restriction check has been made. It is assumed that trunk 152 to regional switching center C is seized in response to the outpulsing of a digit having the value 7.

The office code of the AC2 office is 222. As previously described, in response to a second translation office code restriction check, translating relay 7–2TR is operated. In the manner previously described, in response to a second translation, ground is extended to conductor 222, which is strapped to a terminal of terminal strip 2728 in FIG. 27. As shown, this terminal is connected through transfer contacts of now-operated relay 27–2TR to conductor IVC. Therefore, ground will be applied to conductor IVC. As previously described, a ground applied to conductor IVC is effective in operating relay 4VC to indicate a successful office code restriction check. The operation of relay 4VC, in this case, permits outpulsing to be initiated.

If the called subscriber, after dialing area 406, had dialed the restricted overseas operator code 555, in response to the second translation office code restriction check, ground would have been extended to conductor 55–456 in the manner previously described. As shown, conductor 55–456 is strapped to a terminal of terminal strip 2624 in FIG. 26. This terminal is connected to translating contacts 555 of relay 26C258, which is now operated. As shown, conductor IRES is strapped to contacts 555. Therefore, the ground extended to conductor 55–456 is applied to conductor IRES. As previously described, a ground applied to conductor IRES results in register sender 114 being released and busy tone being returned to the calling subscriber.

As shown in FIG. 1A, the AC2 office includes a directory number of either four or five digits. Therefore, contacts 9 and 11 of class relay 7CLE are strapped, as shown, to provide for the registration of an uncertain number of digits having a maximum of eleven and a minimum of ten.

Contacts 12 of class relay 7CLE are strapped, as shown, to provide no alternate route.

Contacts 13 of class relay 7CLE are strapped, as shown, to provide for the skipping of the three digits in the area code during outpulsing.

Contacts 20 of class relay 7CLE are strapped, as shown, to provide for an 800 millisecond interdigital period, since the call is extended over trunk 152 to a 4A crossbar system at regional switching center C.

8. VACANT CODE OPERATION

It is possible that in error, the calling subscriber may dial the local area code 607 or an unassigned office code. If local area code 607 is dialed, in response to the translation thereof, ground will be extended, in the manner previously described, to conductor 60–7890. As shown, conductor 60–7890 is connected to the bottom terminal of terminal strip 2625 in FIG. 26. This terminal is connected to translating contacts 607 of relay 26C147, which is now operated. As shown, conductor IVC is strapped to translating contacts 607. Therefore, the ground extended to conductor 60–7890 will be applied to conductor IVC. As previously described, this will result in the operation of relay 4VC, and, if no class relays are operated, as is the case here, the operation of relay 4VC will result in register sender 114 being released and busy tone being returned to the calling subscriber.

MISCELLANEOUS

It will be noted that the preferred embodiment of the invention, described above, includes electromechanical components. Since it is realized that in many cases it is within the skill of the art to substitute electronic components for electromechanical components to perform equivalent functions, it is intended that the elements recited in the appended claims be construed to include electronic equivalents thereof which are within the skill of the art.

Although only a preferred embodiment of the invention has been described herein, it is not intended that the invention be restricted to the preferred embodiment thereof, but that it include all modifications within the skill of the art, and that it be limited only by the scope of the appended claims.

What is claimed is:

1. In a telephone system, a plurality of telephone exchanges, call extending circuits, and trunk circuits interconnecting said exchanges to provide primary and alternate trunk routes between at least two of said exchanges, routing means at one of said two exchanges for controlling the extension of a call forwarded thereto and comprising a group of route determining relays, means for applying a first portion of directive impulse signals to said routing means in response to the initiation of each connection at said one exchange, first means for operating a selected one of said relays in response to the application of said directive signals to said routing means, and second means for controlling the subsequent operation of said routing means in a manner which is determined by the particular one of said relays which is operated to complete a connection between said two exchanges over a primary, or alternate route, if available, as may be most expedient depending upon the availability of the trunk circuits interconnecting said two exchanges.

2. The telephone system defined in claim 1, wherein said relays each include a corresponding set of contacts, and wherein said second means includes strapping means strapped to the set of contacts of each relay in a unique predetermined manner in accordance with the routing to be determined in response to the operation of that relay.

3. The telephone system defined in claim 2, wherein said second means includes a digit sender for outpulsing, said digit sender including sender steering means coupled to contacts of said relay to determine the number, including zero, and the specific values of prefix routing digits to be sent, and to control the initiation of outpulsing by said digit sender, in accordance with the strapping of said contacts of an operated relay.

4. The telephone system defined in claim 3, wherein said second means includes supervisory means including alternate route means operated in response to a first busy signal being returned to said routing means from one of said call extending circuits when a call being extended over said call extending circuits to said primary route encounters a busy condition, said alternate route means being coupled to contacts of said relay to indicate whether an alternate route is available in accordance with the strapping of said contacts of an operated relay, and, if the strapping indicates availability for releasing said call extending circuits and for operating another relay, which determines the alternate route; and if the strapping indicates nonavailability for causing a second busy signal to be returned from said routing means to the calling line.

5. The telephone system defined in claim 4, wherein said group of relays are interconnected to cause said first-operated relay to restore in response to the operation of said other relay.

6. The telephone system defined in claim 4, wherein said second means includes alternate route disabling means coupled to said supervisory means and operated in response to an alternate route having been provided by the operation of said alternate route means for disabling said alternate route means, whereby said alternate route means will not operate in response to said alternate route being found busy, and for returning a busy signal from said routing means in response to said alternate route being found busy.

7. The telephone system defined in claim 6, wherein said first means includes digit register means for registering said given plurality of dialed digits, and said sender steering means is coupled to contacts of said relays to determine the number, including zero, of registered digits to be skipped in sending, in accordance with the strapping of said contacts of an operated relay.

8. The telephone system defined in claim 7, wherein said steering means includes prefix routing digit counting means for counting the number of prefix routing digits that have been sent, and registered digit control means coupled to said prefix routing digit counting means and operated in response to the end of outpulsing of the last prefix routing digit to be sent, and also in response to said strapping to said contacts of an operated relay determining that the number of prefix routing digits to be sent is zero, said registered digit control means, in response to the operation thereof, causing the skipping of a first group of registered digits, which are not to be sent, equal in number to that determined by the strapping of said contacts of an operated relay, and causing said digit sender to successively outpulse the remainder of said registered digits which are to be sent.

9. The telephone system defined in claim 8, wherein said registered digit control means is coupled to said alternate route disabling means to operate said alternate route disabling means in response to the initiation of outpulsing of the first registered digit to be sent.

10. The telephone system defined in claim 8, wherein said digit sender includes interdigital means coupled to said registered digit control means and to contacts of said relays for providing an interdigital period of a given length in response to said registered digit control means being operated and for providing an interdigital period of a length determined by the strapping to said contacts of an operated relay in response to said registered digit control means being unoperated.

11. The telephone system defined in claim 8, further incorporating call-extending means comprising first switching means for forwarding a call to said routing means to effect the seizure thereof, second switching means controlled by said routing means for further extending said call, and cutthrough means effective when operated for transferring said forwarding of a call to said routing means from said routing means to said second switching means, whereby said routing means will be released in response to the operation of said cutthrough means, and wherein said second means includes release means coupled through said first switching means to said cutthrough means to effect the operation of said cutthrough means in response to the operation of said release means, and end-of-dial means coupled through contacts of said relays to said digit register means for operating said end-of-dial means in response to the registration in said digit register means of a predetermined plurality of dialed digits, said predetermined plurality being determined in accordance with the strapping of said contacts of an operated relay, said release means being coupled to said end-of-dial means, said digit register means and said registered digit control means for operating said release means in response to both said end-of-dial means being operated and the sum of the registered digits that have been skipped and the registered digits that have been outpulsed equaling the number of digits registered in said digit register means.

12. The telephone system defined in claim 11, wherein said first means includes digit register disabling means coupled to said end-of-dial means and responsive to the operation thereof for preventing dialed digits applied to said routing means in excess of said predetermined plurality from being registered in said digit register means.

13. The telephone system defined in claim 11, wherein said digit sender includes stop dial means coupled to said supervisory means for preventing outpulsing by said digit sender in response to said supervisory means being operated, said supervisory means being operated, without operating said alternate route means thereof, in response to a stop dial signal being applied thereto.

14. The telephone system defined in claim 13, wherein said routing means includes timing means coupled to said supervisory means and operated in response to the operation of said supervisory means for initiating a predetermined time period which is prematurely terminated in response to the release of said supervisory means, and busy signal means coupled to said timing means for returning a busy signal from said routing means to said first switching means in response to the expiration of said predetermined time period.

15. The telephone system defined in claim 13, wherein a stop dial signal is returned to said routing means through said second switching means and applied to said supervisory means in response to the extension of said call encountering a stop dial condition.

16. The telephone system defined in claim 13, wherein said supervisory means is coupled to said end-of-dial means, said digit register means and said registered digit control means for applying a stop dial signal to said supervisory means in response to both said end-of-dial means being unoperated and the sum of the registered digits that have been skipped and the registered digits that have been outpulsed equaling the number of digits registered in said digit register means.

17. The telephone system defined in claim 16, wherein said second means incudes digit-uncertain means coupled through said supervisory means and through contacts of said relays to said digit register means for operating said digit-uncertain means in response to both the operation of said supervisory means and the registration of a given number of dialed digits in said digit register means, said given number being determined in accordance with the strapping of said contacts of an operated relay, timing means coupled to said digit register means and said digit-uncertain means and operated in response to the operation of said digit-uncertain means for initiating a given time period which is permaturely terminated in response to said digit register means registering an additional dialed digit applied to said routing means, and release control means coupled to said timing means and said release means for operating said release means at the expiration of said given time period in response to the failure of said digit register means to register said additional dialed digit during said given time period.

18. In a telephone system, routing means comprising a group of route determining relays each of which includes a corresponding set of contacts, first means for operating a selected one of said relays in accordance with a first portion of a given plurality of dialed digits applied to said routing means, said first means incuding digit register means for registering said given plurality of dialed digits, and second means for controlling the operation of said routing means in accordance with an operated relay, said second means including strapping means strapped to the set of contacts of each relay in a unique predetermined manner in accordance with the route to be determined in response to the operation of that relay, and a digit sender for outpulsing, said digit sender including sender steering means coupled to contacts of said relays to determine the number, including zero, of registered digits to be skipped in sending, in accordance with said strapping of said contacts of an operated relay.

19. The telephone system defined in claim 18, wherein said sender steering means includes registered digit control means for skipping a first group of registered digits which are not to be sent equal in number to that determined by said strapping of said contacts of an operated relay, and causing said digit sender to successively outpulse the remainder of said registered digits which are to be sent.

20. The telephone system defined in claim 19, further incorporating call-extending means comprising first switching means for forwarding a call through said routing means to effect the seizure thereof, second switching means controlled by said routing means for further extending said call, and cutthrough means effective when operated for transferring said forwarding of a call to said routing means from said routing means to said second switching means, whereby said routing means will be released in response to the operation of said cutthrough means, and wherein said second means includes release means coupled through said first switching means to said cutthrough means to effect the operation of said cutthrough means in response to the operation of said release means, and end-of-dial means coupled through contacts of said relays to said digit register means for operating said end-of-dial means in response to the registration in said digit register means of a predetermined plurality of dialed digits, said predetermined plurality being determined in accordance with the strapping of said contacts of an operated relay, said release means being coupled to said end-of-dial means, said digit register means and said registered digit control means for operating said release means in response to both said end-of-dial means being operated and the sum of the registered digits that have been skipped and the registered digits that have been outpulsed equaling the number of digits registered in said digit register means.

21. The telephone system defined in claim 20, wherein said first means includes digit register disabling means coupled to said end-of-dial means and responsive to the operation thereof for preventing dialed digits applied to said routing means in excess of said predetermined plurality from being registered in said digit register means.

22. The telephone system defined in claim 20, wherein said second means includes supervisory means, and wherein said digit sender includes stop dial means coupled to said supervisory means for preventing outpulsing by said digit sender in response to said supervisory means being operated, said supervisory means being operated in response to a stop dial signal being applied thereto.

23. The telephone system defined in claim 22, wherein said routing means includes timing means coupled to said supervisory means and operated in response to the operation of said supervisory means for initiating a predetermined time period which is prematurely terminated in response to the release of said supervisory means, and busy signal means coupled to said timing means for returning a busy signal from said routing means to said first switching means in response to the expiration of said predetermined time period.

24. The telephone system defined in claim 22, wherein a stop dial signal is returned to said routing means through said second switching means and applied to said supervisory means in response to the extension of said call encountering a stop dial condition.

25. The telephone system defined in claim 22, wherein said supervisory means is coupled to said end-of-dial means, said digit register means and said register digit control means for applying a stop dial signal to said supervisory means in response to both said end-of-dial means being unoperated and the sum of the registered digits that have been skipped and the registered digits that have been outpulsed equaling the number of digits registered in said digit register means.

26. The telephone system defined in claim 25, wherein said second means includes digit-uncertain means coupled through said supervisory means and through contacts of said relays to said digit register means for operating said digit-uncertain means in response to both the operating of said supervisory means and the registration of a given number of dialed digits in said digit register means, said given number being determined in accordance with the strapping of said contacts of an operated relay, timing means coupled to said digit register means and said digit-uncertain means and operated in response to the operation of said digit-uncertain means for initiating a given time period which is prematurely terminated in response to said digit register means registering an additional dialed digit applied to said routing means, and release control means coupled to said timing means and said release means for operating said release means at the expiration of said given time period in response to the failure of said digit register means to register said additional dialed digit during said given time period.

27. In a telephone system, a plurality of telephone exchanges, call extending circuits, and trunk circuits interconnecting said exchanges to provide primary and alternate trunk routes between two at least of said exchanges, routing means at one of said two exchanges for controlling the extension of a call forwarded thereto and comprising a group of route determining relays each of which includes a corresponding set of contacts, first means for operating a selected one of said relays in accordance with a first portion of a given plurality of dialed digits applied to said routing means, and second means for controlling the operation of said routing means in accordance with an operated relay, said second means including strapping means strapped to the set of contacts of each relay in a unique predetermined manner in accordance with the route to be determined in response to the operation of that relay, a digit sender for outpulsing, and supervisory means including alternate route means operated in response to a first busy signal being returned thereto from a call extending circuit when a call being extended over said call extending circuits to said primary route encounters a busy condition, said alternate route means being coupled through contacts of said relays to determine whether an alternate route is available in accordance with the strapping of said contacts of an operated relay, and, if the strapping indicates availability for releasing said call extending circuits, and for operating another relay, which determines the alternate route; and, if the strapping indicates nonavailability, for causing a busy signal to be returned from said routing means to the calling line.

28. The telephone system defined in claim 27, wherein said group of relays are interconnected to cause said first-operated relay to restore in response to the operation of said other relay.

29. The telephone system defined in claim 27, wherein said second means includes alternate route disabling means coupled to said supervisory means and operated in response to an alternate route having been provided by the operation of said alternate route means for disabling said alternate route means, whereby said alternate route means will not operate in response to said alternate route being found busy, and for returning a busy signal from said routing means in response to said alternate route being found busy.

30. In a telephone system, routing means comprising a group of route determining relays each of which includes a corresponding set of contacts, first means for operating a selected one of said relays in accordance with a first portion of a given plurality of dialed digits applied to said routing means, and second means for controlling the operation of said routing means in accordance with an operated relay, said second means including strapping means strapped to the set of contacts of each relay in a unique predetermined manner in accordance with the route to be determined in response to the operation of that relay, and a digit sender for outpulsing, said digit sender including interdigital means coupled to contacts of said relays for providing an interdigital period of a length determined in accordance with said strapping of said contacts of an operated relay.

31. In a telephone system, routing means comprising a group of route determining relays each of which includes a corresponding set of contacts, first means including digit register means for operating a selected one of said relays in accordance with a first portion of a given plurality of dialed digits applied to said routing means, and second means for controlling the operation of said routing means in accordance with an operated relay, said second means including strapping means strapped to the set of contacts at each relay in a unique predetermined manner in accordance with the route to be determined in response to the operation of that relay, and end-of-dial means coupled through contacts to said relay to said digit register means for operating said end-of-dial means in response to the registration in said digit register means of a predetermined plurality of dialed digits, said predetermined plurality being determined in accordance with said strapping of said contacts of an operated relay.

32. A telephone system defined in claim 31, wherein said first means includes digit register disabling means coupled to said end-of-dial means and responsive to the operation thereof for preventing dialed digits applied to said routing means in excess of said predetermined plurality from being registered in said digit register means.

33. The telephone system defined in claim 31, further incorporating call-extending means comprising first switching means for forwarding a call to said routing means to effect the seizure thereof, second switching means controlled by said routing means for further extending said call, and cutthrough means effective when operated for transferring said forwarding of a call to said routing means from said routing means to said second switching means, whereby said routing means will be released in response to the operation of said cutthrough means, and wherein said second means includes a digit sender for outpulsing, and release means coupled through said first switching means to said cutthrough means to effect the operation of said cutthrough means in response to the operation of said release means, said release means being coupled to said end-of-dial means, said digit register means and said digit sender for operating said release means in response to both said end-of-dial means being operated and the last registered digit having been outpulsed by said digit sender.

34. In a telephone system, routing means comprising a group of route determining relays each of which includes a corresponding set of contacts, first means for operating a selected one of said relays in accordance with the first portion of a given plurality of dialed digits applied to said routing means, and second means for controlling the operation of said routing means in accordance with an operated relay, said second means including strapping means strapped to the set of contacts of each relay in a unique predetermined manner in accordance with the routing to be determined in response to the operation of that relay, supervisory means, and a digit sender for outpulsing, said digit sender including stop dial means coupled to said supervisory means for preventing outpulsing by said digit sender in response to said supervisory means being operated, said supervisory means being operated in response to a stop dial signal being applied thereto.

35. The telephone system defined in claim 34, wherein said routing means includes timing means coupled to said supervisory means and operated in response to the operation of said supervisory means for initiating a predetermined time period which is prematurely terminated in response to the release of said supervisory means, and busy signal means coupled to said timing means for returning a busy signal from said routing means to said first switching means in response to the expiration of said predetermined time period.

36. The telephone system defined in claim 34, wherein a stop dial signal is returned to said routing means and applied to said supervisory means in response to the extension of a call encountering a stop dial condition.

37. The telephone system defined in claim 34, wherein said first means includes digit register means, and wherein said supervisory means is coupled to said digit register means and to said digit sender for applying a stop dial signal through said supervisory means in response to said digit sender having outpulsed the last registered digit registered in said digit register means.

38. The telephone system defined in claim 37, further incorporating call-extending means comprising first switching means for forwarding a call to said routing means to effect the seizure thereof, second switching means controlled by said routing means for further extending said call, and cutthrough means effective when operated by transferring said forwarding of a call to said routing means from said routing means to said second switching means, whereby said routing means will be released in response to the operation of said cutthrough means, and wherein said second means includes release means coupled through said first switching means to said cutthrough means to effect the operation of said cutthrough means in response to the operation of said release means, and digit-uncertain means coupled through said supervisory means and through contacts of said relays to said digit register means for operating said digit uncertain means in response to both the operation of said supervisory means and the registration of a given number of dialed digits in said digit register means, said given number being determined in accordance with said strapping of said contacts of an operated relay, timing means coupled to said digit register means and said digit-uncertain means and operated in response to the operation of said digit-uncertain means for initiating a given time period which is prematurely terminated in response to said digit register means registering an additional dialed digit applied to said routing means, and release control means coupled to said timing means and said release means for operating said release means at the expiration of said given time period in response to the failure of said digit register means to register said additional dialed digit during said given time period.

39. In a telephone system, routing means comprising a group of route determining relays, first means for operating a selected one of said relays in accordance with the respective specific values of a first plurality of M dialed digits of a total of N dialed digits applied to said routing means, N being larger than M, said first means including route interpreter means coupled to said relays for initiating operation of a selected one of said relays in accordance with a translation provided thereby of M respective markings applied thereto, digit register means for registering dialed digits applied to said routing means, and route interpreter control means coupled between said digit register means and said route interpreter means for applying said respective M markings to said route interpreter means in response to said Mth dialed digit being registered in said digit register means, each of said respective M markings being in accordance with the respective specific value of a corresponding one of said M dialed digits registered in said digit register means; and second means for controlling the operation of said routing means in accordance with an operated relay.

40. The telephone system defined in claim 39, wherein each of said relays is connected to hold itself operated in response to it being initially operated.

41. The telephone system defined in claim 39, wherein said dialed digits applied to said routing means are under the control of a calling subscriber and said M dialed digits manifest an area or office code, and wherein said first means includes busy signal means coupled to said route interpreter means for returning a busy signal from said routing means to said calling subscriber in response to a translation of said M respective markings provided by said route interpreter means indicating that the area or office code manifested by said M dialed digits is restricted to said calling subscriber.

42. The telephone system defined in claim 39, wherein said M dialed digits manifest an area or office code, and wherein said first means includes busy signal means coupled to said route interpreter means for returning a busy signal from said routing means in response to a translation of said M respective markings provided by said route interpreter means indicating that said M dialed digits manifests a vacant area or office code.

43. The telephone system defined in claim 42, wherein said busy signal means includes vacant code means coupled to said route interpreter means and operated in response to said translation indicating that said M dialed digits manifest a vacant code, and busy signal transmitting means coupled to said vacant code means and to said relays for returning a busy signal from said routing means in response to said vacant code means being operated and all of said relays being unoperated.

44. The telephone system defined in claim 39, wherein said M dialed digits are intended to manifest an area or office code in accordance with a predetermined numbering plan, wherein said first means includes busy signal means for returning a busy signal from said routing means in response to the operation thereof, and wherein said digit register means includes improper digit indicating means coupled to said busy signal means to effect the operation of said busy signal means in response to any of said M dialed digits registered in said digit register means having a specific value which is not in accordance with said predetermined numbering plan.

45. The telephone system defined in claim 39, wherein said first means includes busy signal means for returning a busy signal from said routing means in response to the operation thereof, and wherein said digit register means includes timing means for initiating a predetermined time period in response to a dialed digit having been registered in said digit register means and for prematurely terminating said predetermined time period in response to an addition dialed digit being registered in said digit register means, said busy signal means being coupled to said timing means for operating said busy signal means in response to the expiration of said predetermined time period.

46. The telephone system defined in claim 45, wherein said second means includes strapping means strapped to contacts of each of said relays in accordance with the route to be determined in response to the operation of that relay, and end-of-dial means coupled through contacts of said relay to said digit register means for operating said end-of-dial means in response to the registration in said digit register means of a predetermined plurality of dialed digits, said predetermined plurality being determined in accordance with said strapping of said contacts of an operated relay, and wherein said first means includes timing disabling means coupled to said timing means and said end-of-dial means for preventing the operation of said timing means in response to the operation of said end-of-dial means.

47. The telephone system defined in claim 46, wherein said first means includes digit register disabling means coupled to said end-of-dial means and responsive to the operation thereof for preventing dialed digits applied to said routing means in excess of said predetermined plurality from being registered in said digit register means.

48. The telephone system defined in claim 45, wherein said routing means includes seizure responsive means coupled to said timing means for operating said timing means in response to the seizure of said routing means.

49. The telephone system defined in claim 39, wherein said second means includes strapping means strapped to contacts of each of said relays in accordance with the route to be determined in response to the operation of that relay, and wherein said strapping of contacts of an operated relay determines whether a second translation by said route interpreter means of a second plurality of M dialed digits, following said first plurality of M dialed digits, is required.

50. The telephone system defined in claim 49, wherein said second means includes a digit sender for outpulsing, said digit sender being coupled to said contacts of said class relay to initiate outpulsing in response to the operation of a relay only if said trapping to said contacts thereof determines that no second translation is required.

51. The telephone system defined in claim 50, wherein said digit sender includes second translation disabling means operated in response to initiation of outpulsing by said digit sender, and wherein said route interpreter control means includes second translation control means coupled to said digit register means, said second translation disabling means and said route interpreter means for operating said second translation control means in response to both said second Mth dialed digit being registered in said digit register means and said second translation disabling means being unoperated, said second translation control means in response to the operation thereof applying said respective M markings to said route interpreter means, each of said respective M markings being in accordance with the respective specific value of a corresponding one of said second M dialed digits registered in said digit register means.

52. The telephone system defined in claim 49, wherein said route interpreter control means includes second translation control means coupled to said contacts of said relays, said digit register means and said route interpreter means for operating said second translation control means in response to both said second Mth dialed digit being registered in said digit register means and said strapping of said contacts of an operated relay determining that said second translation is required, said second translation control means in response to the operation thereof applying said respective M markings to said route interpreter means, each of said respective M markings being in accordance with the respective specific value of a corresponding one of said second M dialed digits registered in said digit register means.

53. The telephone system defined in claim 52, wherein said second translation is required to ascertain the routing of a call, wherein said route interpreter means includes class return means operated in response to a class return marking being applied thereto for altering the translation provided by said route interpreter means of said M respective markings applied thereto, and wherein said second translation control means in response to the operation thereof applies said class return marking to said class return means to initiate the operation of another one of said relays, which ascertains the routing, in response to said second translation.

54. The telephone system defined in claim 53, wherein each of said relays is connected to hold itself operated in response to it being initially operated, and wherein said relays are interconnected to cause said first-operated relay to restore in response to the operation of said other relay.

55. The telephone system defined in claim 53, wherein said second translation control means applies a selected one of a plurality of class return markings to said class return means for altering the translation provided by said route interpreter means of said M respective markings applied thereto in accordance with the selected one of said class return markings applied to said class return means, and wherein said second translation control means is coupled to said relays to determine the selected one of said class return markings in accordance with said strapping of said contacts of an operated relay.

56. The telephone system defined in claim 52, wherein said dialed digits applied to said routing means are under the control of a calling subscriber and said first M dialed digits may manifest a foreign area code and said second M dialed digits may manifest an office code of an office located in said foreign area, and said second translation is required to provide an office code restriction check, wherein said second means includes a digit sender for outpulsing, and wherein said first means includes busy signal means coupled to said route interpreter means for returning a busy signal from said routing means to said calling subscriber in response to said second translation of said M respective markings provided by said route interpreter means indicating that said office code manifested by said second M dialed digits is restricted to said calling subscriber, valid code means coupled to said route interpreter means for operating said valid code means in response to a translation of said M respective markings provided by said route interpreter means indicating that said area code manifested by said second M dialed digits is unrestricted to said calling subscriber, and outpulsing control means coupled to said valid code means and to said digit sender for initiating outpulsing in response to the operation of said valid code means.

57. The telephone system defined in claim 52, wherein said dialed digits applied to said routing means are under the control of a calling subscriber, and said first M dialed digits may manifest a foreign area code and said second M dialed digits may manifest an office code, and said second translation is required either to ascertain the routing of a call or to provide an office code restriction check, wherein said second means includes a digit sender for outpulsing, wherein said route interpreter means includes class return means operated in response to a class return marking being applied thereto for altering the translation provided by said route interpreter means of said M respective markings applied thereto, and second trial means operated in response to a second trial marking being applied thereto, wherein said first means includes busy signal means coupled to said route interpreter means for returning a busy signal from said routing means to said calling subscriber in response to a translation of said M respective markings provided by said route interpreter means indicating that said office code manifested by said second M dialed digits is restricted to said calling subscriber, and valid code means coupled to said second trial means for operating said valid code means in response to both said second trial means being operated and the translation of said M respective markings provided by said route interpreter means indicating that said area code manifested by said second M dialed digits is unrestricted to said calling subscriber, and outpulsing control means coupled to said valid code means and said digit sender for initiating outpulsing in response to the operation of said valid code means, and wherein said second translation control means is coupled to said relays to determine which one of said second trial marking and said class return marking is to be applied in accordance with said strapping of said contacts of an operated relay, and wherein said second translation control means in response to the operation thereof and in accordance with said determination either applies said second trial marking to said second trial means or applies said class return marking to said class return means to initiate the operation of another one of said relays, which ascertains the routing, in response to said second translation.

58. The telephone system defined in claim 57, wherein said second translation control means applies a selected one of a plurality of class return markings to said class return means for altering the translation provided by said route interpreter means of said M respective markings applied thereto in accordance with the selected one of said class return markings applied to said class return means, and wherein said selected one of said class return markings is determined in accordance with said strapping of said contacts of an operated relay.

59. The telephone system defined in claim 58, wherein each of said relays is connected to hold itself operated in response to being initially operated, and wherein said relays are interconnected to cause said first-operated relay to restore in response to the operation of said other relay.

60. The telephone system defined in claim 58, wherein said valid code means is coupled to said route interpreter means and is operated in response to said translation of said first M dialed digits manifesting a vacant area or office code, and busy signal transmitting means coupled to said valid code means and to said relays for returning a busy signal from said routing means to said calling subscriber in response to said valid code means being operated and all of said relays being unoperated.

61. In a telephone system, a translator for use with a plurality of groups of registers, said translator comprising voltage-operated translating means and a plurality of voltage-operated connector means each of which is associated with an individual group of registers, each of said connector means being operable to forward to said translating means a group of voltage signals to be translated which are applied thereto from the group of registers with which that connector means is associated, and means for obtaining the operating voltage for each of said connector means solely from the group of registers with which that connector means is associated.

62. In a telephone system, the combination comprising a plurality of groups of registers and one translator coupled to each of said groups of registers, said translator including voltage-operated translating means and a plurality of voltage-operated connector means each of which is associated with an individual group of registers, each of said connector means being operable to forward to said translating means a group of voltage signals to be translated which are applied thereto from the group of registers with which that connector means is associated, and means for applying the operating voltage for each of said connector means solely from the group of registers with which that connector means is associated.

63. The combination defined in claim 62, wherein each of said plurality of groups of registers includes start means for applying a start signal to the connector means associated with that group of registers for effecting operation thereof, and translation responsive means coupled to said start means and to said translating means for removing said start signal in response to a translation of said group of voltage signals to be translated, and wherein said plurality of connector means are interconnected to prevent the operation of a connector means in response to a start signal applied thereto while another connector means is operated.

(References on following page)

References Cited in the file of this patent

UNITED STATES PATENTS

| | | |
|---|---|---|
| 2,491,291 | Voss | Dec. 13, 1949 |
| 2,663,763 | Schmitz et al. | Dec. 22, 1953 |
| 2,698,879 | Shepherd | Jan. 4, 1955 |
| 2,751,435 | Threadgold | June 19, 1956 |
| 2,763,725 | Ostline | Sept. 18, 1956 |
| 2,834,835 | Shepherd | May 13, 1958 |
| 2,857,467 | Molnar | Oct. 21, 1958 |
| 2,866,003 | Walsh | Dec. 23, 1958 |
| 2,867,690 | Parks | Jan. 6, 1959 |
| 2,891,113 | Flood | June 16, 1959 |
| 2,932,695 | Gohorel | Apr. 13, 1960 |

UNITED STATES PATENT OFFICE
CERTIFICATE OF CORRECTION

July 16, 1963

Patent No. 3,098,125

William H. Berch

It is hereby certified that error appears in the above numbered patent requiring correction and that the said Letters Patent should read as corrected below.

Column 4, line 43, for "Referring" read -- Reference --; column 5, line 1, for "ER1" read -- BR1 --; column 30, line 1, for "than" read -- then --; line 17, for "Insaead" read -- Instead --; column 39, line 62, for "fo" read -- of --; column 46, line 60, for "perviously" read -- previously --; column 50, line 72, for "thorugh" read -- through --; column 60, line 15, for "register", second occurrence, read -- registered --; column 61, line 39, for "to", first occurrence, read -- of --; column 62, line 41, for "by" read -- for --; column 63, lines 64 and 65, for "addition" read -- additional --.

Signed and sealed this 5th day of May 1964.

(SEAL)
Attest:

ERNEST W. SWIDER
Attesting Officer

EDWARD J. BRENNER
Commissioner of Patents